US012237475B2

(12) United States Patent
Cao et al.

(10) Patent No.: US 12,237,475 B2
(45) Date of Patent: Feb. 25, 2025

(54) LITHIUM-STUFFED GARNET ELECTROLYTES WITH A REDUCED SURFACE DEFECT DENSITY AND METHODS OF MAKING AND USING THE SAME

(71) Applicant: QuantumScape Battery, Inc., San Jose, CA (US)

(72) Inventors: David Cao, San Jose, CA (US); Cheng-Chieh Chao, San Jose, CA (US); Zhebo Chen, San Jose, CA (US); Lei Cheng, San Jose, CA (US); Niall Donnelly, Malvern, PA (US); Wes Hermann, Palo Alto, CA (US); Timothy Holme, Mountain View, CA (US); Tommy Huang, San Jose, CA (US); Kian Kerman, San Jose, CA (US); Yang Li, San Jose, CA (US); Harsh Maheshwari, San Jose, CA (US)

(73) Assignee: QuantumScape Battery, Inc., San Jose, CA (US)

( * ) Notice: Subject to any disclaimer, the term of this patent is extended or adjusted under 35 U.S.C. 154(b) by 0 days.

(21) Appl. No.: 18/348,981

(22) Filed: Jul. 7, 2023

(65) Prior Publication Data

US 2024/0006667 A1 Jan. 4, 2024

Related U.S. Application Data

(63) Continuation of application No. 16/343,361, filed as application No. PCT/US2017/057462 on Oct. 19, 2017, now Pat. No. 11,916,200.

(Continued)

(51) Int. Cl.
*H01M 50/403* (2021.01)
*C01G 25/00* (2006.01)
*C04B 35/44* (2006.01)
*C04B 35/486* (2006.01)
*C04B 35/495* (2006.01)
*C04B 35/622* (2006.01)
*C04B 35/645* (2006.01)
*H01M 4/04* (2006.01)
*H01M 10/0525* (2010.01)
(Continued)

(52) U.S. Cl.
CPC ...... *H01M 10/4235* (2013.01); *C01G 25/006* (2013.01); *C04B 35/44* (2013.01); *C04B 35/486* (2013.01); *C04B 35/495* (2013.01); *C04B 35/62218* (2013.01); *C04B 35/6455* (2013.01); *H01M 4/0447* (2013.01); *H01M 10/0525* (2013.01); *H01M 10/0562* (2013.01); *H01M 50/431* (2021.01); *H01M 50/46* (2021.01); *H01M 50/489* (2021.01); *C01P 2002/30* (2013.01); *C01P 2002/72* (2013.01); *C01P 2004/02* (2013.01); *C01P 2004/03* (2013.01); *C01P 2004/52* (2013.01); *C01P 2004/61* (2013.01); *C01P 2006/16* (2013.01); *C01P 2006/40* (2013.01); *C01P 2006/90* (2013.01); *C04B 2235/3203* (2013.01); *C04B 2235/3217* (2013.01); *C04B 2235/3227* (2013.01); *C04B 2235/3244* (2013.01); *C04B 2235/3251* (2013.01); *C04B 2235/3255* (2013.01); *C04B 2235/3839* (2013.01); *C04B 2235/443* (2013.01); *C04B 2235/5436* (2013.01); *C04B 2235/5463* (2013.01); *C04B 2235/764* (2013.01); *C04B 2235/786* (2013.01); *C04B 2235/963* (2013.01); *H01M 50/403* (2021.01); *H01M 50/406* (2021.01); *H01M 50/491* (2021.01); *H01M 2300/0071* (2013.01)

(58) Field of Classification Search
CPC .................................................. H01M 50/403
See application file for complete search history.

(56) References Cited

U.S. PATENT DOCUMENTS

| | | | |
|---|---|---|---|
| 4,259,061 | A | 3/1981 | Dubetsky |
| 4,340,436 | A | 7/1982 | Dubetsky et al. |

(Continued)

FOREIGN PATENT DOCUMENTS

| | | | |
|---|---|---|---|
| CN | 1746757 | A | 3/2006 |
| CN | 101518164 | A | 8/2009 |

(Continued)

OTHER PUBLICATIONS

Office action of Chinese Patent application No. 202010759223.1 dated May 30, 2024 and its English translation; 28 pages.

(Continued)

*Primary Examiner* — Austin Murata
(74) *Attorney, Agent, or Firm* — Squire Patton Boggs (US) LLP

(57) ABSTRACT

The disclosure herein relates to rechargeable batteries and solid electrolytes therefore which include lithium-stuffed garnet oxides, for example, in a thin film, pellet, or monolith format wherein the density of defects at a surface or surfaces of the solid electrolyte is less than the density of defects in the bulk. In certain disclosed embodiments, the solid-state anolyte, electrolyte, and catholyte thin films, separators, and monoliths consist essentially of an oxide that conducts $Li^+$ ions. In some examples, the disclosure herein presents new and useful solid electrolytes for solid-state or partially solid-state batteries. In some examples, the disclosure presents new lithium-stuffed garnet solid electrolytes and rechargeable batteries which include these electrolytes as separators between a cathode and a lithium metal anode.

17 Claims, 17 Drawing Sheets

Related U.S. Application Data

(60) Provisional application No. 62/411,476, filed on Oct. 21, 2016.

(51) Int. Cl.
    *H01M 10/0562*     (2010.01)
    *H01M 10/42*     (2006.01)
    *H01M 50/431*     (2021.01)
    *H01M 50/46*     (2021.01)
    *H01M 50/489*     (2021.01)
    H01M 50/406     (2021.01)
    H01M 50/491     (2021.01)

(56) References Cited

U.S. PATENT DOCUMENTS

| | | |
|---|---|---|
| 4,492,783 A | 1/1985 | Tanaka et al. |
| 4,878,838 A | 11/1989 | Verheyden, Jr. |
| 5,014,763 A | 5/1991 | Frank |
| 5,130,067 A | 7/1992 | Flaitz et al. |
| 5,250,243 A | 10/1993 | Allaire et al. |
| 5,256,242 A | 10/1993 | Imaeda et al. |
| 5,279,994 A | 1/1994 | Kerkar |
| 5,296,318 A | 3/1994 | Gozdz et al. |
| 5,456,000 A | 10/1995 | Gozdz et al. |
| 5,460,904 A | 10/1995 | Gozdz et al. |
| 5,620,637 A | 4/1997 | Kaga et al. |
| 5,874,162 A | 2/1999 | Bastian et al. |
| 5,915,958 A | 6/1999 | Kurie |
| 5,922,493 A | 7/1999 | Humphrey, Jr. et al. |
| 6,277,524 B1 | 8/2001 | Kanno |
| 6,306,336 B1 | 10/2001 | Hrezo et al. |
| 6,306,535 B1 | 10/2001 | Tomimatsu et al. |
| 6,322,923 B1 | 11/2001 | Spotnitz et al. |
| 6,447,712 B1 | 9/2002 | Dogan et al. |
| 6,514,072 B1 | 2/2003 | Bencic |
| 6,561,799 B2 | 5/2003 | Baudry et al. |
| 6,656,641 B1 | 12/2003 | Kumar |
| 6,852,138 B1 | 2/2005 | Topsoe et al. |
| 6,863,862 B2 | 3/2005 | Rasouli et al. |
| 6,924,065 B2 | 8/2005 | Noh |
| 7,108,827 B1 | 9/2006 | Hata et al. |
| 7,736,810 B2 | 6/2010 | Noh |
| 7,794,557 B2 | 9/2010 | Hui et al. |
| 7,901,658 B2 | 3/2011 | Weppner et al. |
| 7,923,149 B2 | 4/2011 | Hwang et al. |
| 7,947,213 B2 | 5/2011 | Badding et al. |
| 8,092,941 B2 | 1/2012 | Weppner et al. |
| 8,235,710 B2 | 8/2012 | Bloemacher et al. |
| 8,268,488 B2 | 9/2012 | Neudecker |
| 8,283,843 B2 | 10/2012 | Pan et al. |
| 8,309,258 B2 | 11/2012 | Kanamura et al. |
| 8,329,605 B2 | 12/2012 | Bernard-Granger et al. |
| 8,375,734 B2 | 2/2013 | Hall et al. |
| 8,425,225 B2 | 4/2013 | Pasquinet et al. |
| 8,431,287 B2 | 4/2013 | Teramoto |
| 8,658,317 B2 | 2/2014 | Weppner et al. |
| 8,697,292 B2 | 4/2014 | Kanno et al. |
| 8,828,580 B2 | 9/2014 | Visco et al. |
| 8,865,355 B2 | 10/2014 | Iriyama et al. |
| 8,877,388 B1 | 11/2014 | Ihlefeld et al. |
| 8,940,446 B1 | 1/2015 | Holme et al. |
| 9,034,526 B2 | 5/2015 | Teshima et al. |
| 9,093,717 B2 | 7/2015 | Sakamoto et al. |
| 9,287,106 B1 | 3/2016 | Miao et al. |
| 9,362,546 B1 | 6/2016 | Donnelly et al. |
| 9,790,121 B2 | 10/2017 | Abramov et al. |
| 9,806,372 B2 | 10/2017 | Holme et al. |
| 9,966,630 B2 | 5/2018 | Cheng et al. |
| 9,970,711 B2 | 5/2018 | Iyer et al. |
| 10,008,736 B2 | 6/2018 | Winoto et al. |
| 10,008,742 B2 | 6/2018 | Holme et al. |
| 10,026,990 B2 | 7/2018 | Badding et al. |
| 10,103,405 B2 | 10/2018 | Choi et al. |
| 10,155,667 B2 | 12/2018 | Badding et al. |
| 10,211,481 B2 | 2/2019 | Budding et al. |
| 10,283,811 B2 | 5/2019 | Badding et al. |
| 10,290,895 B2 | 5/2019 | Holme et al. |
| 10,305,141 B2 | 5/2019 | Choi et al. |
| 10,347,936 B2 | 7/2019 | Choi et al. |
| 10,347,937 B2 | 7/2019 | Beck et al. |
| 10,361,455 B2 | 7/2019 | Allenic et al. |
| 10,396,396 B2 | 8/2019 | Badding et al. |
| 10,403,931 B2 | 9/2019 | Holme et al. |
| 10,403,932 B2 | 9/2019 | Choi et al. |
| 10,422,581 B2 | 9/2019 | Iyer et al. |
| 10,431,806 B2 | 10/2019 | Donnelly et al. |
| 10,431,850 B2 | 10/2019 | Choi et al. |
| 10,439,251 B2 | 10/2019 | Holme et al. |
| 10,486,332 B2 | 11/2019 | Badding et al. |
| 10,563,918 B2 | 2/2020 | Iyer et al. |
| 10,581,115 B2 | 3/2020 | Badding et al. |
| 10,651,502 B2 | 5/2020 | Holme et al. |
| 10,746,468 B2 | 8/2020 | Iyer et al. |
| 10,766,165 B2 | 9/2020 | Badding et al. |
| 10,804,564 B2 | 10/2020 | Allenic et al. |
| 10,840,544 B2 | 11/2020 | Holme et al. |
| 10,862,161 B2 | 12/2020 | Choi et al. |
| 10,875,212 B2 | 12/2020 | Badding et al. |
| 10,967,539 B2 | 4/2021 | Badding et al. |
| 11,014,822 B2 | 5/2021 | Badding et al. |
| 11,111,155 B1 | 9/2021 | Badding et al. |
| 11,139,503 B2 | 10/2021 | Karpenko et al. |
| 11,148,321 B2 | 10/2021 | Badding et al. |
| 11,158,842 B2 | 10/2021 | Donnelly et al. |
| 11,158,880 B2 | 10/2021 | Chao et al. |
| 11,165,096 B2 | 11/2021 | Allenic et al. |
| 11,171,357 B2 | 11/2021 | Choi et al. |
| 11,171,358 B2 | 11/2021 | Holme et al. |
| 11,581,576 B2 | 2/2023 | Allenic et al. |
| 11,600,850 B2 | 3/2023 | Chao et al. |
| 2002/0054419 A1 | 5/2002 | Beteille et al. |
| 2002/0182556 A1 | 12/2002 | Baudry et al. |
| 2003/0049499 A1 | 3/2003 | Murakawa et al. |
| 2003/0072870 A1 | 4/2003 | Brandle et al. |
| 2003/0148179 A1 | 8/2003 | Uyama et al. |
| 2004/0074338 A1 | 4/2004 | Kuhn et al. |
| 2004/0191617 A1 | 9/2004 | Visco et al. |
| 2005/0016839 A1 | 1/2005 | Horne et al. |
| 2006/0120160 A1 | 6/2006 | Park et al. |
| 2006/0197245 A1 | 9/2006 | Cheng et al. |
| 2007/0015061 A1 | 1/2007 | Klaassen |
| 2007/0117026 A1 | 5/2007 | Kumar et al. |
| 2007/0148553 A1 | 6/2007 | Weppner et al. |
| 2007/0231704 A1 | 10/2007 | Inda |
| 2008/0145751 A1 | 6/2008 | Ogumi et al. |
| 2008/0199822 A1 | 8/2008 | Blomacher et al. |
| 2009/0069740 A1 | 3/2009 | Visco et al. |
| 2009/0162755 A1 | 6/2009 | Neudecker |
| 2009/0194222 A1 | 8/2009 | Teramoto |
| 2009/0197172 A1 | 8/2009 | Inda |
| 2009/0226790 A1 | 9/2009 | Kanamura et al. |
| 2009/0298001 A1 | 12/2009 | Klein et al. |
| 2009/0301769 A1 | 12/2009 | Seppa et al. |
| 2009/0311567 A1 | 12/2009 | Visco et al. |
| 2009/0317724 A1 | 12/2009 | Kumar et al. |
| 2010/0047696 A1 | 2/2010 | Yoshida et al. |
| 2010/0062385 A1 | 3/2010 | Pasquinet et al. |
| 2010/0203383 A1 | 8/2010 | Weppner et al. |
| 2011/0045355 A1 | 2/2011 | Ichikawa et al. |
| 2011/0052972 A1 | 3/2011 | Sohn |
| 2011/0053000 A1 | 3/2011 | Kanamura et al. |
| 2011/0053001 A1 | 3/2011 | Babic et al. |
| 2011/0053002 A1 | 3/2011 | Yamamura et al. |
| 2011/0133136 A1 | 6/2011 | Weppner et al. |
| 2011/0198785 A1 | 8/2011 | Kester et al. |
| 2011/0223487 A1 | 9/2011 | Johnson et al. |
| 2011/0244337 A1 | 10/2011 | Ohta et al. |
| 2011/0262796 A1 | 10/2011 | Shimooka et al. |
| 2011/0281175 A1 | 11/2011 | Hudson et al. |
| 2012/0100433 A1 | 4/2012 | Suyama et al. |
| 2012/0196189 A1 | 8/2012 | Babic et al. |
| 2012/0237834 A1 | 9/2012 | Ogasa |
| 2012/0247154 A1 | 10/2012 | Abramov et al. |

(56) References Cited

U.S. PATENT DOCUMENTS

| | | |
|---|---|---|
| 2012/0276439 A1 | 11/2012 | Fujita et al. |
| 2013/0085055 A1 | 4/2013 | Raj et al. |
| 2013/0122380 A1 | 5/2013 | Visco et al. |
| 2013/0177811 A1 | 7/2013 | Roffat et al. |
| 2013/0189562 A1 | 7/2013 | Dolle et al. |
| 2013/0216783 A1 | 8/2013 | Duan et al. |
| 2013/0230778 A1 | 9/2013 | Saimen et al. |
| 2013/0260257 A1 | 10/2013 | Choi |
| 2013/0288875 A1 | 10/2013 | Miyagawa et al. |
| 2013/0344416 A1 | 12/2013 | Sakamoto et al. |
| 2014/0057153 A1 | 2/2014 | Visco et al. |
| 2014/0060723 A1 | 3/2014 | Herle et al. |
| 2014/0072870 A1 | 3/2014 | Otsuka et al. |
| 2014/0093785 A1 | 4/2014 | Sugiura et al. |
| 2014/0099538 A1 | 4/2014 | Johnson et al. |
| 2014/0113187 A1 | 4/2014 | Winoto et al. |
| 2014/0120409 A1 | 5/2014 | Ouchi et al. |
| 2014/0120421 A1 | 5/2014 | Ouchi et al. |
| 2014/0134438 A1 | 5/2014 | Gadkaree et al. |
| 2014/0134483 A1 | 5/2014 | Ouchi et al. |
| 2014/0154586 A1 | 6/2014 | Hayashi et al. |
| 2014/0162113 A1 | 6/2014 | Ohta et al. |
| 2014/0170504 A1 | 6/2014 | Baek et al. |
| 2014/0186720 A1 | 7/2014 | Kintaka |
| 2014/0193695 A1 | 7/2014 | Hoshina et al. |
| 2014/0205910 A1 | 7/2014 | Weppner et al. |
| 2014/0287305 A1 | 9/2014 | Wachsman et al. |
| 2014/0295287 A1 | 10/2014 | Eisele et al. |
| 2014/0377665 A1 | 12/2014 | Yoshida et al. |
| 2015/0015542 A1 | 1/2015 | Hou |
| 2015/0024292 A1 | 1/2015 | Yamada et al. |
| 2015/0037688 A1 | 2/2015 | Otsuka et al. |
| 2015/0044576 A1 | 2/2015 | Eisele et al. |
| 2015/0056520 A1 | 2/2015 | Thokchom et al. |
| 2015/0099188 A1 | 4/2015 | Holme et al. |
| 2015/0099190 A1 | 4/2015 | Holme et al. |
| 2015/0130115 A1 | 5/2015 | Sung et al. |
| 2015/0180001 A1 | 6/2015 | Johnson et al. |
| 2015/0200420 A1 | 7/2015 | Holme et al. |
| 2015/0243974 A1 | 8/2015 | Holme et al. |
| 2015/0295274 A1 | 10/2015 | Engel et al. |
| 2015/0333307 A1 | 11/2015 | Thokchom et al. |
| 2016/0056500 A1 | 2/2016 | Holme et al. |
| 2016/0087321 A1 | 3/2016 | Wöhrle et al. |
| 2016/0111751 A1 | 4/2016 | Badding et al. |
| 2016/0141580 A1 | 5/2016 | Sommer et al. |
| 2016/0149260 A1 | 5/2016 | Badding et al. |
| 2016/0172658 A1 | 6/2016 | Donnelly et al. |
| 2016/0190639 A1 | 6/2016 | Sung et al. |
| 2016/0190640 A1 | 6/2016 | Visco et al. |
| 2016/0204466 A1 | 7/2016 | Nogami et al. |
| 2016/0211547 A1 | 7/2016 | Hwang et al. |
| 2016/0229701 A1 | 8/2016 | Heine et al. |
| 2016/0240396 A1 | 8/2016 | Hatta et al. |
| 2016/0244665 A1 | 8/2016 | Vosgroene et al. |
| 2016/0293988 A1 | 10/2016 | Sakamoto et al. |
| 2016/0308243 A1 | 10/2016 | Herle et al. |
| 2016/0308244 A1 | 10/2016 | Badding et al. |
| 2016/0375607 A1 | 12/2016 | Badding et al. |
| 2017/0005367 A1 | 1/2017 | Van Berkel et al. |
| 2017/0022112 A1 | 1/2017 | Karpenko et al. |
| 2017/0054139 A1 | 2/2017 | Kerkamm |
| 2017/0062873 A1 | 3/2017 | Iyer et al. |
| 2017/0162901 A1 | 6/2017 | Chen et al. |
| 2017/0183265 A1 | 6/2017 | Badding et al. |
| 2017/0210634 A1 | 7/2017 | Badding et al. |
| 2017/0214048 A1 | 7/2017 | Qian et al. |
| 2017/0214084 A1 | 7/2017 | Lei et al. |
| 2018/0069263 A1 | 3/2018 | Holme et al. |
| 2018/0104848 A1 | 4/2018 | Badding et al. |
| 2018/0301754 A1 | 10/2018 | Badding et al. |
| 2018/0375149 A1 | 12/2018 | Beck et al. |
| 2019/0077674 A1 | 3/2019 | Badding et al. |
| 2019/0207252 A1 | 7/2019 | Badding et al. |
| 2019/0214678 A1 | 7/2019 | Hwang et al. |
| 2019/0245178 A1 | 8/2019 | Cao et al. |
| 2019/0260073 A1 | 8/2019 | Chao et al. |
| 2019/0363398 A1 | 11/2019 | Badding et al. |
| 2020/0031014 A1 | 1/2020 | Badding et al. |
| 2020/0083562 A1 | 3/2020 | Kim et al. |
| 2020/0144660 A1 | 5/2020 | Schneider et al. |
| 2020/0266442 A1 | 8/2020 | Badding et al. |
| 2020/0309454 A1 | 10/2020 | Kamei et al. |
| 2020/0365897 A1 | 11/2020 | Badding et al. |
| 2021/0020932 A1 | 1/2021 | Badding et al. |
| 2021/0047243 A1 | 2/2021 | Badding et al. |
| 2021/0202983 A1 | 7/2021 | Chao et al. |
| 2021/0242495 A1 | 8/2021 | Kim et al. |
| 2021/0245296 A1 | 8/2021 | Ye et al. |
| 2021/0380430 A1 | 12/2021 | Badding et al. |
| 2021/0402646 A1 | 12/2021 | Badding et al. |
| 2022/0149369 A1 | 5/2022 | Badding et al. |
| 2022/0166062 A1 | 5/2022 | Kim et al. |
| 2022/0181628 A1 | 6/2022 | Badding et al. |
| 2022/0209288 A1 | 6/2022 | Badding et al. |
| 2022/0209289 A1 | 6/2022 | Badding et al. |

FOREIGN PATENT DOCUMENTS

| | | |
|---|---|---|
| CN | 101786873 A | 7/2010 |
| CN | 102010183 A | 4/2011 |
| CN | 102280659 A | 12/2011 |
| CN | 103113107 A | 5/2013 |
| CN | 103117413 A | 5/2013 |
| CN | 109 378 525 A | 2/2019 |
| EP | 2 037 527 A1 | 3/2009 |
| EP | 3599068 A1 | 1/2020 |
| EP | 3408246 B1 | 2/2020 |
| JP | H02-111658 A | 4/1990 |
| JP | H11-012041 | 1/1999 |
| JP | 2000-128629 | 5/2000 |
| JP | 2001-31476 A | 2/2001 |
| JP | 2004-63261 A | 2/2004 |
| JP | 2006-8488 | 1/2006 |
| JP | 2009-203898 | 9/2009 |
| JP | 2010-102929 | 5/2010 |
| JP | 2010-176941 A1 | 8/2010 |
| JP | 2011/070939 A | 4/2011 |
| JP | 2012-031025 | 2/2012 |
| JP | 2012224520 A | 11/2012 |
| JP | 2012-243743 | 12/2012 |
| JP | 2013-107779 | 6/2013 |
| JP | 2013-134852 | 7/2013 |
| JP | 5273732 B2 | 8/2013 |
| JP | 5283188 B2 | 9/2013 |
| JP | 2013-214421 | 10/2013 |
| JP | 2014-2965 A | 1/2014 |
| JP | 2014-522331 | 9/2014 |
| JP | 2015-130481 A | 7/2015 |
| JP | 2015-215998 | 12/2015 |
| RU | 2483398 C1 | 5/2013 |
| WO | WO 81/02196 A1 | 8/1981 |
| WO | WO 2005/085138 A1 | 9/2005 |
| WO | WO 2009/038674 A2 | 3/2009 |
| WO | WO 2010/005345 A2 | 5/2010 |
| WO | WO 2011/038773 | 4/2011 |
| WO | WO 2012/114175 | 8/2012 |
| WO | WO 2013/010692 | 1/2013 |
| WO | WO 2013/128769 | 9/2013 |
| WO | WO 2015/054320 | 4/2015 |
| WO | WO 2015/076944 | 5/2015 |
| WO | WO 2016/069749 | 5/2016 |
| WO | WO 2017/131676 A1 | 8/2017 |
| WO | WO 2017/197406 A1 | 11/2017 |
| WO | WO 2018/075972 A1 | 4/2018 |
| WO | WO 2018/118964 A1 | 6/2018 |
| WO | WO 2019/090360 A1 | 5/2019 |
| WO | WO 2020/081718 A1 | 4/2020 |

(56) References Cited

FOREIGN PATENT DOCUMENTS

WO    WO 2020/176905 A1    9/2020
WO    WO 2020/236767 A1    11/2020

OTHER PUBLICATIONS

Zhang et al., "Laser ablation on lithium-ion battery electrode solidelectrolyte interface removal", Journal of Laser Applications, vol. 29, No. 4, Nov. 2017, pp. 042002-1-042002-7.
Extended European search report of EP application No. 21187050.6 dated Jan. 7, 2022; 12 pages.
Extended European Search Report dated Feb. 22, 2017 for European application No. 14864783.7; 9 pages.
English translation of the First office Action of Chinese patent Application No. 202111593888.0 dated Oct. 31, 2022; 15 pages.
Office Action of the JP Patent Application No. 2022-091043 dated May 16, 2023, and its English translation, 19 pages.
Preliminary Rejection of Korean Patent Application No. 10-2021-7024341 dated Nov. 8, 2021 with the English translation.
Agrawal et al., "Solid polymer electrolytes: materials designing and all-solid-state battery applications: an overview", Journal of Physics D: Applied Physics 41, 2008, 223001, 18 pages.
Ahmad et al., "Concentration and mobility of mobile Li$^+$ ions in Li$_6$BaLa$_2$Ta$_2$O$_{12}$ and Li$_5$La$_3$Ta$_2$O$_{12}$ garnet lithium ion conductors," J Mater Sci: Mater Electron, 2015, vol. 26, pp. 8136-8142.
Ahmad, Mohamad, "Lithium ionic conduction and relaxation dynamics of spark plasma sintered Li$_5$La$_3$Ta$_2$O$_{12}$ garnet nanoceramics", Ahmad Nanoscale Research Letters, 2015, 10:58, DOI: 10.1186/s11671-015-0777-7, 10 pages.
Ahn et al., "Local impedance spectroscopic and microstructural analyses of Al-in-diffused Li$_7$La$_3$Zr$_2$O$_{12}$," Journal of Power Sources, 2014, vol. 254, pp. 287-292.
Allen et al., "Effect of substitution (Ta, Al, Ga) on the conductivity of Li$_7$La$_3$Zr$_2$O$_{12}$", issued on Journal of Power Sources 2012, vol. 206, pp. 315-319.
Arora et al., "Battery Separators", Chemical Reviews, 2004, vol. 104, pp. 4419-4462.
Baek et al., "Garnet related lithium ion conductor processed by spark plasma sintering for all solid state batteries," Journal of Power Sources, 2014, vol. 249, pp. 197-206.
Baggetto et al., "High Energy Density All-Solid-State Batteries: A Challenging Concept Towards 3D Integration", Advanced Functional Materials, 2008, vol. 18, pp. 1057-1066.
Bernuy-Lopez et al., "Atmosphere Controlled Processing of Ga-Substituted Garnets for High Li-Ion Conductivity Ceramics," Chem. Mater. 2014, vol. 26, pp. 3610-3617.
Bonderer et al., "Free-Standing Ultrathin Ceramic Foils," Journal of the American Ceramic Society, 2010, vol. 93, No. 11, pp. 3624-3631.
Bruce et al.,"Li—O$_2$ and Li—S batteries with high energy storage", Nature Materials, Jan. 2012, vol. 11, pp. 19-29.
Buschmann et al. "Lithium metal electrode kinetics and ionic conductivity of the solid lithium ion conductors "Li$_7$La$_3$Zr$_2$O$_{12}$" and Li$_{7-x}$La$_3$Zr$_{2-x}$Ta$_x$O$_{12}$ with garnet-type strucutre," Journal of Power Sources, 2012, vol. 206, pp. 236-244.
Buschmann et al., "Structure and dynamics of the fast lithium ion conductor Li$_7$La$_3$Zr$_2$O$_{12}$", Phys. Chem. Chem. Phys., 2011, vol. 13, pp. 19378-19392.
Cao et al., "Effect of Sb—Ba codoping on the ionic conductivity of Li$_7$La$_3$Zr$_2$O$_{12}$ ceramic," Ceramics International, 2015, vol. 41, pp. 6232-6236.
Chen et al., "Origin of High Li+ Conduction in Doped Li$_7$La$_3$Zr$_2$O$_{12}$ Garnets," Chemistry of Materials, 2015, vol. 27, pp. 5491-5494.
Chen et al., "Sol-gel derived Li—La—Zr—O thin films as solid electrolytes for lithium-ion batteries", Journal of Materials Chemistry A, 2014, vol. 2, pp. 13277-13282.
Cheng et al., "Effect of microstructure and surface impurity segregation on the electrical and electrochemical properties of dense Al-substituted Li$_7$La$_3$Zr$_2$O$_{12}$," J. Mater. Chem. A, 2014, vol. 2, pp. 172-181.

Cheng et al., "Effect of Surface Microstructure on Electrochemical Performance of Garnet Solid Electrolytes," ACS Appl. Mater. Interfaces, 2015, vol. 7, pp. 2073-2081.
Cheng et al., "Interrelationships among Grain Size, Surface Composition Air Stability, and Interfacial Resistance of Al-Substitued Li$_7$La$_3$Zr$_2$O$_{12}$ Solid Electrolytes," ACS Appl. Mater. Interfaces, 2015, vol. 7, pp. 17649-17655.
Cheng et al., "The origin of high electrolyte-electrode interfacial resistances in lithium cells containing garnet type solid electrolytes," Phys. Chem. Chem. Phys., 2014, vol. 16, pp. 18294-18300.
Cheng et al., "Measurement of the Sintering Pressure in Ceramic Films", J. Am. Ceram. Soc., 1988, vol. 71, No. 4, pp. 276-280.
Cheng J. et al., "On the green density sintering behavior and electrical property of tape cast Ce$_{0.9}$Gd$_{0.1}$O$_{1.95}$ electrolyte films", Materials Research Bulletin, Dec. 1, 2002, vol. 37, No. 15, pp. 2437-2446, XP004395782.
Cologna et al., "Effect of Al and Ce doping on the deformation upon sintering in sequential tape cast layers for solid oxide fuel cells", Journal of Power Sources, vol. 193, 2009, pp. 80-85.
Cologna et al., "Vertical sintering to measure the uniaxial viscosity of thin ceramic layers", Acta Materialia, vol. 58, 2010, pp. 5558-5564.
David et al., "Microstructure and Li-Ion Conductivity of Hot-Pressed Cubic Li$_7$La$_3$Zr$_2$O$_{12}$", J. Am. Cerami. Soc., 2015, pp. 1-6; DOI: 10.1111/jace.13455.
Deng et al., "Effect of the morphology of Li—La—Zr—O Solid electrolyte coating on the electrochemical performance of spinel LiMn$_{1.95}$Ni$_{0.05}$O$_{3.98}$F$_{0.02}$ cathode materials," J. Mater. Chem. A, 2014, vol. 2, pp. 18889-18897.
Dhivya et al., "Effect of Simultaneous Substitution of Y and Ta on the Stabilization of Cubic Phase, Microstructure, and Li$^+$ Conductivity of Li$_7$La$_3$Zr$_2$O$_{12}$ Lithium Garnet," ACS Appl. Mater. Interfaces, 2014, vol. 6, pp. 17606-17615.
Dhivya et al., "Li$^+$ transport properties of W substituted Li$_7$La$_3$Zr$_2$O$_{12}$ cubic lithium garnets," AIP Advances, 2013, vol. 3, pp. 082115.1-082115.21.
Djenadic, Ruzica et al., "Nebulized spray pyrolysis of Al-doped Li$_7$La$_3$Zr$_2$O$_{12}$ solid electrolyte for battery applications," Solid State Ionics, Oct. 2014, vol. 263, pp. 49-56.
Dong et al., "Electrochemical perofmrance and lithium-ion insertion/extraction mechanism studies of the novel Li$_2$ZrO$_3$ anode materials," Electrochimica Acta, 2015, vol. 161, pp. 219-225.
Duvel, Andre, et al., "Mechanosynthesis of Solid Electrolytes: Preparation, Characterization, and Li Ion Transport Properties of Garnet-Type Al-Doped Li$_7$La$_3$Zr$_2$O$_{12}$ Crystallizing with Cubic Symmetry," The Journal of Physical Chemistry, 2012, vol. 116, pp. 15192-15202.
English translation of the office action of Chinese application No. 201480055386.4 mailing date of Jan. 4, 2017; 9 pages.
Ferrese et al., "Lithium Redistribution in Lithium-Metal Batteries", Journal of the Electrochemical Society, 159, 2012, pp. A1615-A1623.
Fries, R. et al., "Fabrication and properties of an anisotropic PZT/Polymer 0-3 composite," J. Mater. Sci.: Mater. in Electronics, 1994, vol. 5, pp. 238-243.
Fu et al., "Stabilizing the Garnet Solid-Electrolyte/Polysulfide Interface in Li—S Batteries", Chemistry of Materials, vol. 29, No. 19, Sep. 26, 2017, pp. 8037-8041.
Fu et al., "Toward Garnet electrolyte-based Li metal batteries: An ultrathin, highly effective, artificial solid-state electrolyte/metallic Li interface", Science Advances, vol. 3, No. 4, Apr. 7, 2017, pp. 1-11.
Geiger et al., "Crystal Chemistry and Stability of "Li$_7$La$_3$Zr$_2$O$_{12}$" Garnet: A Fast Lithium-Ion Conductor," Inorganic Chemistry, 2011, vol. 50, pp. 1089-1097.
Goodenough, John, B., "Solid Electrolytes for Next Generation Batteries," Texas Materials Institute, The University of Texas at Austin, May 14-18, 2012, DOE Vehicle Technologies Annual Merit Review Meeting, 18 pages.
Gorte et al., "Anodes for Direct Oxidation of Dry Hydrocarbons in a Solid-Oxide Fuel Cell", Advanced Materials, Oct. 2, 2000, vol. 12, No. 19, pp. 1465-1469.

(56) References Cited

OTHER PUBLICATIONS

Gotschel et al., "Processing of preceramic paper and ceramic green tape derived multilayer structures", Advances in Applied Ceramics, vol. 112, No. 6, 2013, pp. 358-365.
Gu et al., "Effects of penta-and trivalent dopants on structures and conductivity $Li_7La_3Zr_2O_{12}$," Solid State Ionics, 2015, vol. 274, pp. 100-105.
Gurauskis et al., "Laser drilling of Ni—YSZ cermets", Journal of the European Ceramic Society, Oct. 1, 2008, vol. 28, No. 14, pp. 2671-2680, XP023610743.
Han et a., "Experimental visualization of lithium conduction pathways in garnet-type $Li_7La_3Zr_2O_{12}$", Chem. Commun., 2012, vol. 48, pp. 9840-9842.
Han et al., "Control of shrinkage on the behavior of co-firing of ferrite and varistor multi-layers composite with organic content", J Electroceram, 2009, vol. 23, pp. 559-563.
Hayashi et al., "New Phases in $La_2O_3$—$Li_2O$—$Ta_2O_5$ System", Mat. Res. Bull. 1986, vol. 21, No. 3, pp. 289-293.
Herrmann et al., "Micro-segregation in liquid phase sintered silicon carbide ceramics," Journal of the European Ceramic Society, Apr. 1, 2010, vol. 30, pp. 1495-1501.
Hitz et al., "Highly Li-Stuffed Garnet-Type $Li_{7+x}La_3Zr_{2-x}YxO_{12}$", Journal of the Electrochemical Society, 2013, vol. 160, No. 8, pp. A1248-A1255.
Hu et al., "Highly conductive paper for energy-storage devices", PNAS, Dec. 22, 2009, vol. 106, No. 51, pp. 21490-21494; www.pnas.org/cgi/doi/10.1073/pnas.090885810.
Hyooma et al., "Crystal Structures of $La_3Li_5M_2O_{12}$ (M=Nb, Ta)", Mat. Res. Bull. 1988, vol. 23, No. 10, pp. 1399-1407.
International Search Report and Written Opinion mailed Apr. 15, 2016 in PCT/US2016/015209, 14 pages.
International Search Report and Written Opinion mailed Dec. 1, 2016 in PCT/US2016/043428, 11 pages.
International Search Report and Written Opinion mailed Mar. 10, 2015 in PCT/US2014/059578, 15 pages.
International Search Report and Written Opinion mailed Mar. 23, 2015 in PCT/US2014/059575, 16 pages.
Ishiguro et al., "Stability of Nb-Doped Cubic $Li_7La_3Zr_2O_{12}$ with Lithium Metal," Journal of the Electrochemical Society, 2013, vol. 160, No. 10, pp. A1690-A1693.
Ito, Seitaro et al., "A rocking chair type all-solid-state lithium ion battery adopting $Li_2O$—$ZrO_2$ coated $LiNi_{0.8}Co_{0.15}Al_{0.05}O_2$ and a sulfide based electrolyte," Journal of Power Sources, 248, 2014, pp. 943-950.
Jalem et al., "Effects of Gallium doping in Garnet-Type $Li_7La_3Zr_2O_{12}$ Solid Electrolytes," Chemistry of Materials, 2015, vol. 27, pp. 2821-2831.
Jalem et al., "Insights into the Lithium-Ion Conduction Mechanism of Garnet-Type Cubic $Li_5La_3Ta_2O_{12}$ by ab-Initio Calculations," J. Phys. Chem. C 2015, vol. 119, pp. 20783-20791.
Janani et al., "Influence of sintering additives on densification and $Li^+$ conductivity of Al doped $Li_7La_3Zr_2O_{12}$ lithium garnet," RSC Adv. 2014, vol. 4, pp. 51228-51238.
Janani et al., "Optimization of Lithium Content and Sintering Aid for Maximized Li+ Conductivity and Density in Ta-Doped $Li_7La_3Zr_2O_{12}$," J. Am. Ceram. Soc., 2015, pp. 1-8; DOI: 10.1111/jace.13578.
Jin et al., "Al-doped $Li_7La_3Zr_2O_2$ synthesized by a polymerized complex method," Journal of Power Sources, 2011, vol. 196, pp. 8683-8687.
Jung et al., "Ceramic separators based on Lip-conducting inorganic electrolyte for high-performance lithium-ion batteries with enhanced safety," Journal of Power Sources, 2015, vol. 293, pp. 675-683.
Kang et al., "First-Principles Study of Chemical Stability of Lithium Oxide Garnets $Li_7La_3M_2O_{12}$ (M=Zr, Sn, or Hf)," The Journal of Physical Chemistry C, 2014, vol. 118 (31), pp. 17402-17406.
Kato et al., "Preparation of thick-film electrode-solid electrolyte composites on $Li_7La_3Zr_2O_{12}$ and their electrochemical properties," Journal of Power Sources, 303, 2016, pp. 65-72.

Katsui et al., "Preparation of cubic and tetragonal $Li_7La_3Zr_2O_{12}$ flim by metal organic chemical vapor deposition," Thin Solid Films, vol. 584, Jun. 1, 2015, pp. 130-134.
KC et al., "Point defects in garnet-type solid electrolyte (c—$Li_7La_3Zr_2O_{12}$) for Li-ion batteries," Solid State Ionics, 2014, vol. 261, pp. 100-105.
Kerman et al. "Review—Practical Challenges Hindering the Development of Solid State Li Ion Batteries", Journal of the Electrochemical Society, 2017, vol. 164. No. 7, pp. A1731-A1744.
Kerman et al., "Complex oxide nanomembranes for energy conversion and storage: A review", Journal of Materials Research, vol. 29, No. 3, Feb. 14, 2014, pp. 320-337.
Kihira et al., "Effect of Simultaneous Substitution of Alkali Metals and Nb in $Li_7La_3Zr_2O_{12}$ on Lithium-Ion Conductivity," ECS Electrochemistry Letters, 2013, vol. 2, No. 7, pp. A56-A59.
Kim et al., "Characterization of the interface between $LiCoO_2$ and $Li_7La_3Zr_2O_{12}$ in an all-solid-state rechargeable lithium battery," Journal of Power Sources, 196, 2011, pp. 764-767.
Kim et al., "Epitaxial growth and lithium ion conductivity of lithium-oxide garnet for an all solid-state battery electrolyte\", Dalton Transactions, 2013, vol. 42, pp. 13112-13117.
Kim et al., "The Effect of Relative Density on the Mechanical Properties of Hot-Pressed Cubic $Li_7La_3Zr_2O_{12}$," J. Am. Ceram. Soc., 2016, pp. 1-8.; DOI: 10.1111/jace.14084.
Klenk et al., "Local structure and dyanmics of lithium garnet ionic conductors: tetragonal and cubic $Li_7La_3Zr_2O_7$," Phys. Chem. Chem. Phys., 2015, vol. 17, pp. 8758-8768.
Kokal et al., "Preparation and characterization of three dimensionally ordered macroporous $Li_5La_3Ta_2O_{12}$ by colloidal crystal templating for all-solid-state lithium-ion batteries," Ceramics International, 2015, vol. 41, pp. 737-741.
Kokal et al., "Sol-gel synthesis and lithium ion conductivity of $Li_7La_3Zr_2O_{12}$ with garnet-related type structure," Solid State Ionics, 2011, vol. 185, pp. 42-46.
Kong et al., "Transparent Ceramics, Topics in Mining," Springer International Publishing Switzerland, 2015, Metallurgy and Materials Engineering, DOI 10.1007/978-3-319-18956-7_2; pp. 29-91.
Kotobuki et al., "Compatibility of $Li_7La_3Zr_2O_{12}$ Solid Electrolyte to All-Solid-State Battery Using Li Metal Anode", Journal of the Electrochemical Society, 2010, vol. 157, No. 10, pp. A1076-A1079.
Kotobuki et al., "Preparation of Sintered $Li_5La_3Nb_2O_{12}$ Garnet-type Li Ion Conductor via Spark Plasma Sintering Synthesis," Int. J. Electroact. Mater. 2014, vol. 2, pp. 17-21.
Kotobuki et al., "Fabrication of all-solid-state lithium battery with lithium metal anode using $Al_2O_3$-added $Li_7La_3Zr_2O_{12}$ solid electrolyte," Journal of Power Sources, 2011, vol. 196, pp. 7750-7754.
Lai et al., "Ultrahigh-Energy-Density Microbatteries Enabled by New Electrode Architecture and Micropackaging Design," Adv. Mater., 2010, vol. 22, pp. E139-E144.
Lallemant et al., "Transparent polycrystalline alumina obtained by SPS: Green bodies processing effect," Journal of the European Ceramic Society, 2012, vol. 32, pp. 2909-2915.
Langer et al., "Syntheis of single phase cubic Al-substituted $Li_7La_3Zr_2O_{12}$ by solid state lithiation of mixed hydroxides," Journal of Alloys and Compounds, 2015, vol. 645, pp. 64-69.
Lau et al., "Density Functional Investigation of the Thermodynamic Stability of Lithium Oxide Bulk Crystalline Structures as a Function of Oxygen Pressure", J. Phys. Chemistry C, 2011, vol. 115, pp. 23625-23633.
Lee et al., "High lithium ion conductivity of $Li_2La_3Zr_2O_{12}$ synthesized by solid state reaction," Solid State Ionics, 2014, vol. 258, pp. 13-17.
Li et al., "Optimizing Li conductivity in a garnet framework," J. Mater. Chem., 2012, vol. 22, pp. 15357-15361.
Li et al., "The reaction of $Li_{6.5}La_3Zr_{1.5}Ta_{0.5}O_{12}$ with water," Solid State Ionics, 2015, vol. 269, pp. 57-61.
Li et al., "W-Doped $Li_7La_3Zr_2O_{12}$ Ceramic Electrolytes for Solid State Li-ion Batteries," Electrochimica Acta, 2015, vol. 180, pp. 37-42.
Liu et al., "High Ion Conductivity in Garnet-type F-doped $Li_7La_3Zr_2O_{12}$," Journal of Inorganic Materials, Sep. 2015, vol. 30, No. 9, pp. 995-1001.

(56) References Cited

OTHER PUBLICATIONS

Liu et al., "Reversible ion exchange and structural stability of garnet-type Nb-doped $Li_7La_3Zr_2O_{12}$ in water for applications in lithium batteries," Journal of Power Sources, 2015, vol. 282, pp. 286-293.
Liu et al., "Achieving high capacity in bulk-type solid-state lithium ion battery based on $Li_{6.75}La_3Zr_{1.75}Ta_{0.25}O_{12}$ electrolyte: Interfacial resistance," Journal of Power Sources, 2016, vol. 324, pp. 349-357.
Matsuda et al., "Phase formation of a garnet-type lithium-ion conductor $Li_{7-x}Al_xLa_3Zr_2O_{12}$," Solid State Ionics, 2015, vol. 277, pp. 23-29.
Matsui et al., "Phase stability of a garnet-type lithium ion conductor $Li_7La_3Zr_2O_{12}$," The Royal Society of Chemistry, Dalton Transactions, 2014, vol. 43, pp. 1019-1024.
Matsui et al., "Phase transformation of the garnet structured lithium ion conductor: $Li_7La_3Zr_2O_{12}$", Solid State Ionics, 2014, vol. 262, pp. 155-159.
McCloskey et al., "On the Mechanism of Nonaqueous $Li-O_2$ Electrochemistry on C and Its Kinetic Overpotentials: Some Implications for Li-Air Batteries", J. Phys. Chemistry C, 2012, vol. 116, pp. 23897-23905.
Miara et al., "Effect of Rb and Ta Doping on the Ionic Conductivity and Stability of the Garnet $Li_{7+2x-y}(La_{3-x}Rb_x)(Zr_{2-y}Ta_y)O_{12}$ ($0 \leq x \leq 0.375$, $0 \leq y \leq 1$) Superionic Conductor: A First Principles Investigation," Chem. Mater. 2013, vol. 25, pp. 3048-3055.
Miara et al., "First-Principles Studies on Cation Dopants and Electrolyte|Cathode Interphases for Lithium Garnets," Chemestry of Materials, 2015, vol. 27, pp. 4040-4047.
Minami et al., "Crystallization Process for Superionic $Li_7P_3S_{11}$ Glass-Ceramic Electrolytes", Journal of the American Ceramic Society, 2011, vol. 94, pp. 1779-1783.
Miyauchi et al., "New Amorphous Thin Films of Lithium Ion Conductive Solid Electrolyte," Solid State Ionics 9 & 10, 1983, pp. 1469-1472.
Mizuno et al., "Environmentally Friendly Flux Growth of High-Quality, Idiomorphic $Li_5La_3Nb_2O_{12}$ Crystals," Cryst. Growth Des., 2013, vol. 13, pp. 479-484.
Moshkovich et al., "The study of the anodic stability of alkyl carbonate solutions by in situ FTIR spectroscopy, EQCM, NMR and MS," Journal of Electroanalytical Chemistry, 2001, vol. 497, pp. 84-96.
Muralidharan et al., "Optimization of process parameters for the production of Ni—Mn—Co—Fe based NTC chip thermistors through tape casting route", Journal of Alloys and Compounds, 2011, vol. 509, pp. 9363-9371.
Murugan et al., "Schnelle Lithiumionenleitung in granatartigem $Li_7La_3Zr_2O_{12}$", Angew. Chem., 2007, vol. 119, pp. 7925-7928, with English translation—"Fast Lithium Ion Conduction in Garnet-Type $Li_7La_3Zr_2O_{12}$", Angew. Chem. Int. Ed., 2007, vol. 46, pp. 7778-7781.
Narayanan et al., "Dopant Concentration-Porosity-Li-Ion Conductivity Relationship in Garnet-Type $Li_{5+2x}La_3Ta_{2-x}Y_xO_{12}$ ($0.05 \leq x \leq 0.75$) and Their Stability in Water and 1 M LiCl," Inorganic Chemistry, 2015, vol. 54, pp. 6968-6977.
Nemori et al., "Stability of garnet-type solid electrolyte $Li_xLa_3A_{2-y}B_yO_{12}$ (A=Nb or Ta, B = Sc or Zr)," Solid State Ionics, 2015, vol. 282, pp. 7-12.
Neudecker et al., "'Lithium-Free' Thin-Film Battery with In Situ Plated Li Anode," Journal of the Electrochemical Society, 2000, vol. 147, No. 2, pp. 517-523.
Ni et al., "Room temperature elastic moduli and Vickers hardness of hot-pressed LLZO cubic garnet," J. Mater. Sci., 2012, vol. 47, pp. 7978-7985.
Nyman et al., "Alternative Approach to Increasing Li Mobility in Li—La—Nb/Ta Garnet Electrolytes," Chem. Mater., 2010, vol. 22, No. 19, pp. 5401-5410.
Office Action of Chinese application No. 201480055387.9 mailing date of Dec. 22, 2016 together with English translation; 7 pages.
Office Action of Japanese application No. 2016-520586 mailing date of Nov. 28, 2017 together with English translation; 8 pages.
Ohta et al., "Co-sinterable lithium garnet-type oxide electrolyte with cathode for all-solid-state lithium ion battery," Journal of Power Sources, 2014, vol. 265, pp. 40-44.
Ohta et al., "High lithium ionic conductivity in the garnet-type oxide $Li_{7-x}La_3(Zr_{2-x}, Nb_x)O_{12}(X=0-2)$," Journal of Power Sources, 2011, vol. 196, pp. 3342-3345.
Ohta et al., "All-solid-state lithium ion battery using garnet-type oxide and $Li_3BO_3$ solid electrolytes fabricated by screen-printing," Journal of Power Sources, vol. 238, 2013, pp. 53-56.
Ohta et al., "Electrochemical performance of an all-solid-state lithium ion battery with garnet-type oxide electrolyte," Journal of Power Sources, vol. 202, 2012, pp. 332-335.
Olenick, "Ultra-Thin Flexible Ceramic Membranes for Electronic Applications", 46th International Symposium on Microelectronics (IMAPS 2013) | Sep. 30-Oct. 3, 2013 | Orlando, FL, USA; 5 pages.
Onodera et al., "Flux Growth of Idiomorphic Garnet-Type Solid Electrolyte Crystals for All-Solid-State Lithium-Ion Rechargeable Batteries," The Electrochemical Society, 2012, Abstract #1198, 1 page.
Park et al., "Effects of crystallinity and impurities on the electrical conductivity of Li—La—Zr—O thin films," Thin Solid Films, 2015, vol. 576, pp. 55-60.
Peng et al., "A Reversible and Higher-Rate $Li-O_2$ Battery", Science, Aug. 3, 2012, vol. 337, pp. 563-567.
Puech et al., "Elaboration and characterization of a free standing LiSICON membrane for aqueous lithiumair battery," Journal of Power Sources, vol. 214, 2012, pp. 330-336.
Quartarone et al., "Electrolytes for solid-state lithium rechargeable batteries: recent advances and perspectives", Chemical Society Reviews, vol. 40, 2011, pp. 2525-2540.
Rahaman, "Ceramic Processing", Kirk-Othmer Encyclopedia of Chemical Technololy, 2014; 98 pages.
Ramakumar et al., "Structure and Li+ dyanmics of Sb-doped $Li_7La_3Zr_2O_{12}$ fast lithium ion conductors," Phys. Chem. Chem. Phys. 2013, vol. 15, pp. 11327-11338.
Ramzy et al., "Tailor-Made Development of Fast Li Ion Conducting Garnet-Like Solid Electrolytes," American Chemical Society, Applied Materials and Interfaces, 2010, vol. 2, No. 2, pp. 385-390.
Rangasamy et al., "A High Conducting Oxide—Sulfide Composite Lithium Superionic Conductor," J. Mater. Chem. A, published 2014, vol. 2, pp. 4111-4116.
Rangasamy et al., "The effect of 24c-site (A) cation substitution on the tetragonal-cubic phase transition in $Li_{7-x}La_{3-x}A_xZr_2O_{12}$ garnet-based ceramic electrolyte," Journal of Power Sources, 2013, vol. 230, pp. 261-266.
Rangasamy et al., "The role of Al and Li concentration on the formation of cubic garnet solid electrolyte of nominal composition $Li_7La_3Zr_2O_{12}$," Solid State Ionics, 2012, vol. 206, pp. 28-32.
Rao et al., "In Situ Neutron Diffraction Monitoring of $Li_7La_3Zr_2O_{12}$ Formation: Toward a Rational Synthesis of Garnet Solid Electrolytes," Chemistry of Materials, 2015, vol. 27, pp. 2903-2910.
Raskovalov et al, "Structure and transport properties of $Li_7La_3Zr_{2-075x}Al_xO_{12}$ supersonic solid electrolytes," Journal of Power Sources, 2013, vol. 238, pp. 48-52.
Rauscher et al. "Steel-sheet fabrication by tape casting, Low Temperature Cofired Ceramics LTCC View project Colloidal Processing View project", International Journal of Powder Metallurgy, vol. 44, No. 6, 2008, 11 pages.
Reed, James S., Principles of Ceramics Processing, 2nd Edition, John Wiley & Sons, Inc., New York, Jan. 1995, pp. 60-61.
Reinacher et al., "Preparation an electrical properties of garnet-type $Li_6BaLa_2Ta_2O_{12}$ lithium solid electrolyte thin films prepared by pulsed laser deposition," Solid State Ionics, 2014, vol. 258, pp. 1-7.
Ren et al., "Direct observation of lithium dendrites inside garnet-type lithium-ion solid electrolyte," Electrochemistry Communications, 2015, vol. 57, pp. 27-30.
Ren et al., "Effects of Li source microstructure and ionic conductivity of Al-contained $Li_{6.75}La_3Zr_{1.75}Ta_{0.25}O_{12}$ cermics," Journal of the European Ceramic Society, 2015, vol. 35, pp. 561-572.
Reppert T. et al., "$Li_7La_3Zr_2O_{12}$ electrolyte for all-solid-state batteries", Future Energy, Oct. 17, 2014, pp. 1-1, XP055813972, Retrieved from the Internet: URL:https://juser.fz-juelich.de/record/171892/files/FZJ-2014-05448.pdf [retrieved on Jun. 15, 2021].

(56) References Cited

OTHER PUBLICATIONS

Reppert T. et al., "Oxide-ceramic electrolyte layers for all-solid-state lithium batteries", Jan. 21, 2015, pp. 1-1, XP055814028, Retrieved from the Internet: URL:https://juser.fz-juelich.de/record/188042/files/FZJ-2015-01520.pdf.

Rettenwander et al., "Site Occupation of Ga and Al in Stabilized Cubic $Li_{7-3(x+y)}Ga_xAl_yLa_3Zr_2O_{12}$ Garnets as Deduced from $^{27}Al$ and $^{71}Ga$ MAS NMR at Ultrahigh Magnetic Fields," Chemistry of Materials, 2015, vol. 27, pp. 3135-3142.

Rettenwander et al., "Synthesis, Crystal Chemistry, and Electrochemical Properties of $Li_{7-2x}La_3Zr_{2-x}Mo_xO_{12}$ (x=0.1-0.4): Stabilization of the Cubic Garnet Polymorph via Substitution of $Zr^{4+}$ by $Mo^{6+}$," Inorganic Chemistry, 2015, vol. 54, pp. 10440-10449.

Rettenwander et al., "DFT study of the role of $Al^{3+}$ in the fast ion-conductor $Li_{7-3x}Al^{3+}{}_xLa_3Zr_2O_{12}$ Garnet," Chem. Mater. 2014, vol. 26, pp. 2617-2623.

Rosero-Navarro et al., "Preparation of $Li_7La_3(Zr_2-x,Nb_x)O_{12}$ (x=0-1.5) and $Li_3BO_3/LiBO_2$ composites at low temperatures using a sol-gel process," Solid State Ionics, 2016, vol. 285, pp. 6-12.

Sakamoto et al., "Synthesis of nano-scale fast ion conducting cubic $Li_7La_3Zr_2O_{12}$", Nanotechnology, 2013, vol. 24, 424005, 8 pages.

Sakamoto, Jeff, "Garnet-based ceramic electrolyte: Enabling Li metal anodes and solid state batteries," Beyond Lithium Ion VI, Jun. 4-6, 2013, Boulder, CO., 36 pages.

Sakuda et al., "Evaluation of elastic modulus of $Li_2S$—$P_2S_5$ glassy solid electrolyte by ultrasonic sound velocity measurement and compression test", Journal of the Ceramic Society of Japan 121, 2013, pp. 946-949.

Schafbauer et al., "Tape Casting as a Multi Purpose Shaping Technology for Different Applications in Energy Issues", Materials Science Forum vols. 706-709, 2012, pp. 1035-1040.

Schmidt et al., "In-situ, non-destructive acoustic characterization of solid state electrolyte cells", Journal of Power Sources, 2016, vol. 324, pp. 126-133.

Second Office Action of Chinese Application No. 201480055386.4 mailing date of Nov. 1, 2017 together with English translation, 10 pages.

Sharafi et al., "Characterizing the $Li$—$Li_7La_3Zr_2O_{12}$ interface stability and kinetics as a function of temperature and current density," Journal of Power Sources, 2016, vol. 302, pp. 135-139.

Shimonishi et al., "Synthesis of garnet-type $Li_{7-x}La_3Zr_2O_{12-1/2x}$ and its stability in aqueous solutions," Solid State Ionics, 2011, vol. 183, pp. 48-53.

Shin et al., "Synergistic multi-doping effects on the $Li_7La_3Zr_2O_{12}$ solid electrolyte for fast lithium ion conduction," Scientific Reports, 5:18053; DOI: 10.1038/srep18053, 2015, pp. 1-9.

Song et al., "Crystal structure, migration mechanism and electrochemical performance of Cr-stabilized garnet," 2014, vol. 268, pp. 135-139.

Suárez et al., "Sintering to Transparency of Polycrystalline Ceramic Materials", Mar. 2012, ISBN: 978-953-51-0017-1, 28 pages; InTech, Available from: http://www.intechopen.com/books/sintering-of-ceramics-new-emerging-techniques/sintering-to-transparencyof-polycrystalline-ceramic-materials.

Sudo et al., "Interface behavior between garnet-type lithium-conducting solid electrolyte and lithium metal," Solid State Ionics, 2014, vol. 262, pp. 151-154.

Suzuki et al., "Transparent cubic garnet-type solid electrolyte of $Al_2O_3$-doped $Li_7La_3Zr_2O_{12}$," Solid State Ionics, 2015, vol. 278, pp. 172-176.

Tadanaga et al., "Low temperature synthesis of highly ion conductive $Li_7La_3Zr_2O_{12}$—$Li_3BO_3$ composites," Electrochemistry Communications, 2013, vol. 33, pp. 51-54.

Takada, "Progress and prospective of solid-state lithium batteries", Acta Materialia 61, 2013, pp. 759-770.

Takeda et al., "High Pressure Form of Fluoride Garnets $Na_3M_2Li_3F_{12}$ (M=& Fe)," Mat. Res. Bull., 1977, vol. 12, No. 7, pp. 689-692.

Tan et al., "Fabrication and characterization of $Li_7La_3Zr_2O_{12}$ thin films for lithium ion battery," ECS Solid Sate Letters, vol. 1, No. 6, Oct. 3, 2012, pp. Q57-Q60.

Teng, Shiang, et al., "Recent Developments in garnet based solid state electrolytes for thin film batteries," Current Opinion in Solid State and Materials Science, Feb. 2014, vol. 18, Issue 18, pp. 29-38.

Thangadurai et al., "Fast Solid-State Li Ion Conducting Garnet-Type Structure Metal Oxides for Energy Storage," J. Phys. Chem. Lett., 2015, vol. 6, pp. 292-299.

Thangadurai et al., "$Li_6Ala_2N O_{12}$ (A=Ca, Sr, Ba): A New Class of Fast Lithium Ion Conductors with Garnet-Like Structure," J. Am. Ceram. Soc., 2005, vol. 88, No. 2, pp. 411-418.

Thangadurai et al., "Novel Fast Lithium Ion Conduction in Garnet-Type $Li_5La_3M_2O_{12}$ (M=NB, Ta)," J. Am. Ceram. Soc., 2003, vol. 86, No. 3, pp. 437-440.

Thangadurai et al., "Garnet-type solid-state fast Li ion conductors for Li batteries: critical review", Chemical Society Reviews, 2014, vol. 43, pp. 4714-4727.

Thompson et al., "A Tale of Two Sites: On Defining the Carrier Concentration in Garnet-Based Ionic Conductors for Advanced Li Batteries," Adv. Energy Mater., 2015, 1500096, pp. 1-9.

Toda, S., et al., "Low temperature cubic garnet-type $CO_2$-doped $Li_7La_3Zr_2O_{12}$," Solid State Ionics, 2013, vol. 233, pp. 102-106.

Tong et al., "Highly Conductive Li Garnets by a Multielement Doping Strategy", Inorganic Chemistry, 2015, vol. 54, pp. 3600-3607.

Ulissi, Ulderico et al., "All solid-state battery using layered oxide cathode, lithium-carbon composite anode and thio-LISICON electrolyte," Solid State Ionics, vol. 296, 2016, pp. 13-17.

Wainwright et al., "Forces generated by anode growth in cylindrical $Li/MoS_2$ cells," Journal of Power Sources, 1991, vol. 34, pp. 31-38.

Wang et al., "Correlation and mechanism of lithium ion diffusion with the crystal strcutre of $Li_7La_3Zr_2O_{12}$ revealed by an internal friction technique," Phys. Chem. Chem. Phys., 2014, vol. 16, pp. 7006-7014.

Wang et al., "The synergistic effects of al and Te on the structure and Li+-mobility of garnet-type solid electrolytes", Mater. Chem. A. 2014, vol. 2, pp. 20271-20279.

Wang et al., "A general method to synthesize and sinter bulk ceramics in seconds", Science 368, (2020) May 1, 2020, pp. 521-526.

Wang et al., "Transparent ceramics: Processing, materials and applications," Progress in Solid State Chemistry, 2013, vol. 41, pp. 20-54.

Wang, Dawei et al., "Toward Understanding the Lithium Transport Mechanism in Garnet-type Solid Electrolytes: Li+ Ion Exchanges and Their Mobility at Octahedral/Tetrahedral Sites," Chem. Mater. 2015, vol. 27, pp. 6650-6659.

Wang, Shutao et al., "Syntheses and structures of lithium zirconates for high-temperature $CO_2$ absorption," J. Mater. Chem. A, 2013, vol. 1, pp. 3540-3550.

Wang, Yuxing et al., "Phase transition in lithium garnet oxide ionic conductors $Li_7La_3Zr_2O_{12}$: The role of Ta substitution and $H_2O/CO_2$ exposure," Journal of Power Sources, 2015, vol. 275, pp. 612-620.

Wilkinson et al., "Effects of physical constraints on Li cycability," Journal of Power Sources, 1991, vol. 36, pp. 517-527.

Willmann et al., "Characteristics and Evaluation Criteria of Substrate-based Manufacturing. Is roll-to roll the best solution for printed electronics?", Organic Electronics, 2014, vol. 15, pp. 1631-1640.

Wolfenstine et al., "A preliminary investigation of fracture toughness of $Li_7La_3Zr_2O_{12}$ and its comparisoin to other solid Li-ion conductors," Materials Letters, 2013, vol. 96, pp. 117-120.

Wolfenstine et al., "Chemical stability of cubic $Li_7La_3Zr_2O_{12}$ with molten lithium at elevated temperature", J. Mater. Sci., 2013, vol. 48, pp. 5846-5851. DOI 10.1007/s10853-013-7380-z.

Xie et al., "Lithium Distribution in Aluminum-Free Cubic $Li_7La_3Zr_2O_{12}$", issued on Chem. Mater. 2011, vol. 23, pp. 3587-3589.

Xie et al., "Low-temperature synthesis of $Li_7La_3Zr_2O_{12}$ with cubic garnet-type structure," Materials Research Bulletin, 2012, vol. 47, pp. 1229-1232.

Xu et al., "Multistep sintering to synthesize fast lithium garnets," Journal of Power Sources, 2016, vol. 302, pp. 291-297.

Yang et al., "Nanostructured Garnet-Type Solid Electrolytes for Lithium Batteries: Electrospinning Synthesis of $Li_7La_3Zr_2O_{12}$ Nanowires

(56) References Cited

OTHER PUBLICATIONS and Particle Size-Dependent Phase Transformation", J.Physical Chemistry C, 2015, vol. 119, pp. 14947-14953.

Yang et al., "Tape-casted transparent alumina ceramic wafers", J. Mater. Res., Oct. 14, 2014, vol. 29, No. 19, pp. 2312-2317.

Yi et al., "Key parameters governing the densification of cubic-$Li_7La_3Zr_2O_{12}$ Li+conductors", Journal of Power Sources, Elsevier SA, CH, vol. 352, Mar. 31, 2017, pp. 156-164.

Yi et al., "Flame made nanoparticles permit processing of dense, flexible, Li+ conducting ceramic electrolyte thin films of cubic-$Li_7La_3Zr_2O_{12}$ (c-LLZO)", J. Mater. Chem. A, 2016, vol. 4, pp. 12947-12954.

Yoshima et al., "Thin hybrid electrolyte based on garnet-type lithium-ion conductor $Li_7La_3Zr_2O_{12}$ for 12 V-class bipolar batteries," Journal of Power Sources, 2016, vol. 302, pp. 283-290.

Yu et al., "Experimental determination of the uniaxial viscosity of low-temperature co-fired ceramic tapes by vertical sintering", Ceramics International, 2014, vol. 40, pp. 9367-9375.

Zaiß et al., "Fast ionic conduction in cubic hafnium garnet $Li_7La_3Hf_2O_{12}$," Ionics, Springer-Verlag, 2010, vol. 16, pp. 855-858.

Zhang et al., "Effect of lithium ion concentration on the microstructure evolution and its association with the ionic conductivity of cubic garnet-type nominal $Li_7Al_{0.25}La_3Zr_2O_{12}$ solid electrolytes", Solid State Ionics, 2016, vol. 284, pp. 53-60.

Zhang et al., "Field assisted sintering of dense Al-substituted cubic phase $Li_7La_3Zr_2O_{12}$ solid electrolytes", Journal of Power Sources, 2014, vol. 268, pp. 960-964.

Zhang et al., "Preparation of cubic $Li_7La_3Zr_2O_{12}$ solid electrolyte using a nano-sized core-shell structured precursor", Journal of Alloys and Compounds, 2015, vol. 644, pp. 793-798.

Lu et al., "Electrochemical performance of $LiCoO_2$ cathodes by surface modification using lanthanum aluminum garnet", Journal of Power Sources 184 (2008) 392-401; doi:10.1016/j.jpowsour.2008.04.087.

Awaka et al., "Synthesis and structure analysis of tetragonal $Li_7La_3Zr_2O_{12}$ with the garnet-related type structure", Journal of Solid State Chemistry 182 (2009) 2046-2052.

LITHIUM-STUFFED GARNET ELECTROLYTES WITH A REDUCED SURFACE DEFECT DENSITY AND METHODS OF MAKING AND USING THE SAME

CROSS-REFERENCE TO RELATED APPLICATION

This application is a continuation application of patent application Ser. No. 16/343,361, filed Apr. 18, 2019, which is a National Stage filing under 35 U.S.C. § 371 of International Patent Application No. PCT/US2017/057462, filed Oct. 19, 2017, which claims the benefit of, and priority to and the benefit of U.S. Provisional Application No. 62/411,476, filed on Oct. 21, 2016, which is incorporated by reference herein in its entirety for all purposes.

BACKGROUND

In a rechargeable $Li^+$ ion battery, $Li^+$ ions move from a negative electrode to a positive electrode during discharge and in the opposite direction during charge. This process produces electrical energy (Energy=Voltage×Current) in a circuit connecting the electrodes, which is electrically insulated from, but parallel to, the $Li^+$ ion conduction path. The battery's voltage (V versus Li) is a function of the chemical potential difference for Li situated in the positive electrode as compared to the negative electrode and is maximized when Li metal is used as the negative electrode. An electrolyte physically separates and electrically insulates the positive and negative electrodes while also providing a conduction medium for $Li^+$ ions. The electrolyte ensures that when Li metal oxidizes at the negative electrode during discharge (e.g., $Li \leftrightarrow Li^+ + e^-$) and produces electrons, these electrons conduct between the electrodes by way of an external circuit which is not the same pathway taken by the $Li^+$ ions.

Conventional rechargeable batteries use liquid electrolytes to separate the positive and negative electrodes. However, liquid electrolytes suffer from several problems including flammability during thermal runaway, outgas sing at high voltages, and chemical incompatibility with lithium metal negative electrodes. As an alternative, solid electrolytes have been proposed for next generation rechargeable batteries. For example, $Li^+$ ion-conducting ceramic oxides, such as lithium-stuffed garnets, have been considered as electrolyte separators. See, for example, US Patent Application Publication No. 2015/0099190, published Apr. 9, 2015, and filed Oct. 7, 2014, titled GARNET MATERIALS FOR LI SECONDARY BATTERIES AND METHODS OF MAKING AND USING GARNET MATERIALS; U.S. Pat. Nos. 8,658,317; 8,092,941; and 7,901,658; also US Patent Application Publication Nos. 2013/0085055; 2011/0281175; 2014/0093785; and 2014/0170504; also Bonderer, et al. "Free-Standing Ultrathin Ceramic Foils," Journal of the American Ceramic Society, 2010, 93(11):3624-3631; and Murugan, et al., *Angew Chem. Int. Ed.* 2007, 46, 7778-7781), the entire contents of each of these publications are incorporated by reference in their entirety for all purposes.

Solid electrolytes tend to reduce a battery's total weight and volume, when compared to a liquid electrolyte, and thereby increase its gravimetric and volumetric energy density. Despite these advantages, solid electrolytes are still insufficient in several regards for commercial applications. Notably, solid electrolytes tend to include defects, pores, vacancies, uneven or rough surfaces, and other inhomogeneous, non-uniform features which researchers find correlate with the formation of Li-dendrites, when these electrolytes are used in electrochemical cells. A challenge in the relevant field has been to prepare such solid electrolytes absent the aforementioned defects which conduct $Li^+$ ions without producing Li-dendrites.

Some solid separators are known and some separators are made with some techniques which tend to reduce the number of defects in these separators. See, for example, Kotobuki, M. et. al. *Int. J. Electroact. Mater.* 2 (2014) 17-21 (hereinafter "Kotobuki"); Ahmad, M. M. *Nanoscale Research Letters*, doi:10.1186/s11671-015-0777-7 (hereinafter "Ahmad"); Baek, S-W, et al.; Journal of Power Sources 249 (2014) 197-206; Botros, M. et al., Journal of Power Sources 309 (2016) 108e115; Zhang, Y. et al., Journal of Power Sources 268 (2014) 960-964; Zhang, Y. et al., Solid State Ionics 284 (2015) 53-60; Suzuki, et al. *Solid State Ionics*, 278 (2015) 172-176; Tu, Z., et al., *Adv. Energy Mater.* 2014, 4, 1300654, DOI: 10.1002/aenm.201300654; www.ikts.fraunhofer.de/content/dam/ikts/en/images/publications/jahresberichte/jb2013/11_3_Gelcasting_-_A_shapeing_method_for_particularly_defect-free_ceramic_parts.pdf; and J. Ni et al., *J Mater Sci*, 47, 7978 (2012). However, these techniques suffer from a variety of deficiencies including a surface quality that is insufficient to resist catastrophic lithium dendrite formation at useful charge rates when the separators are used in electrochemical cells. For example, Ahmad and Kotobuki's results demonstrate a conductivity of $6 \times 10^{-6}$ S/cm, which is at least 100 times lower than the requirement for automotive applications.

There is therefore a need for improved materials and methods for making defect-free solid electrolytes. What is needed are, for example, new separators, e.g., a thin-film lithium-stuffed garnet separator which are defect-free at the surface which interfaces with the lithium metal anode in an electrochemical cell, as well as methods for making and using the same. The instant disclosure provides solutions to some of these problems in the relevant field as well new separators for $Li^+$ rechargeable batteries.

SUMMARY

In a first embodiment, set forth herein is a separator that includes a lithium-stuffed garnet oxide and has top and bottom surfaces and a bulk therebetween, wherein either or both of the top or bottom surfaces has a lower surface defect density than does the bulk. By reducing the density of defects at a surface of such an oxide thin film, the surface can interface with Li metal without leading to Li dendrites when the thin film is used as a separator in an electrochemical cell, for example at useful charge rates that meet commercial automotive requirements.

In a second embodiment, set forth herein is a thin film lithium-stuffed garnet electrolyte, wherein the thin film is substantially homogenous within x- and y-dimensions (i.e., x- and y-axis), but wherein the thin film is inhomogeneous with respect to the z-dimension (i.e., z-axis).

In a third embodiment, set forth herein is an electrochemical stack which includes a cathoade, an anode, and a separator, e.g., a thin film described herein or one made by a process described herein.

In a fourth embodiment, set forth herein is a process for making a solid electrolyte, wherein the process includes providing lithium-stuffed garnet chemical precursors or calcined lithium-stuffed garnet, wherein the lithium-stuffed garnet chemical precursors or calcined lithium-stuffed garnet are provided having a narrow particle size distribution.

The process also includes shaping the lithium-stuffed garnet chemical precursors or calcined lithium-stuffed garnet into a thin film form factor, and sintering the lithium-stuffed garnet chemical precursors or calcined lithium-stuffed garnet using spark plasma sintering (SPS) to provide a sintered lithium-stuffed garnet thin film.

In a fourth embodiment, set forth herein is a process for making a solid electrolyte, wherein the process includes providing lithium-stuffed garnet chemical precursors or calcined lithium-stuffed garnet, wherein the lithium-stuffed garnet chemical precursors or calcined lithium-stuffed garnet are provided having a narrow particle size distribution. The process also includes shaping the lithium-stuffed garnet chemical precursors or calcined lithium-stuffed garnet into a thin film or monolith form factor, and sintering the lithium-stuffed garnet chemical precursors or calcined lithium-stuffed garnet using spark plasma sintering (SPS) to provide a sintered lithium-stuffed garnet thin film or monolith In a fifth embodiment, set forth herein is a method for selectively reducing the number and/or size of surface-pores and defects on a lithium-stuffed garnet separator, wherein the method includes (step 1) providing a sintered separator comprising a lithium-stuffed garnet, (step 2) heating the top and/or bottom surfaces of the separator above the melting temperature; and (step 3) rapidly cooling the separator below the melting temperature.

In a sixth embodiment, set forth herein is a method for using an electrochemical cell having as an electrolyte a separator or the thin film described herein or made by a process described herein, wherein the method includes charging and discharging the electrochemical cell under controlled temperature and/or pressure conditions, wherein the temperature and or pressure conditions are determined by the defect density in the separator or thin film.

In a seventh embodiment, set forth herein is a method of discharging or charging an electrochemical cell which includes a separator or a thin film described herein or an electrochemical stack described herein, wherein the method includes discharging or charging the electrochemical cell below a critical current, wherein the critical current is a function of the pore aspect ratio of the defects on the top or bottom surface of the separator or thin film, above a critical temperature, wherein the critical temperature is a function of the pore aspect ratio of the defects on the top or bottom surface of the separator or thin film, and/or above a critical pressure, wherein the critical pressure is a function of the pore aspect ratio of the defects on the top or bottom surface of the separator or thin film.

BRIEF DESCRIPTIONS OF THE DRAWINGS

DETAILED DESCRIPTION

I. General Description

Figure 1:
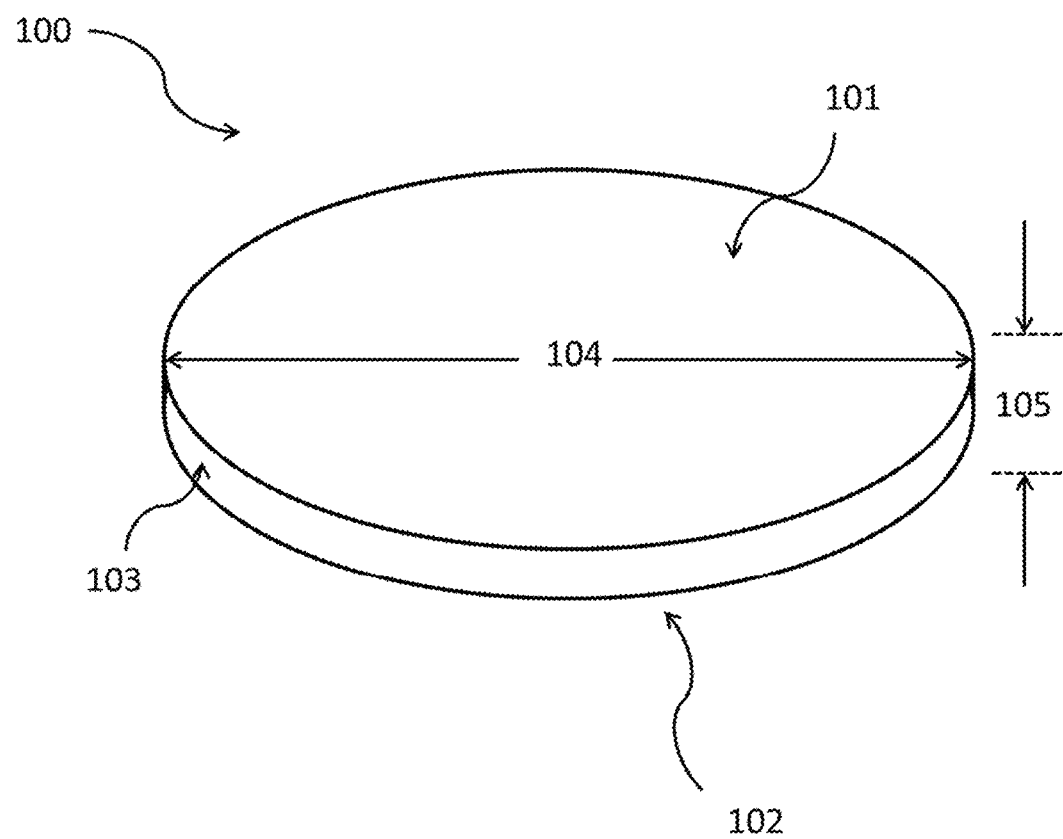
FIG. 1 shows a top-down view of a disc-shaped form factor for a solid-state electrolyte set forth herein.

Set forth herein are new materials which are useful as anolytes, electrolytes, and catholytes in rechargeable batteries, including $Li^+$ ion rechargeable batteries which include a lithium metal negative electrode (i.e., anode). Also set forth herein are methods of making these materials, including methods of reducing the density of defects at a surface or at more than one surface of a solid thin film, pellet, or monolith of an oxide such as but not limited to a lithium-stuffed garnet. By reducing the density of defects at a surface of such an oxide thin film, pellet, or monolith, the surface can interface with Li metal without leading to Li dendrites when the thin film, pellet, or monolith is used as a separator in an electrochemical cell. Also described herein are methods of using these materials including methods of using rechargeable batteries which incorporate these materials as an anolyte, electrolyte, or catholyte. As detailed below, in some examples, the methods herein including charging and discharging a rechargeable battery under pressurized conditions, wherein the battery includes a separator having a reduced density of defects at a surface or at more than one surface when compared to the density of defects in the bulk.

Set forth herein are new materials which are useful as anolytes, electrolytes, and catholytes in rechargeable batteries, including $Li^+$ ion rechargeable batteries which include a lithium metal negative electrode (i.e., anode). Also set forth herein are methods of making these materials, including methods of reducing the density of defects at a surface or at more than one surface of a solid thin film, or pellet of an oxide such as but not limited to a lithium-stuffed garnet. By reducing the density of defects at a surface of such an oxide thin film, or pellet, the surface can interface with Li metal without leading to Li dendrites when the thin film, or pellet is used as a separator in an electrochemical cell. Also described herein are methods of using these materials including methods of using rechargeable batteries which incorporate these materials as an anolyte, electrolyte, or catholyte. As detailed below, in some examples, the methods herein including charging and discharging a rechargeable battery under pressurized conditions, wherein the battery includes a separator having a reduced density of defects at a surface or at more than one surface when compared to the density of defects in the bulk.

In some examples, set forth herein is a thin electrolyte separator, having top and bottom surfaces and a thickness therebetween, wherein the top or bottom surface length or width is greater than the thickness by a factor of ten (10) or more, and the thickness is from about 10 nm to about 100 μm. In some examples, the electrolyte bulk is characterized by the chemical formula $Li_xLa_3Zr_2O_{12} \cdot y(Al_2O_3)$, wherein $3 \leq x \leq 8$ and $0 \leq y \leq 1$. In some examples, the top or bottom surface is characterized as having a layer thereupon, greater than 1 nm and less than 1 μm, comprising a lithium carbonate, lithium hydroxide, lithium oxide, lithium peroxide, a hydrate thereof, an oxide thereof, or a combination thereof.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the inventions herein are not intended to be limited to the embodiments presented, but are to be accorded their widest scope consistent with the principles and novel features disclosed herein.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

II. Definitions

If a definition provided in any material incorporated by reference herein conflicts with a definition provided herein, the definition provided herein controls.

As used herein, use of the singular herein includes the plural and vice versa unless expressly stated to be otherwise. That is, "a" and "the" refer to one or more of whatever the word modifies. For example, "a battery" may refer to one battery, two batteries, etc. Likewise, "the battery" may refer to one, two or more batteries.

As used herein, the term "about," when qualifying a number, e.g., about 15% w/w, refers to the number qualified and optionally the numbers included in a range about that qualified number that includes ±10% of the number. For example, about 15% w/w includes 15% w/w as well as 13.5% w/w, 14% w/w, 14.5% w/w, 15.5% w/w, 16% w/w, or 16.5% w/w. For example, "about 75° C.," includes 75° C. as well 68° C., 69° C., 70° C., 71° C., 72° C., 73° C., 74° C., 75° C., 76° C., 77° C., 78° C., 79° C., 80° C., 81° C., 82° C., or 83° C.

As used herein, "selected from the group consisting of" refers to a single member from the group, more than one member from the group, or a combination of members from the group. A member selected from the group consisting of A, B, and C includes, for example, A only, B only, or C only, as well as A and B, A and C, B and C, as well as A, B, and C.

As used herein, the terms "separator," and "Li+ ion-conducting separator," are used interchangeably with separator being a short-hand reference for Li+ ion-conducting separator, unless specified otherwise explicitly. A separator refers to an solid electrolyte which conducts $Li^+$ ions, is substantially insulating to electrons, and is suitable for use as a physical barrier or spacer between the positive and negative electrodes in an electrochemical cell or a rechargeable battery. A separator, as used herein, is substantially insulating to electrons when the separator's lithium ion conductivity is at least $10^3$ times, and typically $10^6$ times, greater than the separator's electron conductivity. Unless explicitly specified to the contrary, a separator as used herein is stable when in contact with lithium metal.

As used herein, the term "thin film," refers to a continuous sheet of a substance, e.g., a lithium-stuffed garnet oxide, that may or may not be in contact with a substrate. As used herein the phrase "free-standing thin film," refers to a film that is not adhered or supported by an underlying substrate. Films are often formed via a continuous process like tape casting. In some examples, a free-standing thin film is a film that is self-supporting, which can be mechanically manipulated or moved without need of substrate adhered or fixed thereto. As used herein, a "thickness" by which a film is characterized refers to the distance, or median measured distance, between the top and bottom faces of a film. As used herein, the top and bottom faces refer to the sides of the film having the largest total surface area. A thin film is a film having a thickness less than 200 μm and greater than the thickness of the atoms which constitute the film. As used herein, electrolyte separator thickness is measured by cross-sectional scanning electron microscopy.

As used herein, the term "monolith," refers to a separator having a film format and a density which is at least as dense as a film, but wherein the monolith is thicker than a thin film by at least a factor of two (2) or more. A monolith is to be distinguished from a composite in that a composite includes more than one type of material whereas a monolith is homogeneous and made of a single type of material.

As used herein, the term "pellet" refers to a small unit of bulky material compressed into any of several shapes and sizes, e.g., cylindrical, rectangular, or spherical. The compressed material is disc-shaped and may be 5-20 cm in diameter and 0.5 to 2 cm in height. Typically, the compressed material is disc-shaped and 10 cm in diameter and 1 cm in height. Pellets may also include additional agents to help bind the material compressed into the pellet. In some examples, these additional agents are referred to as binding agents and may include, but are not limited to, polymers such as poly(ethylene)oxide. In some examples, polyvinyl butyral is used as a binding agent. Pellets are typically made by pressing a collection of powder materials in a press. This pressing makes the powder materials adhere to each other and increases the density of the collection of powder material when compared to the density of the collection of powder material before pressing. In some instances, the powder material is heated and/or an electrical current is passed through the powder material during the pressing.

As used herein, the term "anolyte," refers to an electrolyte which is positioned between a negative electrode and an electrolyte, wherein the electrolyte and the negative electrode are not in direct contact with each other.

As used herein, the term "surface" refers to a material, or portion of a material, that is near or at an interface between two different phases, chemicals, or states of matter. A surface is the area of contact between two different phases or states of matter (e.g., solid-gas, liquid-gas, or solid-liquid). For example, the interface of two solids which are in direct contact with each other is a surface. For example, a thin film garnet separator when exposed to air has a surface described by the periphery or outside portion of the separator which contacts the air. For rectangular-shaped separators, there is a top and a bottom surface which both individually have higher total surface areas than each of the four side surfaces individually. In this rectangular-shaped separator example, such as the example shown in FIG. 3 and FIG. 4 there are four side surfaces which have total surface areas less than either or both of the top and bottom surfaces. For a disc-shaped separator, such as the example shown in FIG. 1 and FIG. 2, there is a top and a bottom surface which both individually have higher surface areas than the circumference-side of the disc-shaped separator. When used as an electrolyte in an electrochemical cell, either the top or bottom surface is the surface of the separator which directly contacts the negative electrode (e.g., Li metal), the positive electrode (i.e. cathode or catholyte in the cathode), and/or a layer or adhesive bonding agent disposed between the separator and the positive electrode. A surface is defined by an area that has larger, or more extended, x- and y-axis physical dimensions that it does z-axis physical dimensions, wherein the z-axis dimension is perpendicular to the surface. The depth, roughness or thickness of a surface can be of a molecular order of magnitude or up to 1, 2, 3, 4, or 5 µm. Oxide surfaces may include dangling bonds, excess hydroxyl groups, bridging oxides, or a variety of other species which result in the oxide's surface or terminating edges to be characterized by a chemical composition that may be stoichiometrically different from the bulk. For example, in some of the separators set forth herein, the bulk is characterized by a chemical formula of $Li_xLa_7Zr_2O_{12} \cdot aAl_2O_3$ and the surface is characterized by a chemical formula of $Li_yLa_7Zr_2O_{12} \cdot aAl_2O_3$, wherein, x is greater than y. In some examples, x may be from 5.9 to 7.0. In some examples, y may be from 5.8 to 7.0. In some examples, the ratio of x/y is such that $1.001 \leq x/y \leq 1.1$. In some examples, coefficient a is 0.1, 0.2, 0.3, 0.4, 0.5, 0.6, 0.7, 0.8, 0.9, or 1.0. In some examples, a is in the range of 0.1 to 1.0. In some examples, a is in the range of 0.1 to 0.5. In some examples, a is in the range of 0.4 to 1.0.

As used herein, the term "top and bottom surfaces," refer to the two surfaces that have the largest total surface area for a material having more than two surfaces. For example, a rectangle has six surfaces—four side surfaces and one top and one bottom surface. In such a rectangle, there is one top and one bottom surface which are parallel to each other. In a rectangle, there are four side surfaces which are perpendicular to both the top and bottom surfaces. In a rectangle, the top and bottom surfaces individually have a larger total surface area than the total surface area of each of the four side surfaces individually.

As used herein, surface roughness refers to a measurement of either an arithmetic average of absolute values of sampled surface roughness amplitudes or a measurement of the maximum peak height of sampled surface roughness amplitudes. Herein, surface roughness amplitude refers to the deviations, above or below, in the direction normal to an ideal surface. As used herein, the term, "Ra," is a measure of surface roughness wherein Ra is an arithmetic average of absolute values of sampled surface roughness amplitudes. Surface roughness measurements can be accomplished using, for example, a Keyence VK-X100 instrument that measures surface roughness using a laser. As used herein, the term, "Rt," is a measure of surface roughness wherein Rt is the maximum peak height of sampled surface roughness amplitudes.

As used herein, the term "bulk," refers to a portion or part of a material that is extended in space in three-dimensions by at least 1 micron (µm). The bulk refers to the portion or part of a material which is exclusive of its surface, as defined above.

As used herein, the term "defect" refers to an imperfection or a deviation from a pristine structure. A defect includes a portion of a material that interacts with, absorbs, scatters, reflects, or refracts light, differently than does the rest of the material. Defects may include, but are not limited to, a pore, a grain boundary, a dislocation, a crack, a separation, a chemical inhomogeneity, a pitting, an inclusion, an included pore, a divot, an atomic vacancy, a phase segregation of two or more materials in a solid material, a cavity, a twinned grain, a non-planarity in an otherwise planar surface, the presence of a second phase in a lithium-stuffed garnet, wherein second phase is a phase other than cubic lithium-stuffed garnet. A perfect crystal is an example of a material that lacks defects. A nearly 100% dense oxide electrolyte that has a planar surface, with substantially no pitting, inclusions, cracks, pores, or divots on the surface, is an example of an electrolyte that is substantially lacking in defects. Defects can include a second phase inclusion, e.g., a $LiAlO_2$ phase inside a $Li_7La_3Zr_2O_{12} \cdot aAl_2O_3$ electrolyte. Defects can include a grain boundary. Defects can include a vacant space between adjacent grains, wherein the separation of the vacant space is greater than 10 nm. Defects can include a site of crystal grain twinning. Defects can include a crystal dislocation in a crystalline material.

As used herein, the phrase "surface defect," refers a defect, as defined above, which intersects the top or bottom surface.

As used herein, the term "surface defect density," unless specified otherwise or to the contrary refers to an areal surface defect density which is the density per surface area which is in units of (# of defects)/($m^2$), wherein m is meters.

As used herein, the term "surface-pore," refers to a pore that is located at a surface or is in direct contact with a surface. In some examples a surface-pore is a pore which intersects the top or bottom surface.

As used herein, the phrase "pore aspect ratio" refers to the ratio extent/hydrodiam$_{80}$, where extent refers to the maximum Euclidean distance between any two points within the pore, and hydrodiam$_{80}$ refers to the $80^{th}$ percentile of the hydraulic diameter. A hydraulic diameter for a given cross section is 4*area/perimeter of a cross section where cross sections are rastered over the pore. The pore aspect ratio is calculated by a 3D reconstruction measured via, for example, X-ray tomography.

As used herein, the phrase "ninety-ninth ($99^{th}$) percentile pore aspect ratio of the pores," means a pore aspect ratio wherein 99 percent of the pores in the separator have a lower or smaller aspect ratio than the ninety-ninth ($99^{th}$) percentile pore aspect ratio. $99^{th}$ percentile means the tail end of a histogram of aspect ratios where only 1% of pores have a higher aspect ratio than the pore in the 99$^{th}$ percentile.

As used herein, the phrase "defect density," refers to the volumetric density of defects. For example, if the defect in a primary phase is a second phase inclusion, and the second phase inclusion occupies 10% of the volume of the primary phase in which the secondary phase is, then the defect density is 10% by volume.

As used herein, the phrase "density as determined by geometric measurements," refers to measurements of density obtained by physical mass and volume measurements. Density is determined by the ratio of measured mass to the measured volume. Customary techniques including the Archimedes method have been employed for such determinations.

As used herein, the phrase "density as determined by scanning electron microscopy (SEM)," refers to the analysis of scanning electron microscopy (SEM) images. This analysis includes measuring the relative amounts of the electrolyte separator which are porous or vacant with respect to the electrolyte separator which is fully dense. The SEM images useful for this analysis include those obtained by SEM cross-sectional analysis using focused ion beam (FIB) milling.

As used herein, the phrase "porosity as determined by SEM," refers to measurement of density by using an image analysis software. First, a user or software assigns pixels and/or regions of an image as porosity. Second, the area fraction of those regions is summed. Finally, the porosity fraction determined by SEM is equal to the area fraction of the porous region of the image. A 100% dense material would have no porosity as measured by this method. A porosity less than 100% indicates that some porosity is present within the material measured.

As used herein, the phrase "geometric porosity," refers to fractional volume attributed to pore space, calculated by measuring the geometric density and dividing by the theoretical crystalline density, and subtracting that quotient from the number, 1.

As used herein, the phrase "density as measured by the Archimedes method," refers to a density inclusive of closed porosity but exclusive of open porosity. The dimensions of a dry part are measured and the volume is calculated and recorded as $V_d$; the mass of the dry part is measured and recorded as ma. Vacuum infiltration of the part with a solvent such as toluene or IPA is then conducted by, for example, pulling a vacuum om the parts for at least one hour to a pressure less than −20 inHg and then submerging the parts in solvent, infiltrate for at least 30 minutes. Next, the vacuum is released, keeping parts submerged in solvent. Then, the surface liquid is wiped off of the part, and the mass m, of the part when wet is recorded. Finally, the mass $m_s$ of the part when submerged in the cup is recorded. The Archimedes bulk density is calculated as $m_d/(m_w-m_s)\rho_s$, where $\rho_s$ is the solvent density, and the open porosity is $(m_w-m_d)/(m_w-m_s)$.

As used herein, the phrase "lithium interfacial resistance," refers to the interfacial resistance of a material towards the incorporation of Li$^+$ ions. A lithium interfacial ASR (AS-$R_{interface}$) is calculated from the interfacial resistance ($R_{interface}$) via $ASR_{interface}=R_{interface}*A/2$ where A is the area of the electrodes in contact with the separator and the factor of 2 accounts for 2 interfaces, assuming they are symmetric, as demonstrated in Example 4, herein.

As used herein "ASR" refers to area-specific resistance. ASR is measured using electrochemical impedance spectroscopy (EIS) was performed on the SPS films to measure the Area-Specific Resistance (ASR). EIS can be performed on a Biologic VMP3 instrument or an equivalent thereof. In an ASR measurement o lithium contacts are deposited on two sides of a sample. An AC voltage of 25 mV rms is applied across a frequency of 300 kHz-0.1 mHz while the current is measured. EIS partitions the ASR into the bulk contribution and the interfacial ASR contribution, by resolving two semicircles in a Nyquist plot.

As used herein, the term "electrolyte," refers to an ionically conductive and electrically insulating material. Electrolytes are useful for electrically insulating the positive and negative electrodes of a rechargeable battery while allowing for the conduction of ions, e.g., Lit, through the electrolyte. In some of the electrochemical devices described herein, the electrolyte includes a solid film, pellet, or monolith of a Li$^+$ conducting oxide, such as a lithium-stuffed garnet. In some examples, the electrolyte further includes a gel electrolyte which is laminated to or directly contacting the solid film, pellet, or monolith.

As used herein, the term "catholyte," refers to a Li ion conductor that is intimately mixed with, or that surrounds, or that contacts the positive electrode active materials and provides an ionic pathway for Li$^+$ to and from the active materials. Catholytes suitable for use with the embodiments described herein include, but are not limited to, catholytes having the acronyms name LPS, LXPS, LXPSO, where X is Si, Ge, Sn, As, Al, LATS, Li-stuffed garnets, or combinations thereof. Catholytes may also be liquid, gel, semiliquid, semi-solid, polymer, and/or solid polymer ion conductors known in the art. Catholytes include those catholytes set forth in US Patent Application Publication No. 2015-0171465, which published on Jun. 18, 2015, entitled SOLID STATE CATHOLYTE OR ELECTROLYTE FOR BATTERY USING Li$_A$MP$_B$S$_C$ (M=Si, Ge, AND/OR Sn), filed May 15, 2014, the contents of which are incorporated by reference in their entirety. Catholytes include those catholytes set forth in US Patent Application Publication No. 2015/0099190, published on Apr. 9, 2015, entitled GARNET MATERIALS FOR LI SECONDARY BATTERIES AND METHODS OF MAKING AND USING GARNET MATERIALS, and filed Oct. 7, 2014, the contents of which are incorporated by reference in their entirety. In some examples, the gel electrolyte is a mixture of PVDF:HFP to EC:EMC, in which the amount of molar ratio of PVDF to HFP in PVDF:HFP is 80:20 to 50:50, the weight ratio of EC to EMC in EC:EMC is 1:1, and the weight ratio of [PVDF: HFP]:[EC:EMC] is 80:20 to 1:50. Herein, PVDF is polyvinylidene fluoride; HFP is hexafluorophosphate; EC is ethylene carbonate; and EMC is ethyl methyl carbonate. Exemplary gel electrolytes are found for example in, but not limited to, the electrolyte compositions set forth in U.S. Pat. No. 5,296,318, entitled RECHARGEABLE LITHIUM INTERCALATION BATTERY WITH HYBRID POLYMERIC ELECTROLYTE; also the electrolyte compositions set forth in U.S. Pat. Nos. 5,460,904 and 5,456,000, to Gozdz, et al., and also the electrolyte compositions set forth in US Patent Application No. 2002/0192561, entitled SEPARATORS FOR WINDING-TYPE LITHIUM SECONDARY BATTERIES HAVING GEL-TYPE POLYMER ELECTROLYTES AND MANUFACTURING METHOD FOR THE SAME, which published Dec. 19, 2002, the contents of which are incorporated by reference herein in their entirety.

As used here, "LXPS" refers to a material characterized by the formula Li$_a$MP$_b$S$_c$, where M is Si, Ge, Sn, and/or Al, and where $2\leq a\leq 8$, $0.5\leq b\leq 2.5$, $4\leq c\leq 12$. "LSPS" refers to an electrolyte material characterized by the formula L$_a$SiP$_b$S$_c$, where $2 \leq a \leq 8$, $0.5 \leq b \leq 2.5$, $4 \leq c \leq 12$. LSPS refers to an electrolyte material characterized by the formula $L_a SiP_b S_c$, wherein, where $2 \leq a \leq 8$, $0.5 \leq b \leq 4 \leq c \leq 12$, $d < 3$. In these examples, the subscripts are selected so that the compound is neutrally charged. Exemplary LXPS materials are found, for example, in International Patent Application Publication No. PCT/US2014/038283 (WO/2014/186634), filed May 16, 2014 as PCT/US2014/038283, and titled SOLID STATE CATHOLYTE OR ELECTROLYTE FOR BATTERY USING $LI_4MP_bS_C$ (M=Si, Ge, AND/OR Sn), which is incorporated by reference herein in its entirety. When M is Sn and Si—both are present—the LXPS material is referred to as LSTPS. As used herein, "LSTPSO," refers to LSTPS that is doped with, or has, O present. In some examples, "LSTPSO," is a LSTPS material with an oxygen content between 0.01 and 10 atomic %. "LSPS," refers to an electrolyte material having Li, Si, P, and S chemical constituents. As used herein "LSTPS," refers to an electrolyte material having Li, Si, P, Sn, and S chemical constituents. As used herein, "LSPSO," refers to LSPS that is doped with, or has, 0 present. In some examples, "LSPSO," is a LSPS material with an oxygen content between 0.01 and 10 atomic %. As used herein, "LATP," refers to an electrolyte material having Li, As, Sn, and P chemical constituents. As used herein "LAGP," refers to an electrolyte material having Li, As, Ge, and P chemical constituents. As used herein, "LXPSO" refers to a catholyte material characterized by the formula $Li_a MP_b S_c O_d$, where M is Si, Ge, Sn, and/or Al, and where $2 \leq a \leq 8$, $0.5 \leq b \leq 2.5$, $4 \leq c \leq 12$, $d < 3$. LXPSO refers to LXPS, as defined above, and having oxygen doping at from 0.1 to about 10 atomic %. LPSO refers to LPS, as defined above, and having oxygen doping at from 0.1 to about 10 atomic %.

As used here, "LPS," refers to an electrolyte having Li, P, and S chemical constituents. As used herein, "LPSO," refers to LPS that is doped with or has 0 present. In some examples, "LPSO," is a LPS material with an oxygen content between 0.01 and 10 atomic %. LPS refers to an electrolyte material that can be characterized by the formula $Li_x P_y S_z$ where $0.33 \leq x \leq 0.67$, $0.07 \leq y \leq 0.2$ and $0.4 \leq z \leq 0.55$. LPS also refers to an electrolyte characterized by a product formed from a mixture of $Li_2S:P_2S_5$ wherein the molar ratio is 10:1, 9:1, 8:1, 7:1, 6:1 5:1, 4:1, 3:1, 7:3, 2:1, or 1:1. LPS also refers to an electrolyte characterized by a product formed from a mixture of $Li_2S:P_2S_5$ wherein the molar ratio is in the range of 10:1 to 1:1. LPS also refers to an electrolyte characterized by a product formed from a mixture of $Li_2S:P_2S_5$ wherein the reactant or precursor amount of $Li_2S$ is 95 atomic % and $P_2S_5$ is 5 atomic %. LPS also refers to an electrolyte characterized by a product formed from a mixture of $Li_2S:P_2S_5$ wherein the reactant or precursor amount of $Li_2S$ is 90 atomic % and $P_2S_5$ is 10 atomic %. LPS also refers to an electrolyte characterized by a product formed from a mixture of $Li_2S:P_2S_5$ wherein the reactant or precursor amount of $Li_2S$ is 85 atomic % and $P_2S_5$ is 15 atomic %. LPS also refers to an electrolyte characterized by a product formed from a mixture of $Li_2S:P_2S_5$ wherein the reactant or precursor amount of $Li_2S$ is 80 atomic % and $P_2S_5$ is 20 atomic %. LPS also refers to an electrolyte characterized by a product formed from a mixture of $Li_2S:P_2S_5$ wherein the reactant or precursor amount of $Li_2S$ is 75 atomic % and $P_2S_5$ is 25 atomic %. LPS also refers to an electrolyte characterized by a product formed from a mixture of $Li_2S:P_2S_5$ wherein the reactant or precursor amount of $Li_2S$ is 70 atomic % and $P_2S_5$ is 30 atomic %. LPS also refers to an electrolyte characterized by a product formed from a mixture of $Li_2S:P_2S_5$ wherein the reactant or precursor amount of $Li_2S$ is 65 atomic % and $P_2S_5$ is 35 atomic %. LPS also refers to an electrolyte characterized by a product formed from a mixture of $Li_2S:P_2S_5$ wherein the reactant or precursor amount of $Li_2S$ is 60 atomic % and $P_2S_5$ is 40 atomic %. LPS may also be doped with a lithium halide such as LiF, LiCl, LiBr, or LiI at a 0-40% molar content. LPS may also be doped with LiF. LPS may also be doped with LiCl. LPS may also be doped with LiBr. LPS may also be doped with LiI. LPS may also be doped with any combination of two or more elements selected from LiF, LiCl, LiBr, and LiI.

As used here, "LPSO" refers to an electrolyte material characterized by the formula $Li_x P_y S_z O_w$ where $0.33 \leq x \leq 0.67$, $0.07 \leq y \leq 0.2$, $0.4 \leq z \leq 0.55$, $0 \leq w \leq 0.15$. Also, LPSO refers to LPS, as defined above, that includes an oxygen content of from 0.01 to 10 atomic %. In some examples, the oxygen content is 1 atomic %. In other examples, the oxygen content is 2 atomic %. In some other examples, the oxygen content is 3 atomic %. In some examples, the oxygen content is 4 atomic %. In other examples, the oxygen content is 5 atomic %. In some other examples, the oxygen content is 6 atomic %. In some examples, the oxygen content is 7 atomic %. In other examples, the oxygen content is 8 atomic %. In some other examples, the oxygen content is 9 atomic %. In some examples, the oxygen content is 10 atomic %.

As used herein, the term "rational number" refers to any number which can be expressed as the quotient or fraction (e.g., p/q) of two integers (e.g., p and q), with the denominator (e.g., q) not equal to zero. Example rational numbers include, but are not limited to, 1, 1.1, 1.52, 2, 2.5, 3, 3.12, and 7.

Unless specified to the contrary, subscripts and molar coefficients in empirical formulae are based on the quantities of raw materials initially batched to make the material described. For example, for the material, $Li_7La_3Zr_2O_{12} \cdot 0.35Al_2O_3$, the subscripts, 7, 3, 2, 12, and the coefficient, 0.35, refer to the respective elemental ratios in the chemical precursors (e.g., LiOH, $La_2O_3$, $ZrO_2$, $Al_2O_3$) used to prepare the $Li_7La_3Zr_2O_{12} \cdot 0.35Al_2O_3$. As used herein, the ratios are molar ratios unless specified to the contrary.

As used herein, the phrases "lithium-stuffed garnet" or "Li-stuffed" refer to oxides that are characterized by a crystal structure related to a garnet crystal structure. US Patent Application Publication No. 2015/0099190, published Apr. 9, 2015 and was filed Oct. 7, 2014 as Ser. No. 14/509,029, is incorporated by reference herein in its entirety. This application describes Li-stuffed garnet electrolytes used in solid-state lithium rechargeable batteries. These Li-stuffed garnets generally having a composition according to $Li_A La_B M'_C M''_D Zr_E O_F$, $Li_A La_B M'_C M''_D Ta_E O_F$, or $Li_A La_B M'_C M''_D Nb_E O_F$, wherein $4 < A < 8.5$, $1.5 < B < 4$, $0 \leq C \leq 2$, $0 \leq D \leq 2$; $0 \leq E < 2$, $10 < F < 13$, and M' and M'' are each, independently in each instance selected from Ga, Al, Mo, W, Nb, Sb, Ca, Ba, Sr, Ce, Hf, Rb, or Ta, or $Li_a La_b Zr_e Al_d Me''_e O_f$, wherein $5 < a < 8.5$; $2 < b < 4$; $0 < c \leq 2.5 \leq d < 2$; $0 \leq e < 2$, and $10 < f < 13$ and Me'' is a metal selected from Ga, Nb, Ta, V, W, Mo, or Sb and as otherwise described in U.S. Patent Application Publication No. U.S. 2015/0099190, which is incorporated by reference herein in its entirety. As used herein, lithium-stuffed garnets, and garnets, generally, include, but are not limited to, $Li_{7.0}La_3(Zr_{t1}+Nb_{t2}+Ta_{t3})O_{12}+0.35Al_2O_3$; wherein (t1+t2+t3=2) so that the La:(Zr/Nb/Ta) ratio is 3:2. Also, garnets used herein include, but are not limited to, $Li_x La_3 Zr_2 O_F + y Al_2 O_3$, wherein x ranges from 5.5 to 9; and y ranges from 0.05 to 1. In these examples, subscripts x and F and coefficient y are selected so that the garnet is charge neutral. In some examples x is 7 and y is 1.0.

In some examples, x is 5 and y is 1.0. In some examples, x is 6 and y is 1.0. In some examples, x is 8 and y is 1.0. In some examples, x is 9 and y is 1.0. In some examples x is 7 and y is 0.35. In some examples, x is 5 and y is 0.35. In some examples, x is 6 and y is 0.35. In some examples, x is 8 and y is 0.35. In some examples, x is 9 and y is 0.35. In some examples x is 7 and y is 0.7. In some examples, x is 5 and y is 0.7. In some examples, x is 6 and y is 0.7. In some examples, x is 8 and y is 0.7. In some examples, x is 9 and y is 0.7. In some examples x is 7 and y is 0.75. In some examples, x is 5 and y is 0.75. In some examples, x is 6 and y is 0.75. In some examples, x is 8 and y is 0.75. In some examples, x is 9 and y is 0.75. In some examples x is 7 and y is 0.8. In some examples, x is 5 and y is 0.8. In some examples, x is 6 and y is 0.8. In some examples, x is 8 and y is 0.8. In some examples, x is 9 and y is 0.8. In some examples x is 7 and y is 0.5. In some examples, x is 5 and y is 0.5. In some examples, x is 6 and y is 0.5. In some examples, x is 8 and y is 0.5. In some examples, x is 9 and y is 0.5. In some examples x is 7 and y is 0.4. In some examples, x is 5 and y is 0.4. In some examples, x is 6 and y is 0.4. In some examples, x is 8 and y is 0.4. In some examples, x is 9 and y is 0.4. In some examples x is 7 and y is 0.3. In some examples, x is 5 and y is 0.3. In some examples, x is 6 and y is 0.3. In some examples, x is 8 and y is 0.3. In some examples, x is 9 and y is 0.3. In some examples x is 7 and y is 0.22. In some examples, x is 5 and y is 0.22. In some examples, x is 6 and y is 0.22. In some examples, x is 8 and y is 0.22. In some examples, x is 9 and y is 0.22. Also, garnets as used herein include, but are not limited to, $Li_xLa_3Zr_2O_{12}+yAl_2O_3$. In one embodiment, the Li-stuffed garnet herein has a composition of $Li_7Li_3Zr_2O_{12}$. In another embodiment, the Li-stuffed garnet herein has a composition of $Li_7Li_3Zr_2O_{12} \cdot Al_2O_3$. In yet another embodiment, the Li-stuffed garnet herein has a composition of $Li_7Li_3Zr_2O_{12} \cdot 0.22Al_2O_3$. In yet another embodiment, the Li-stuffed garnet herein has a composition of $Li_7Li_3Zr_2O_{12} \cdot 0.35Al_2O_3$. In certain other embodiments, the Li-stuffed garnet herein has a composition of $Li_7Li_3Zr_2O_{12} \cdot 0.5Al_2O_3$. In another embodiment, the Li-stuffed garnet herein has a composition of $Li_7Li_3Zr_2O_{12} \cdot 0.75Al_2O_3$. In another embodiment, the Li-stuffed garnet herein has a composition of $Li_{7-x}Li_3Zr_2O_{12} \cdot Al_2O_3$, wherein x is from 0 to 2.5. In yet another embodiment, the Li-stuffed garnet herein has a composition of $Li_{7-x}Li_3Zr_2O_{12} \cdot 0.22Al_2O_3$, wherein x is from 0 to 2.5. In yet another embodiment, the Li-stuffed garnet herein has a composition of $Li_{7-x}Li_3Zr_2O_{12} \cdot 0.35Al_2O_3$, wherein x is from 0 to 2.5. In certain other embodiments, the Li-stuffed garnet herein has a composition of $Li_{7-x}Li_3Zr_2O_{12} \cdot 0.5Al_2O_3$, wherein x is from 0 to 2.5. In another embodiment, the Li-stuffed garnet herein has a composition of $Li_{7-x}Li_3Zr_2O_{12} \cdot 0.75Al_2O_3$, wherein x is from 0 to 2.5.

As used herein, garnet does not include YAG-garnets (i.e., yttrium aluminum garnets, or, e.g., $Y_3Al_5O_{12}$). As used herein, garnet does not include silicate-based garnets such as pyrope, almandine, spessartine, grossular, hessonite, or cinnamon-stone, tsavorite, uvarovite and andradite and the solid solutions pyrope-almandine-spessarite and uvarovite-grossular-andradite. Garnets herein do not include nesosilicates having the general formula $X_3Y_2(SiO_4)_3$ wherein X is Ca, Mg, Fe, and/or Mn; and Y is Al, Fe, and/or Cr.

As used herein, the phrases "garnet precursor chemicals," "chemical precursor to a garnet-type electrolyte," "precursors to garnet" and "garnet precursor materials" refer to chemicals which react to form a lithium-stuffed garnet material described herein. These chemical precursors include, but are not limited to lithium hydroxide (e.g., LiOH), lithium oxide (e.g., $Li_2O$), lithium carbonate (e.g., $LiCO_3$), zirconium oxide (e.g., $ZrO_2$), lanthanum oxide (e.g., $La_2O_3$), lanthanum hydroxide (e.g., $La(OH)_3$), aluminum oxide (e.g., $Al_2O_3$), aluminum hydroxide (e.g., $Al(OH)_3$), aluminum (e.g., Al), aluminum nitrate (e.g., $Al(NO_3)_3$), aluminum nitrate nonahydrate, boehmite, gibbsite, niobium oxide (e.g., $Nb_2O_5$), gallium oxide (e.g., $Ga_2O_3$), and tantalum oxide (e.g., $Ta_2O_5$). Other precursors to garnet materials, known in the relevant field to which the instant disclosure relates, may be suitable for use with the methods set forth herein.

As used herein, the phrase "garnet-type electrolyte," refers to an electrolyte that includes a lithium stuffed garnet material described herein and that conducts $Li^+$ ions. The advantages of Li-stuffed garnet solid-state electrolytes are many, including as a substitution for liquid, flammable electrolytes commonly used in lithium rechargeable batteries.

As used herein, the term "uniform," refers to a property characterization which is constant over a given surface area or volume, e.g., over a surface area of at least 100 $nm^2$ or over a volume of at least 1000 $nm^3$.

As used herein the term "porous," refers to a material that includes pores, e.g., nanopores, mesopores, or micropores.

As used herein, the phrases "electrochemical cell" or "battery cell" shall mean a single cell including a positive electrode and a negative electrode, which have ionic communication between the two by way of an electrolyte. Unless specific to the contrary, the electrolyte is as solid state electrolyte. In some embodiments, the same battery cell includes multiple positive electrodes and/or multiple negative electrodes enclosed in one container.

As used herein, the phrase "electrochemical device" refers to an energy storage device, such as, but not limited to a Li-secondary battery that operates or produces electricity or an electrical current by an electrochemical reaction, e.g., a conversion chemistry reaction such as $3Li+FeF_3 \leftrightarrow 3LiF+Fe$.

As used herein the phrase "energy storage electrode," refers to, for example, an electrode that is suitable for use in an energy storage device, e.g., a lithium rechargeable battery or Li-secondary battery. As used herein, such an electrode is capable of conducting electrons and Li ions as necessary for the charging and discharging of a rechargeable battery.

As used herein the term "making," refers to the process or method of forming or causing to form the object that is made. For example, making an energy storage electrode includes the process, process steps, or method of causing the electrode of an energy storage device to be formed. The end result of the steps constituting the making of the energy storage electrode is the production of a material that is functional as an electrode for reversibly charging and discharging $Li^+$ ions.

As used herein, the phrase "providing" refers to the provision of, generation or, presentation of, or delivery of that which is provided.

As used herein, the term "grains" refers to domains of material within the bulk of a material that have a physical boundary which distinguishes the grain from the rest of the material. For example, in some materials both crystalline and amorphous components of a material, often having the same chemical composition, are distinguished from each other by the boundary between the crystalline component and the amorphous component. The approximate diameter or maximum dimensions of the boundaries of a crystalline component, or of an amorphous component, is referred herein as the grain size.

As used herein, the phrase "current collector" refers to a component or layer in a secondary battery through which electrons conduct, to or from an electrode in order to complete an external circuit, and which are in direct contact with the electrode to or from which the electrons conduct. In some examples, the current collector is a metal (e.g., Al, Cu, or Ni, steel, alloys thereof, or combinations thereof) layer which is laminated to a positive or negative electrode. In some examples, the current collector is Al. In some examples, the current collector is Cu. In some examples, the current collector is Ni. In some examples, the current collector is steel. In some examples, the current collector is an alloy of Al. In some examples, the current collector is an alloy of Cu. In some examples, the current collector is an alloy of steel. In some examples, the current collector is Al. In some examples, the current collector comprises a combination of the above metals. During charging and discharging, electrons move in the opposite direction to the flow of Li ions and pass through the current collector when entering or exiting an electrode.

As used herein, the terms "cathode" and "anode" refer to the electrodes of a battery. During a charge cycle in a Li-secondary battery, Li ions leave the cathode and move through an electrolyte and to the anode. During a charge cycle, electrons leave the cathode and move through an external circuit to the anode. During a discharge cycle in a Li-secondary battery, Li ions migrate towards the cathode through an electrolyte and from the anode. During a discharge cycle, electrons leave the anode and move through an external circuit to the cathode.

As used herein the term "LiBOB," refers to lithium bis(oxalato)borate.

As used herein the term "LiBETI" refers to lithium bis(perfluoroethanesulfonyl)imide.

As used herein the term "LIFSI" refers to lithium bis(fluorosulfonyl)imide.

As used herein the term "LiTFSI" refer to lithium bis-trifluoromethanesulfonimide.

As used herein, voltage is set forth with respect to lithium (i.e., V vs. Li) metal unless stated otherwise.

As used herein the phrase "bonding layer," refers to an ionically conductive layer between two other layers, e.g., between the cathode and the solid separator. Exemplary bonding layers include the gel electrolytes, and related separator bonding agents, set forth in U.S. patent application Ser. No. 15/595,755, filed May 15, 2017, the entire contents of which are herein incorporated by reference in its entirety for all purposes.

As used herein "median diameter $(d_{50})$" refers to the median size, in a distribution of sizes, measured by microscopy techniques or other particle size analysis techniques, including, but not limited to, scanning electron microscopy or dynamic light scattering. $D_{50}$ includes the characteristic dimension at which 50% of the particles are smaller than the recited size.

As used herein "diameter $(d_{90})$" refers to the size, in a distribution of sizes, measured by microscopy techniques or other particle size analysis techniques, including, but not limited to, scanning electron microscopy or dynamic light scattering. $D_{90}$ includes the characteristic dimension at which 90% of the particles are smaller than the recited size.

As used herein "diameter $(d_{10})$" refers to the size, in a distribution of sizes, measured by microscopy techniques or other particle size analysis techniques, including, but not limited to, scanning electron microscopy or dynamic light scattering. $D_{10}$ includes the characteristic dimension at which 10% of the particles are smaller than the recited size.

As used herein, the term "critical current," refers to the current above which lithium dendrites form and lead to an electrical short. As taught herein, the critical current is a function of the defect density and/or pore aspect ratio of the defects on surface of a separator in an electrochemical cell.

As used herein, the term "critical temperature," refers to the temperature below which lithium dendrites form and lead to an electrical short. As taught herein, the critical temperature is a function of the defect density and/or pore aspect ratio of the defects on surface of a separator in an electrochemical cell.

As used herein, the term "critical pressure," refers to the pressure below which lithium dendrites form and lead to an electrical short. As taught herein, the critical pressure is a function of the defect density and/or pore aspect ratio of the defects on surface of a separator in an electrochemical cell.

III. Materials

In some examples, set forth herein is a separator that includes a lithium-stuffed garnet and has top and bottom surfaces and a bulk therebetween, wherein either or both of the top or bottom surfaces has a lower surface defect density than does the bulk. This means that the density of defects in the lithium-stuffed garnet at the top or bottom surface of the separator is less than the density of defects in the lithium-stuffed garnet bulk. When comparing the density of defects at the top and/or bottom surfaces of a separator to the density of defects in the bulk, the same type of defect should be considered. In some examples, the density of pores at the surface of the separator is less than the density of pores in the bulk. In some examples, the top surface has a lower surface defect density than does the bulk. In some other examples, the bottom surface has a lower surface defect density than does the bulk. In some examples, both the top and bottom surfaces have a lower surface defect density than does the bulk. In some examples, the top surface has a lower surface defect density than does the bulk, with respect to a defect type. In some other examples, the bottom surface has a lower surface defect density than does the bulk, with respect to a defect type. In some examples, both the top and bottom surfaces have a lower surface defect density than does the bulk, with respect to a defect type. In some examples, the defect type is selected from a pore, a grain boundary, a dislocation, a crack, a separation, a chemical inhomogeneity, a pitting, an inclusion, an included pore, a divot, an atomic vacancy, a phase segregation of two or more materials, a cavity, a twinned grain, an atom vacancy, a non-planarity in an otherwise planar surface, and the presence of a second phase of material.

In some examples, the top or bottom surface has, or both the top and bottom surfaces have a defect density less than 1 defect per 1 $mm^2$ of the surface. In some examples, the top or bottom surface has a defect density less than 1 defect per 1 $mm^2$ of the surface. In some examples, both the top and bottom surfaces have a defect density less than 1 defect per 1 $mm^2$ of the surface. In other examples, the top or bottom surface has, or both the top and bottom surfaces have, a defect density less than 1 defect per 0.5 $mm^2$ of the surface. In some examples, the top or bottom surface has a defect density less than 1 defect per 0.5 $mm^2$ of the surface. In some examples, both the top and bottom surfaces have a defect density less than 1 defect per 0.5 $mm^2$ of the surface. In certain examples, the top or bottom surface has, or both the top and bottom surfaces have, a defect density less than 1 defect per 0.4 mm² of the surface. In some examples, the top or bottom surface has a defect density less than 1 defect per 0.4 mm² of the surface. In some examples, both the top and bottom surfaces have a defect density less than 1 defect per 0.4 mm² of the surface. In yet other examples, the top or bottom surface has, or both the top and bottom surfaces have, a defect density less than 1 defect per 0.3 mm² of the surface. In some examples, the top or bottom surface has, or both the top and bottom surfaces have, a defect density less than 1 defect per 0.3 mm² of the surface. In some examples, the top or bottom surface has a defect density less than 1 defect per 0.3 mm² of the surface. In some examples, both the top and bottom surfaces have a defect density less than 1 defect per 0.3 mm² of the surface. In other examples, the top or bottom surface has, or both the top and bottom surfaces have, a defect density less than 1 defect per 0.2 mm² of the surface. In some examples, the top or bottom surface has a defect density less than 1 defect per 0.2 mm² of the surface. In some examples, both the top and bottom surfaces have a defect density less than 1 defect per 0.2 mm² of the surface. In certain examples, the top or bottom surface has, or both the top and bottom surfaces have, a defect density less than 1 defect per 0.1 mm² of the surface. In some examples, the top or bottom surface has a defect density less than 1 defect per 0.1 mm² of the surface. In some examples, both the top and bottom surfaces have a defect density less than 1 defect per 0.1 mm² of the surface. In yet other examples, the top or bottom surface has, or both the top and bottom surfaces have, a defect density less than 1 defect per 0.09 mm² of the surface. In some examples, the top or bottom surface has a defect density less than 1 defect per 0.09 mm² of the surface. In some examples, both the top and bottom surfaces have a defect density less than 1 defect per 0.09 mm² of the surface. In some examples, the top or bottom surface has, or both the top and bottom surfaces have, a defect density less than 1 defect per 0.08 mm² of the surface. In some examples, the top or bottom surface has a defect density less than 1 defect per 0.08 mm² of the surface. In some examples, both the top and bottom surfaces have a defect density less than 1 defect per 0.08 mm² of the surface. In other examples, the top or bottom surface has, or both the top and bottom surfaces have, a defect density less than 1 defect per 0.07 mm² of the surface. In some examples, the top or bottom surface has a defect density less than 1 defect per 0.07 mm² of the surface. In some examples, both the top and bottom surfaces have a defect density less than 1 defect per 0.07 mm² of the surface. In certain examples, the top or bottom surface has, or both the top and bottom surfaces have, a defect density less than 1 defect per 0.06 mm² of the surface. In some examples, the top or bottom surface has a defect density less than 1 defect per 0.06 mm² of the surface. In some examples, both the top and bottom surfaces have a defect density less than 1 defect per 0.06 mm² of the surface. In yet other examples, the top or bottom surface has, or both the top and bottom surfaces have, a defect density less than 1 defect per 0.05 mm² of the surface. In some examples, the top or bottom surface has a defect density less than 1 defect per 0.05 mm² of the surface. In some examples, both the top and bottom surfaces have a defect density less than 1 defect per 0.05 mm² of the surface. In some examples, the top or bottom surface has, or both the top and bottom surfaces have, a defect density less than 1 defect per 0.04 mm² of the surface. In some examples, the top or bottom surface has a defect density less than 1 defect per 0.04 mm² of the surface. In some examples, both the top and bottom surfaces have a defect density less than 1 defect per 0.04 mm² of the surface.

In other examples, the top or bottom surface has, or both the top and bottom surfaces have, a defect density less than 1 defect per 0.03 mm² of the surface. In some examples, the top or bottom surface has a defect density less than 1 defect per 0.03 mm² of the surface. In some examples, both the top and bottom surfaces have a defect density less than 1 defect per 0.03 mm² of the surface. In certain examples, the top or bottom surface has, or both the top and bottom surfaces have, a defect density less than 1 defect per 0.02 mm² of the surface. In some examples, the top or bottom surface has a defect density less than 1 defect per 0.02 mm² of the surface. In some examples, both the top and bottom surfaces have a defect density less than 1 defect per 0.02 mm² of the surface. In yet other examples, the top or bottom surface has, or both the top and bottom surfaces have, a defect density less than 1 defect per 0.01 mm² of the surface. In some examples, the top or bottom surface has a defect density less than 1 defect per 0.01 mm² of the surface. In some examples, both the top and bottom surfaces have a defect density less than 1 defect per 0.01 mm² of the surface.

In some examples, the top or bottom surface has, or both the top and bottom surfaces have, a defect density less than 1 defect per 1 cm² of the surface. In some examples, the top or bottom surface has a defect density less than 1 defect per 1 cm² of the surface. In some examples, both the top and bottom surfaces have a defect density less than 1 defect per 1 cm² of the surface. In other examples, the top or bottom surface has, or both the top and bottom surfaces have, a defect density less than 1 defect per 0.5 cm² of the surface. In some examples, the top or bottom surface has a defect density less than 1 defect per 0.5 cm² of the surface. In some examples, both the top and bottom surfaces have a defect density less than 1 defect per 0.5 cm² of the surface. In certain examples, the top or bottom surface has, or both the top and bottom surfaces have, a defect density less than 1 defect per 0.4 cm² of the surface. In some examples, the top or bottom surface has a defect density less than 1 defect per 0.4 cm² of the surface. In some examples, both the top and bottom surfaces have a defect density less than 1 defect per 0.4 cm² of the surface. In yet other examples, the top or bottom surface has, or both the top and bottom surfaces have, a defect density less than 1 defect per 0.3 cm² of the surface. In some examples, the top or bottom surface has, or both the top and bottom surfaces have, a defect density less than 1 defect per 0.3 cm² of the surface. In some examples, the top or bottom surface has a defect density less than 1 defect per 0.3 cm² of the surface. In some examples, both the top and bottom surfaces have a defect density less than 1 defect per 0.3 cm² of the surface. In other examples, the top or bottom surface has, or both the top and bottom surfaces have, a defect density less than 1 defect per 0.2 cm² of the surface. In some examples, the top or bottom surface has a defect density less than 1 defect per 0.2 cm² of the surface. In some examples, both the top and bottom surfaces have a defect density less than 1 defect per 0.2 cm² of the surface. In certain examples, the top or bottom surface has, or both the top and bottom surfaces have, a defect density less than 1 defect per 0.1 cm² of the surface. In some examples, the top or bottom surface has a defect density less than 1 defect per 0.1 cm² of the surface. In some examples, both the top and bottom surfaces have a defect density less than 1 defect per 0.1 cm² of the surface. In yet other examples, the top or bottom surface has, or both the top and bottom surfaces have, a defect density less than 1 defect per 0.09 cm² of the surface. In some examples, the top or bottom surface has a defect density less than 1 defect per 0.09 cm² of the surface. In some examples, both the top and bottom surfaces have a defect density less than 1 defect per 0.09 cm² of the surface. In some examples, the top or bottom surface has, or both the top and bottom surfaces have, a defect density less than 1 defect per 0.08 cm² of the surface. In some examples, the top or bottom surface has a defect density less than 1 defect per 0.08 cm² of the surface. In some examples, both the top and bottom surfaces have a defect density less than 1 defect per 0.08 cm² of the surface. In other examples, the top or bottom surface has, or both the top and bottom surfaces have, a defect density less than 1 defect per 0.07 cm² of the surface. In some examples, the top or bottom surface has a defect density less than 1 defect per 0.07 cm² of the surface. In some examples, both the top and bottom surfaces have a defect density less than 1 defect per 0.07 cm² of the surface. In certain examples, the top or bottom surface has, or both the top and bottom surfaces have, a defect density less than 1 defect per 0.06 cm² of the surface. In some examples, the top or bottom surface has a defect density less than 1 defect per 0.06 cm² of the surface. In some examples, both the top and bottom surfaces have a defect density less than 1 defect per 0.06 cm² of the surface. In yet other examples, the top or bottom surface has, or both the top and bottom surfaces have, a defect density less than 1 defect per 0.05 cm² of the surface. In some examples, the top or bottom surface has a defect density less than 1 defect per 0.05 cm² of the surface. In some examples, both the top and bottom surfaces have a defect density less than 1 defect per 0.05 cm² of the surface. In some examples, the top or bottom surface has, or both the top and bottom surfaces have, a defect density less than 1 defect per 0.04 cm² of the surface. In some examples, the top or bottom surface has a defect density less than 1 defect per 0.04 cm² of the surface. In some examples, both the top and bottom surfaces have a defect density less than 1 defect per 0.04 cm² of the surface. In other examples, the top or bottom surface has, or both the top and bottom surfaces have, a defect density less than 1 defect per 0.03 cm² of the surface. In some examples, the top or bottom surface has a defect density less than 1 defect per 0.03 cm² of the surface. In some examples, both the top and bottom surfaces have a defect density less than 1 defect per 0.03 cm² of the surface. In certain examples, the top or bottom surface has, or both the top and bottom surfaces have, a defect density less than 1 defect per 0.02 cm² of the surface. In some examples, the top or bottom surface has a defect density less than 1 defect per 0.02 cm² of the surface. In some examples, both the top and bottom surfaces have a defect density less than 1 defect per 0.02 cm² of the surface.

In some examples, the top or bottom surface has, or both the top and bottom surfaces have, a defect density less than 1 defect per 1 µm² of the surface. In some examples, the top or bottom surface has a defect density less than 1 defect per 1 µm² of the surface. In some examples, both the top and bottom surfaces have a defect density less than 1 defect per 1 µm² of the surface. In other examples, the top or bottom surface has, or both the top and bottom surfaces have, a defect density less than 1 defect per 0.5 µm² of the surface. In some examples, the top or bottom surface has a defect density less than 1 defect per 0.5 µm² of the surface. In some examples, both the top and bottom surfaces have a defect density less than 1 defect per 0.5 µm² of the surface. In certain examples, the top or bottom surface has, or both the top and bottom surfaces have, a defect density less than 1 defect per 0.4 µm² of the surface. In some examples, the top or bottom surface has a defect density less than 1 defect per 0.4 µm² of the surface. In some examples, both the top and bottom surfaces have a defect density less than 1 defect per 0.4 µm² of the surface. In yet other examples, the top or bottom surface has, or both the top and bottom surfaces have, a defect density less than 1 defect per 0.3 µm² of the surface. In some examples, the top or bottom surface has, or both the top and bottom surfaces have, a defect density less than 1 defect per 0.3 µm² of the surface. In some examples, the top or bottom surface has a defect density less than 1 defect per 0.3 µm² of the surface. In some examples, both the top and bottom surfaces have a defect density less than 1 defect per 0.3 µm² of the surface. In other examples, the top or bottom surface has, or both the top and bottom surfaces have, a defect density less than 1 defect per 0.2 µm² of the surface. In some examples, the top or bottom surface has a defect density less than 1 defect per 0.2 µm² of the surface. In some examples, both the top and bottom surfaces have a defect density less than 1 defect per 0.2 µm² of the surface. In certain examples, the top or bottom surface has, or both the top and bottom surfaces have, a defect density less than 1 defect per 0.1 µm² of the surface. In some examples, the top or bottom surface has a defect density less than 1 defect per 0.1 µm² of the surface. In some examples, both the top and bottom surfaces have a defect density less than 1 defect per 0.1 µm² of the surface. In yet other examples, the top or bottom surface has, or both the top and bottom surfaces have, a defect density less than 1 defect per 0.09 µm² of the surface. In some examples, the top or bottom surface has a defect density less than 1 defect per 0.09 µm² of the surface. In some examples, both the top and bottom surfaces have a defect density less than 1 defect per 0.09 µm² of the surface. In some examples, the top or bottom surface has, or both the top and bottom surfaces have, a defect density less than 1 defect per 0.08 µm² of the surface. In some examples, the top or bottom surface has a defect density less than 1 defect per 0.08 µm² of the surface. In some examples, both the top and bottom surfaces have a defect density less than 1 defect per 0.08 µm² of the surface. In other examples, the top or bottom surface has, or both the top and bottom surfaces have, a defect density less than 1 defect per 0.07 µm² of the surface. In some examples, the top or bottom surface has a defect density less than 1 defect per 0.07 µm² of the surface. In some examples, both the top and bottom surfaces have a defect density less than 1 defect per 0.07 µm² of the surface. In certain examples, the top or bottom surface has, or both the top and bottom surfaces have, a defect density less than 1 defect per 0.06 µm² of the surface. In some examples, the top or bottom surface has a defect density less than 1 defect per 0.06 µm² of the surface. In some examples, both the top and bottom surfaces have a defect density less than 1 defect per 0.06 µm² of the surface. In yet other examples, the top or bottom surface has, or both the top and bottom surfaces have, a defect density less than 1 defect per 0.05 µm² of the surface. In some examples, the top or bottom surface has a defect density less than 1 defect per 0.05 µm² of the surface. In some examples, both the top and bottom surfaces have a defect density less than 1 defect per 0.05 µm² of the surface. In some examples, the top or bottom surface has, or both the top and bottom surfaces have, a defect density less than 1 defect per 0.04 µm² of the surface. In some examples, the top or bottom surface has a defect density less than 1 defect per 0.04 µm² of the surface. In some examples, both the top and bottom surfaces have a defect density less than 1 defect per 0.04 µm² of the surface. In other examples, the top or bottom surface has, or both the top and bottom surfaces have, a defect density less than 1 defect per 0.03 µm² of the surface. In some examples, the top or bottom surface has a defect density less than 1 defect per 0.03 µm² of the surface. In some examples, both the top and bottom surfaces have a defect density less than 1 defect per 0.03 µm² of the surface.

In certain examples, the top or bottom surface has, or both the top and bottom surfaces have, a defect density less than 1 defect per 0.02 µm² of the surface. In some examples, the top or bottom surface has a defect density less than 1 defect per 0.02 µm² of the surface. In some examples, both the top and bottom surfaces have a defect density less than 1 defect per 0.02 µm² of the surface. In yet other examples, the top or bottom surface has, or both the top and bottom surfaces have, a defect density less than 1 defect per 0.01 µm² of the surface. In some examples, the top or bottom surface has a defect density less than 1 defect per 0.01 µm² of the surface. In some examples, both the top and bottom surfaces have a defect density less than 1 defect per 0.01 µm² of the surface.

In some examples, set forth is a separator wherein the top or bottom surface has a lower areal surface defect density than does the bulk. In some examples, the top surface has a lower areal surface defect density than does the bulk. In some other examples, the bottom surface has a lower areal surface defect density than does the bulk. In some examples, both the top and bottom surfaces have a lower areal surface defect density than does the bulk.

In some examples, set forth is a separator wherein the top and bottom surfaces have a lower areal surface defect density than does the bulk.

In some examples, set forth is a separator wherein the ninety-ninth (99th) percentile pore aspect ratio of the pores on the top or bottom surface is less than the ninety-ninth (99th) percentile pore aspect ratio of the pores in the bulk. In certain examples, the ninety-ninth (99th) percentile pore aspect ratio of the pores on the top or bottom surface is less than 10 and greater than 0.1. In some of these examples, the ninety-ninth (99th) percentile pore aspect ratio of the pores on the top or bottom surface is 9.9, 9.8, 9.7, 9.6, 9.5, 9.4, 9.5, 9.4, 9.3, 9.2, 9.1, 9.0, 8.9, 8.8, 8.7, 8.6, 8.5, 8.4, 8.5, 8.4, 8.3, 8.2, 8.1, 8.0, 7.9, 7.8, 7.7, 7.6, 7.5, 7.4, 7.5, 7.4, 7.3, 7.2, 7.1, 7.0, 6.9, 6.8, 6.7, 6.6, 6.5, 6.4, 6.5, 6.4, 6.3, 6.2, 6.1, 6.0, 5.9, 5.8, 5.7, 5.6, 5.5, 5.4, 5.5, 5.4, 5.3, 5.2, 5.1, 5.0, 4.9, 4.8, 4.7, 4.6, 4.5, 4.4, 4.5, 4.4, 4.3, 4.2, 4.1, 4.0, 3.9, 3.8, 3.7, 3.6, 3.5, 3.4, 3.5, 3.4, 3.3, 3.2, 3.1, 3.0, 2.9, 2.8, 2.7, 2.6, 2.5, 2.4, 2.5, 2.4, 2.3, 2.2, 2.1, 2.0, 1.9, 1.8, 1.7, 1.6, 1.5, 1.4, 1.5, 1.4, 1.3, 1.2, 1.1, 1.0, 0.9, 0.8, 0.7, 0.6, 0.5, 0.4, 0.5, 0.4, 0.3, or 0.2. In some examples, set forth is a separator wherein the ninety-ninth (99th) percentile pore aspect ratio of the pores on the top and bottom surface are less than the ninety-ninth (99th) percentile pore aspect ratio of the pores in the bulk. In certain examples, the ninety-ninth (99th) percentile pore aspect ratio of the pores on the top and bottom surface are less than 10 and greater than 0.1. In some of these examples, the ninety-ninth (99th) percentile pore aspect ratio of the pores on the top and bottom surfaces are 9.9, 9.8, 9.7, 9.6, 9.5, 9.4, 9.5, 9.4, 9.3, 9.2, 9.1, 9.0, 8.9, 8.8, 8.7, 8.6, 8.5, 8.4, 8.5, 8.4, 8.3, 8.2, 8.1, 8.0, 7.9, 7.8, 7.7, 7.6, 7.5, 7.4, 7.5, 7.4, 7.3, 7.2, 7.1, 7.0, 6.9, 6.8, 6.7, 6.6, 6.5, 6.4, 6.5, 6.4, 6.3, 6.2, 6.1, 6.0, 5.9, 5.8, 5.7, 5.6, 5.5, 5.4, 5.5, 5.4, 5.3, 5.2, 5.1, 5.0, 4.9, 4.8, 4.7, 4.6, 4.5, 4.4, 4.5, 4.4, 4.3, 4.2, 4.1, 4.0, 3.9, 3.8, 3.7, 3.6, 3.5, 3.4, 3.5, 3.4, 3.3, 3.2, 3.1, 3.0, 2.9, 2.8, 2.7, 2.6, 2.5, 2.4, 2.5, 2.4, 2.3, 2.2, 2.1, 2.0, 1.9, 1.8, 1.7, 1.6, 1.5, 1.4, 1.5, 1.4, 1.3, 1.2, 1.1, 1.0, 0.9, 0.8, 0.7, 0.6, 0.5, 0.4, 0.5, 0.4, 0.3, or 0.2.

In certain examples, the ninety-ninth (99th) percentile pore aspect ratio of the pores on the top or bottom surface, or of the pores on both the top and bottom surfaces, is 9.9. In certain examples, the ninety-ninth (99th) percentile pore aspect ratio of the pores on the top or bottom surface is 9.9. In certain examples, the ninety-ninth (99th) percentile pore aspect ratio of the pores on both the top and bottom surfaces is 9.9. In certain other examples, the ninety-ninth (99th) percentile pore aspect ratio of the pores on the top or bottom surface, or of the pores on both the top and bottom surfaces, is 9.8. In certain examples, the ninety-ninth (99th) percentile pore aspect ratio of the pores on the top or bottom surface is 9.8. In certain examples, the ninety-ninth (99th) percentile pore aspect ratio of the pores on both the top and bottom surfaces is 9.8. In certain examples, the ninety-ninth (99th) percentile pore aspect ratio of the pores on the top or bottom surface, or of the pores on both the top and bottom surfaces, is 9.7. In certain examples, the ninety-ninth (99th) percentile pore aspect ratio of the pores on the top or bottom surface is 9.7. In certain examples, the ninety-ninth (99th) percentile pore aspect ratio of the pores on both the top and bottom surfaces is 9.7. In certain other examples, the ninety-ninth (99th) percentile pore aspect ratio of the pores on the top or bottom surface, or of the pores on both the top and bottom surfaces, is 9.6. In certain examples, the ninety-ninth (99th) percentile pore aspect ratio of the pores on the top or bottom surface is 9.6. In certain examples, the ninety-ninth (99th) percentile pore aspect ratio of the pores on both the top and bottom surfaces is 9.6. In certain other examples, the ninety-ninth (99th) percentile pore aspect ratio of the pores on the top or bottom surface, or of the pores on both the top and bottom surfaces, is 9.5. In certain examples, the ninety-ninth (99th) percentile pore aspect ratio of the pores on the top or bottom surface is 9.5. In certain examples, the ninety-ninth (99th) percentile pore aspect ratio of the pores on both the top and bottom surfaces is 9.5. In certain examples, the ninety-ninth (99th) percentile pore aspect ratio of the pores on the top or bottom surface, or of the pores on both the top and bottom surfaces, is 9.4. In certain examples, the ninety-ninth (99th) percentile pore aspect ratio of the pores on the top or bottom surface is 9.4. In certain examples, the ninety-ninth (99th) percentile pore aspect ratio of the pores on both the top and bottom surfaces is 9.4. In certain other examples, the ninety-ninth (99th) percentile pore aspect ratio of the pores on the top or bottom surface, or of the pores on both the top and bottom surfaces, is 9.3. In certain examples, the ninety-ninth (99th) percentile pore aspect ratio of the pores on the top or bottom surface is 9.3. In certain examples, the ninety-ninth (99th) percentile pore aspect ratio of the pores on both the top and bottom surfaces is 9.3. In certain other examples, the ninety-ninth (99th) percentile pore aspect ratio of the pores on the top or bottom surface, or of the pores on both the top and bottom surfaces, is 9.2. In certain examples, the ninety-ninth (99th) percentile pore aspect ratio of the pores on the top or bottom surface is 9.2. In certain examples, the ninety-ninth (99th) percentile pore aspect ratio of the pores on both the top and bottom surfaces is 9.2. In certain examples, the ninety-ninth (99th) percentile pore aspect ratio of the pores on the top or bottom surface, or of the pores on both the top and bottom surfaces, is 9.1. In certain examples, the ninety-ninth (99th) percentile pore aspect ratio of the pores on the top or bottom surface is 9.1. In certain examples, the ninety-ninth (99th) percentile pore aspect ratio of the pores on both the top and bottom surfaces is 9.1. In certain other examples, the ninety-ninth (99th) percentile pore aspect ratio of the pores on the top or bottom surface, or of the pores on both the top and bottom surfaces, is 9.0. In certain examples, the ninety-ninth (99th) percentile pore aspect ratio of the pores on the top or bottom surface is 9.0. In certain examples, the ninety-ninth (99th) percentile pore aspect ratio of the pores on both the top and bottom surfaces is 9.0.

In certain examples, the ninety-ninth (99th) percentile pore aspect ratio of the pores on the top or bottom surface, or of the pores on both the top and bottom surfaces, is 8.9.

In certain examples, the ninety-ninth (99th) percentile pore aspect ratio of the pores on the top or bottom surface is 8.9. In certain examples, the ninety-ninth (99th) percentile pore aspect ratio of the pores on both the top and bottom surfaces is 8.9. In certain other examples, the ninety-ninth (99th) percentile pore aspect ratio of the pores on the top or bottom surface, or of the pores on both the top and bottom surfaces, is 8.8. In certain examples, the ninety-ninth (99th) percentile pore aspect ratio of the pores on the top or bottom surface is 8.8. In certain examples, the ninety-ninth (99th) percentile pore aspect ratio of the pores on both the top and bottom surfaces is 8.8. In certain examples, the ninety-ninth (99th) percentile pore aspect ratio of the pores on the top or bottom surface, or of the pores on both the top and bottom surfaces, or of the pores on both the top and bottom surface, or of the pores on both the top and bottom surfaces, is 8.7. In certain examples, the ninety-ninth (99th) percentile pore aspect ratio of the pores on the top or bottom surface, or of the pores on both the top and bottom surfaces is 8.7. In certain examples, the ninety-ninth (99th) percentile pore aspect ratio of the pores on the top or bottom surface is 8.7. In certain examples, the ninety-ninth (99th) percentile pore aspect ratio of the pores on both the top and bottom surfaces is 8.7. In certain other examples, the ninety-ninth (99th) percentile pore aspect ratio of the pores on the top or bottom surface, or of the pores on both the top and bottom surfaces, is 8.6. In certain examples, the ninety-ninth (99th) percentile pore aspect ratio of the pores on the top or bottom surface is 8.6. In certain examples, the ninety-ninth (99th) percentile pore aspect ratio of the pores on both the top and bottom surfaces is 8.6. In certain other examples, the ninety-ninth (99th) percentile pore aspect ratio of the pores on the top or bottom surface, or of the pores on both the top and bottom surfaces, is 8.5. In certain examples, the ninety-ninth (99th) percentile pore aspect ratio of the pores on the top or bottom surface is 8.5. In certain examples, the ninety-ninth (99th) percentile pore aspect ratio of the pores on both the top and bottom surfaces is 8.5. In certain examples, the ninety-ninth (99th) percentile pore aspect ratio of the pores on the top or bottom surface, or of the pores on both the top and bottom surfaces, is 8.4. In certain examples, the ninety-ninth (99th) percentile pore aspect ratio of the pores on the top or bottom surface is 8.4. In certain examples, the ninety-ninth (99th) percentile pore aspect ratio of the pores on both the top and bottom surfaces is 8.4. In certain other examples, the ninety-ninth (99th) percentile pore aspect ratio of the pores on the top or bottom surface, or of the pores on both the top and bottom surfaces, is 8.3. In certain examples, the ninety-ninth (99th) percentile pore aspect ratio of the pores on the top or bottom surface is 8.3. In certain examples, the ninety-ninth (99th) percentile pore aspect ratio of the pores on both the top and bottom surfaces is 8.3. In certain other examples, the ninety-ninth (99th) percentile pore aspect ratio of the pores on the top or bottom surface, or of the pores on both the top and bottom surfaces, is 8.2. In certain examples, the ninety-ninth (99th) percentile pore aspect ratio of the pores on the top or bottom surface is 8.2. In certain examples, the ninety-ninth (99th) percentile pore aspect ratio of the pores on both the top and bottom surfaces is 8.2. In certain examples, the ninety-ninth (99th) percentile pore aspect ratio of the pores on the top or bottom surface, or of the pores on both the top and bottom surfaces, is 8.1. In certain examples, the ninety-ninth (99th) percentile pore aspect ratio of the pores on the top or bottom surface is 8.1. In certain examples, the ninety-ninth (99th) percentile pore aspect ratio of the pores on both the top and bottom surfaces is 8.1. In certain other examples, the ninety-ninth (99th) percentile pore aspect ratio of the pores on the top or bottom surface, or of the pores on both the top and bottom surfaces, is 8.0. In certain examples, the ninety-ninth (99th) percentile pore aspect ratio of the pores on the top or bottom surface is 8.0. In certain examples, the ninety-ninth (99th) percentile pore aspect ratio of the pores on both the top and bottom surfaces is 8.0.

In certain examples, the ninety-ninth (99th) percentile pore aspect ratio of the pores on the top or bottom surface, or of the pores on both the top and bottom surfaces, is 7.9. In certain examples, the ninety-ninth (99th) percentile pore aspect ratio of the pores on the top or bottom surface is 7.9. In certain examples, the ninety-ninth (99th) percentile pore aspect ratio of the pores on both the top and bottom surfaces is 7.9. In certain other examples, the ninety-ninth (99th) percentile pore aspect ratio of the pores on the top or bottom surface, or of the pores on both the top and bottom surfaces, is 7.8. In certain examples, the ninety-ninth (99th) percentile pore aspect ratio of the pores on the top or bottom surface is 7.8. In certain examples, the ninety-ninth (99th) percentile pore aspect ratio of the pores on both the top and bottom surfaces is 7.8. In certain examples, the ninety-ninth (99th) percentile pore aspect ratio of the pores on the top or bottom surface, or of the pores on both the top and bottom surfaces, is 7.7. In certain examples, the ninety-ninth (99th) percentile pore aspect ratio of the pores on the top or bottom surface is 7.7. In certain examples, the ninety-ninth (99th) percentile pore aspect ratio of the pores on both the top and bottom surfaces is 7.7. In certain other examples, the ninety-ninth (99th) percentile pore aspect ratio of the pores on the top or bottom surface, or of the pores on both the top and bottom surfaces, is 7.6. In certain examples, the ninety-ninth (99th) percentile pore aspect ratio of the pores on the top or bottom surface is 7.6. In certain examples, the ninety-ninth (99th) percentile pore aspect ratio of the pores on both the top and bottom surfaces is 7.6. In certain other examples, the ninety-ninth (99th) percentile pore aspect ratio of the pores on the top or bottom surface, or of the pores on both the top and bottom surfaces, is 7.5. In certain examples, the ninety-ninth (99th) percentile pore aspect ratio of the pores on the top or bottom surface is 7.5. In certain examples, the ninety-ninth (99th) percentile pore aspect ratio of the pores on both the top and bottom surfaces is 7.5. In certain examples, the ninety-ninth (99th) percentile pore aspect ratio of the pores on the top or bottom surface, or of the pores on both the top and bottom surfaces, is 7.4. In certain examples, the ninety-ninth (99th) percentile pore aspect ratio of the pores on the top or bottom surface is 7.4. In certain examples, the ninety-ninth (99th) percentile pore aspect ratio of the pores on both the top and bottom surfaces is 7.4. In certain other examples, the ninety-ninth (99th) percentile pore aspect ratio of the pores on the top or bottom surface, or of the pores on both the top and bottom surfaces, is 7.3. In certain examples, the ninety-ninth (99th) percentile pore aspect ratio of the pores on the top or bottom surface is 7.3. In certain examples, the ninety-ninth (99th) percentile pore aspect ratio of the pores on both the top and bottom surfaces is 7.3. In certain other examples, the ninety-ninth (99th) percentile pore aspect ratio of the pores on the top or bottom surface, or of the pores on both the top and bottom surfaces, is 7.2. In certain examples, the ninety-ninth (99th) percentile pore aspect ratio of the pores on the top or bottom surface is 7.2. In certain examples, the ninety-ninth (99th) percentile pore aspect ratio of the pores on both the top and bottom surfaces is 7.2. In certain examples, the ninety-ninth (99th) percentile pore aspect ratio of the pores on the top or bottom surface, or of the pores on both the top and bottom surfaces, is 7.1. In certain examples, the ninety-ninth (99th) percentile pore aspect ratio of the pores on the top or bottom surface is 7.1. In certain examples, the ninety-ninth (99th) percentile pore aspect ratio of the pores on both the top and bottom surfaces is 7.1. In certain other examples, the ninety-ninth (99th) percentile pore aspect ratio of the pores on the top or bottom surface, or of the pores on both the top and bottom surfaces, is 7.0. In certain examples, the ninety-ninth (99th) percentile pore aspect ratio of the pores on the top or bottom surface is 7.0. In certain examples, the ninety-ninth (99th) percentile pore aspect ratio of the pores on both the top and bottom surfaces is 7.0.

In certain examples, the ninety-ninth (99th) percentile pore aspect ratio of the pores on the top or bottom surface, or of the pores on both the top and bottom surfaces, is 6.9. In certain examples, the ninety-ninth (99th) percentile pore aspect ratio of the pores on the top or bottom surface is 6.9. In certain examples, the ninety-ninth (99th) percentile pore aspect ratio of the pores on both the top and bottom surfaces is 6.9. In certain other examples, the ninety-ninth (99th) percentile pore aspect ratio of the pores on the top or bottom surface, or of the pores on both the top and bottom surfaces, is 6.8. In certain examples, the ninety-ninth (99th) percentile pore aspect ratio of the pores on the top or bottom surface is 6.8. In certain examples, the ninety-ninth (99th) percentile pore aspect ratio of the pores on both the top and bottom surfaces is 6.8. In certain examples, the ninety-ninth (99th) percentile pore aspect ratio of the pores on the top or bottom surface, or of the pores on both the top and bottom surfaces, is 6.7. In certain examples, the ninety-ninth (99th) percentile pore aspect ratio of the pores on the top or bottom surface is 6.7. In certain examples, the ninety-ninth (99th) percentile pore aspect ratio of the pores on both the top and bottom surfaces is 6.7. In certain other examples, the ninety-ninth (99th) percentile pore aspect ratio of the pores on the top or bottom surface, or of the pores on both the top and bottom surfaces, is 6.6. In certain examples, the ninety-ninth (99th) percentile pore aspect ratio of the pores on the top or bottom surface is 6.6. In certain examples, the ninety-ninth (99th) percentile pore aspect ratio of the pores on both the top and bottom surfaces is 6.6. In certain other examples, the ninety-ninth (99th) percentile pore aspect ratio of the pores on the top or bottom surface, or of the pores on both the top and bottom surfaces, is 6.5. In certain examples, the ninety-ninth (99th) percentile pore aspect ratio of the pores on the top or bottom surface is 6.5. In certain examples, the ninety-ninth (99th) percentile pore aspect ratio of the pores on both the top and bottom surfaces is 6.5. In certain examples, the ninety-ninth (99th) percentile pore aspect ratio of the pores on the top or bottom surface, or of the pores on both the top and bottom surfaces, is 6.4. In certain examples, the ninety-ninth (99th) percentile pore aspect ratio of the pores on the top or bottom surface is 6.4. In certain examples, the ninety-ninth (99th) percentile pore aspect ratio of the pores on both the top and bottom surfaces is 6.4. In certain other examples, the ninety-ninth (99th) percentile pore aspect ratio of the pores on the top or bottom surface, or of the pores on both the top and bottom surfaces, is 6.3. In certain examples, the ninety-ninth (99th) percentile pore aspect ratio of the pores on the top or bottom surface is 6.3. In certain examples, the ninety-ninth (99th) percentile pore aspect ratio of the pores on both the top and bottom surfaces is 6.3. In certain other examples, the ninety-ninth (99th) percentile pore aspect ratio of the pores on the top or bottom surface, or of the pores on both the top and bottom surfaces, is 6.2. In certain examples, the ninety-ninth (99th) percentile pore aspect ratio of the pores on the top or bottom surface is 6.2. In certain examples, the ninety-ninth (99th) percentile pore aspect ratio of the pores on both the top and bottom surfaces is 6.2. In certain examples, the ninety-ninth (99th) percentile pore aspect ratio of the pores on the top or bottom surface, or of the pores on both the top and bottom surfaces, is 6.1. In certain examples, the ninety-ninth (99th) percentile pore aspect ratio of the pores on the top or bottom surface is 6.1. In certain examples, the ninety-ninth (99th) percentile pore aspect ratio of the pores on both the top and bottom surfaces is 6.1. In certain other examples, the ninety-ninth (99th) percentile pore aspect ratio of the pores on the top or bottom surface, or of the pores on both the top and bottom surfaces, is 6.0. In certain examples, the ninety-ninth (99th) percentile pore aspect ratio of the pores on the top or bottom surface is 6.0. In certain examples, the ninety-ninth (99th) percentile pore aspect ratio of the pores on both the top and bottom surfaces is 6.0.

In certain examples, the ninety-ninth (99th) percentile pore aspect ratio of the pores on the top or bottom surface, or of the pores on both the top and bottom surfaces, is 5.9. In certain examples, the ninety-ninth (99th) percentile pore aspect ratio of the pores on the top or bottom surface is 5.9. In certain examples, the ninety-ninth (99th) percentile pore aspect ratio of the pores on both the top and bottom surfaces is 5.9. In certain other examples, the ninety-ninth (99th) percentile pore aspect ratio of the pores on the top or bottom surface, or of the pores on both the top and bottom surfaces, is 5.8. In certain examples, the ninety-ninth (99th) percentile pore aspect ratio of the pores on the top or bottom surface is 5.8. In certain examples, the ninety-ninth (99th) percentile pore aspect ratio of the pores on both the top and bottom surfaces is 5.8. In certain examples, the ninety-ninth (99th) percentile pore aspect ratio of the pores on the top or bottom surface, or of the pores on both the top and bottom surfaces, is 5.7. In certain examples, the ninety-ninth (99th) percentile pore aspect ratio of the pores on the top or bottom surface is 5.7. In certain examples, the ninety-ninth (99th) percentile pore aspect ratio of the pores on both the top and bottom surfaces is 5.7. In certain other examples, the ninety-ninth (99th) percentile pore aspect ratio of the pores on the top or bottom surface, or of the pores on both the top and bottom surfaces, is 5.6. In certain examples, the ninety-ninth (99th) percentile pore aspect ratio of the pores on the top or bottom surface is 5.6. In certain examples, the ninety-ninth (99th) percentile pore aspect ratio of the pores on both the top and bottom surfaces is 5.6. In certain other examples, the ninety-ninth (99th) percentile pore aspect ratio of the pores on the top or bottom surface, or of the pores on both the top and bottom surfaces, is 5.5. In certain examples, the ninety-ninth (99th) percentile pore aspect ratio of the pores on the top or bottom surface is 5.5. In certain examples, the ninety-ninth (99th) percentile pore aspect ratio of the pores on both the top and bottom surfaces is 5.5. In certain examples, the ninety-ninth (99th) percentile pore aspect ratio of the pores on the top or bottom surface, or of the pores on both the top and bottom surfaces, is 5.4. In certain examples, the ninety-ninth (99th) percentile pore aspect ratio of the pores on the top or bottom surface is 5.4. In certain examples, the ninety-ninth (99th) percentile pore aspect ratio of the pores on both the top and bottom surfaces is 5.4. In certain other examples, the ninety-ninth (99th) percentile pore aspect ratio of the pores on the top or bottom surface, or of the pores on both the top and bottom surfaces, is 5.3. In certain examples, the ninety-ninth (99th) percentile pore aspect ratio of the pores on the top or bottom surface is 5.3. In certain examples, the ninety-ninth (99th) percentile pore aspect ratio of the pores on both the top and bottom surfaces is 5.3. In certain other examples, the ninety-ninth (99th) percentile pore aspect ratio of the pores on the top or bottom surface, or of the pores on both the top and bottom surfaces, is 5.2. In certain examples, the ninety-ninth (99th) percentile pore aspect ratio of the pores on the top or bottom surface is 5.2. In certain examples, the ninety-ninth (99th) percentile pore aspect ratio of the pores on both the top and bottom surfaces is 5.2. In certain examples, the ninety-ninth (99th) percentile pore aspect ratio of the pores on the top or bottom surface, or of the pores on both the top and bottom surfaces, is 5.1. In certain examples, the ninety-ninth (99th) percentile pore aspect ratio of the pores on the top or bottom surface is 5.1. In certain examples, the ninety-ninth (99th) percentile pore aspect ratio of the pores on both the top and bottom surfaces is 5.1. In certain other examples, the ninety-ninth (99th) percentile pore aspect ratio of the pores on the top or bottom surface, or of the pores on both the top and bottom surfaces, is 5.0. In certain examples, the ninety-ninth (99th) percentile pore aspect ratio of the pores on the top or bottom surface is 5.0. In certain examples, the ninety-ninth (99th) percentile pore aspect ratio of the pores on both the top and bottom surfaces is 5.0.

In certain examples, the ninety-ninth (99th) percentile pore aspect ratio of the pores on the top or bottom surface, or of the pores on both the top and bottom surfaces, is 4.9. In certain examples, the ninety-ninth (99th) percentile pore aspect ratio of the pores on the top or bottom surface is 4.9. In certain examples, the ninety-ninth (99th) percentile pore aspect ratio of the pores on both the top and bottom surfaces is 4.9. In certain other examples, the ninety-ninth (99th) percentile pore aspect ratio of the pores on the top or bottom surface, or of the pores on both the top and bottom surfaces, is 4.8. In certain examples, the ninety-ninth (99th) percentile pore aspect ratio of the pores on the top or bottom surface is 4.8. In certain examples, the ninety-ninth (99th) percentile pore aspect ratio of the pores on both the top and bottom surfaces is 4.8. In certain examples, the ninety-ninth (99th) percentile pore aspect ratio of the pores on the top or bottom surface, or of the pores on both the top and bottom surfaces, is 4.7. In certain examples, the ninety-ninth (99th) percentile pore aspect ratio of the pores on the top or bottom surface is 4.7. In certain examples, the ninety-ninth (99th) percentile pore aspect ratio of the pores on both the top and bottom surfaces is 4.7. In certain other examples, the ninety-ninth (99th) percentile pore aspect ratio of the pores on the top or bottom surface, or of the pores on both the top and bottom surfaces, is 4.6. In certain examples, the ninety-ninth (99th) percentile pore aspect ratio of the pores on the top or bottom surface is 4.6. In certain examples, the ninety-ninth (99th) percentile pore aspect ratio of the pores on both the top and bottom surfaces is 4.6. In certain other examples, the ninety-ninth (99th) percentile pore aspect ratio of the pores on the top or bottom surface, or of the pores on both the top and bottom surfaces, is 4.5. In certain examples, the ninety-ninth (99th) percentile pore aspect ratio of the pores on the top or bottom surface is 4.5. In certain examples, the ninety-ninth (99th) percentile pore aspect ratio of the pores on both the top and bottom surfaces is 4.5. In certain examples, the ninety-ninth (99th) percentile pore aspect ratio of the pores on the top or bottom surface, or of the pores on both the top and bottom surfaces, is 4.4. In certain examples, the ninety-ninth (99th) percentile pore aspect ratio of the pores on the top or bottom surface is 4.4. In certain examples, the ninety-ninth (99th) percentile pore aspect ratio of the pores on both the top and bottom surfaces is 4.4. In certain other examples, the ninety-ninth (99th) percentile pore aspect ratio of the pores on the top or bottom surface, or of the pores on both the top and bottom surfaces, is 4.3. In certain examples, the ninety-ninth (99th) percentile pore aspect ratio of the pores on the top or bottom surface is 4.3. In certain examples, the ninety-ninth (99th) percentile pore aspect ratio of the pores on both the top and bottom surfaces is 4.3. In certain other examples, the ninety-ninth (99th) percentile pore aspect ratio of the pores on the top or bottom surface, or of the pores on both the top and bottom surfaces, is 4.2. In certain examples, the ninety-ninth (99th) percentile pore aspect ratio of the pores on the top or bottom surface is 4.2. In certain examples, the ninety-ninth (99th) percentile pore aspect ratio of the pores on both the top and bottom surfaces is 4.2. In certain examples, the ninety-ninth (99th) percentile pore aspect ratio of the pores on the top or bottom surface, or of the pores on both the top and bottom surfaces, is 4.1. In certain examples, the ninety-ninth (99th) percentile pore aspect ratio of the pores on the top or bottom surface is 4.1. In certain examples, the ninety-ninth (99th) percentile pore aspect ratio of the pores on both the top and bottom surfaces is 4.1. In certain other examples, the ninety-ninth (99th) percentile pore aspect ratio of the pores on the top or bottom surface, or of the pores on both the top and bottom surfaces, is 4.0. In certain examples, the ninety-ninth (99th) percentile pore aspect ratio of the pores on the top or bottom surface is 4.0. In certain examples, the ninety-ninth (99th) percentile pore aspect ratio of the pores on both the top and bottom surfaces is 4.0.

In certain examples, the ninety-ninth (99th) percentile pore aspect ratio of the pores on the top or bottom surface, or of the pores on both the top and bottom surfaces, is 3.9. In certain examples, the ninety-ninth (99th) percentile pore aspect ratio of the pores on the top or bottom surface is 3.9. In certain examples, the ninety-ninth (99th) percentile pore aspect ratio of the pores on both the top and bottom surfaces is 3.9. In certain other examples, the ninety-ninth (99th) percentile pore aspect ratio of the pores on the top or bottom surface, or of the pores on both the top and bottom surfaces, is 3.8. In certain examples, the ninety-ninth (99th) percentile pore aspect ratio of the pores on the top or bottom surface is 3.8. In certain examples, the ninety-ninth (99th) percentile pore aspect ratio of the pores on both the top and bottom surfaces is 3.8. In certain examples, the ninety-ninth (99th) percentile pore aspect ratio of the pores on the top or bottom surface, or of the pores on both the top and bottom surfaces, is 3.7. In certain examples, the ninety-ninth (99th) percentile pore aspect ratio of the pores on the top or bottom surface is 3.7. In certain examples, the ninety-ninth (99th) percentile pore aspect ratio of the pores on both the top and bottom surfaces is 3.7. In certain other examples, the ninety-ninth (99th) percentile pore aspect ratio of the pores on the top or bottom surface, or of the pores on both the top and bottom surfaces, is 3.6. In certain examples, the ninety-ninth (99th) percentile pore aspect ratio of the pores on the top or bottom surface is 3.6. In certain examples, the ninety-ninth (99th) percentile pore aspect ratio of the pores on both the top and bottom surfaces is 3.6. In certain other examples, the ninety-ninth (99th) percentile pore aspect ratio of the pores on the top or bottom surface, or of the pores on both the top and bottom surfaces, is 3.5. In certain examples, the ninety-ninth (99th) percentile pore aspect ratio of the pores on the top or bottom surface is 3.5. In certain examples, the ninety-ninth (99th) percentile pore aspect ratio of the pores on both the top and bottom surfaces is 3.5. In certain examples, the ninety-ninth (99th) percentile pore aspect ratio of the pores on the top or bottom surface, or of the pores on both the top and bottom surfaces, is 3.4. In certain examples, the ninety-ninth (99th) percentile pore aspect ratio of the pores on the top or bottom surface is 3.4. In certain examples, the ninety-ninth (99th) percentile pore aspect ratio of the pores on both the top and bottom surfaces is 3.4. In certain other examples, the ninety-ninth (99th) percentile pore aspect ratio of the pores on the top or bottom surface, or of the pores on both the top and bottom surfaces, is 3.3. In certain examples, the ninety-ninth (99th) percentile pore aspect ratio of the pores on the top or bottom surface is 3.3. In certain examples, the ninety-ninth (99th) percentile pore aspect ratio of the pores on both the top and bottom surfaces is 3.3. In certain other examples, the ninety-ninth (99th) percentile pore aspect ratio of the pores on the top or bottom surface, or of the pores on both the top and bottom surfaces, is 3.2. In certain examples, the ninety-ninth (99th) percentile pore aspect ratio of the pores on the top or bottom surface is 3.2. In certain examples, the ninety-ninth (99th) percentile pore aspect ratio of the pores on both the top and bottom surfaces is 3.2. In certain examples, the ninety-ninth (99th) percentile pore aspect ratio of the pores on the top or bottom surface, or of the pores on both the top and bottom surfaces, is 3.1. In certain examples, the ninety-ninth (99th) percentile pore aspect ratio of the pores on the top or bottom surface is 3.1. In certain examples, the ninety-ninth (99th) percentile pore aspect ratio of the pores on both the top and bottom surfaces is 3.1. In certain other examples, the ninety-ninth (99th) percentile pore aspect ratio of the pores on the top or bottom surface, or of the pores on both the top and bottom surfaces, is 3.0. In certain examples, the ninety-ninth (99th) percentile pore aspect ratio of the pores on the top or bottom surface is 3.0. In certain examples, the ninety-ninth (99th) percentile pore aspect ratio of the pores on both the top and bottom surfaces is 3.0.

In certain examples, the ninety-ninth (99th) percentile pore aspect ratio of the pores on the top or bottom surface, or of the pores on both the top and bottom surfaces, is 2.9. In certain examples, the ninety-ninth (99th) percentile pore aspect ratio of the pores on the top or bottom surface is 2.9. In certain examples, the ninety-ninth (99th) percentile pore aspect ratio of the pores on both the top and bottom surfaces is 2.9. In certain other examples, the ninety-ninth (99th) percentile pore aspect ratio of the pores on the top or bottom surface, or of the pores on both the top and bottom surfaces, is 2.8. In certain examples, the ninety-ninth (99th) percentile pore aspect ratio of the pores on the top or bottom surface is 2.8. In certain examples, the ninety-ninth (99th) percentile pore aspect ratio of the pores on both the top and bottom surfaces is 2.8. In certain examples, the ninety-ninth (99th) percentile pore aspect ratio of the pores on the top or bottom surface, or of the pores on both the top and bottom surfaces, is 2.7. In certain examples, the ninety-ninth (99th) percentile pore aspect ratio of the pores on the top or bottom surface is 2.7. In certain examples, the ninety-ninth (99th) percentile pore aspect ratio of the pores on both the top and bottom surfaces is 2.7. In certain other examples, the ninety-ninth (99th) percentile pore aspect ratio of the pores on the top or bottom surface, or of the pores on both the top and bottom surfaces, is 2.6. In certain examples, the ninety-ninth (99th) percentile pore aspect ratio of the pores on the top or bottom surface is 2.6. In certain examples, the ninety-ninth (99th) percentile pore aspect ratio of the pores on both the top and bottom surfaces is 2.6. In certain other examples, the ninety-ninth (99th) percentile pore aspect ratio of the pores on the top or bottom surface, or of the pores on both the top and bottom surfaces, is 2.5. In certain examples, the ninety-ninth (99th) percentile pore aspect ratio of the pores on the top or bottom surface is 2.5. In certain examples, the ninety-ninth (99th) percentile pore aspect ratio of the pores on both the top and bottom surfaces is 2.5. In certain examples, the ninety-ninth (99th) percentile pore aspect ratio of the pores on the top or bottom surface, or of the pores on both the top and bottom surfaces, is 2.4. In certain examples, the ninety-ninth (99th) percentile pore aspect ratio of the pores on the top or bottom surface is 2.4. In certain examples, the ninety-ninth (99th) percentile pore aspect ratio of the pores on both the top and bottom surfaces is 2.4. In certain other examples, the ninety-ninth (99th) percentile pore aspect ratio of the pores on the top or bottom surface, or of the pores on both the top and bottom surfaces, is 2.3. In certain examples, the ninety-ninth (99th) percentile pore aspect ratio of the pores on the top or bottom surface is 2.3. In certain examples, the ninety-ninth (99th) percentile pore aspect ratio of the pores on both the top and bottom surfaces is 2.3. In certain other examples, the ninety-ninth (99th) percentile pore aspect ratio of the pores on the top or bottom surface, or of the pores on both the top and bottom surfaces, is 2.2. In certain examples, the ninety-ninth (99th) percentile pore aspect ratio of the pores on the top or bottom surface is 2.2. In certain examples, the ninety-ninth (99th) percentile pore aspect ratio of the pores on both the top and bottom surfaces is 2.2. In certain examples, the ninety-ninth (99th) percentile pore aspect ratio of the pores on the top or bottom surface, or of the pores on both the top and bottom surfaces, is 2.1. In certain examples, the ninety-ninth (99th) percentile pore aspect ratio of the pores on the top or bottom surface is 2.1. In certain examples, the ninety-ninth (99th) percentile pore aspect ratio of the pores on both the top and bottom surfaces is 2.1. In certain other examples, the ninety-ninth (99th) percentile pore aspect ratio of the pores on the top or bottom surface, or of the pores on both the top and bottom surfaces, is 2.0. In certain examples, the ninety-ninth (99th) percentile pore aspect ratio of the pores on the top or bottom surface is 2.0. In certain examples, the ninety-ninth (99th) percentile pore aspect ratio of the pores on both the top and bottom surfaces is 2.0.

In certain examples, the ninety-ninth (99th) percentile pore aspect ratio of the pores on the top or bottom surface, or of the pores on both the top and bottom surfaces, is 1.9. In certain examples, the ninety-ninth (99th) percentile pore aspect ratio of the pores on the top or bottom surface is 1.9. In certain examples, the ninety-ninth (99th) percentile pore aspect ratio of the pores on both the top and bottom surfaces is 1.9. In certain other examples, the ninety-ninth (99th) percentile pore aspect ratio of the pores on the top or bottom surface, or of the pores on both the top and bottom surfaces, is 1.8. In certain examples, the ninety-ninth (99th) percentile pore aspect ratio of the pores on the top or bottom surface is 1.8. In certain examples, the ninety-ninth (99th) percentile pore aspect ratio of the pores on both the top and bottom surfaces is 1.8. In certain examples, the ninety-ninth (99th) percentile pore aspect ratio of the pores on the top or bottom surface, or of the pores on both the top and bottom surfaces, is 1.7. In certain examples, the ninety-ninth (99th) percentile pore aspect ratio of the pores on the top or bottom surface is 1.7. In certain examples, the ninety-ninth (99th) percentile pore aspect ratio of the pores on both the top and bottom surfaces is 1.7. In certain other examples, the ninety-ninth (99th) percentile pore aspect ratio of the pores on the top or bottom surface, or of the pores on both the top and bottom surfaces, is 1.6. In certain examples, the ninety-ninth (99th) percentile pore aspect ratio of the pores on the top or bottom surface is 1.6. In certain examples, the ninety-ninth (99th) percentile pore aspect ratio of the pores on both the top and bottom surfaces is 1.6. In certain other examples, the ninety-ninth (99th) percentile pore aspect ratio of the pores on the top or bottom surface, or of the pores on both the top and bottom surfaces, is 1.5. In certain examples, the ninety-ninth (99th) percentile pore aspect ratio of the pores on the top or bottom surface is 1.5. In certain examples, the ninety-ninth (99th) percentile pore aspect ratio of the pores on both the top and bottom surfaces is 1.5. In certain examples, the ninety-ninth (99th) percentile pore aspect ratio of the pores on the top or bottom surface, or of the pores on both the top and bottom surfaces, is 1.4. In certain examples, the ninety-ninth (99th) percentile pore aspect ratio of the pores on the top or bottom surface is 1.4. In certain examples, the ninety-ninth (99th) percentile pore aspect ratio of the pores on both the top and bottom surfaces is 1.4. In certain other examples, the ninety-ninth (99th) percentile pore aspect ratio of the pores on the top or bottom surface, or of the pores on both the top and bottom surfaces, is 1.3. In certain examples, the ninety-ninth (99th) percentile pore aspect ratio of the pores on the top or bottom surface is 1.3. In certain examples, the ninety-ninth (99th) percentile pore aspect ratio of the pores on both the top and bottom surfaces is 1.3. In certain other examples, the ninety-ninth (99th) percentile pore aspect ratio of the pores on the top or bottom surface, or of the pores on both the top and bottom surfaces, is 1.2. In certain examples, the ninety-ninth (99th) percentile pore aspect ratio of the pores on the top or bottom surface is 1.2. In certain examples, the ninety-ninth (99th) percentile pore aspect ratio of the pores on both the top and bottom surfaces is 1.2. In certain examples, the ninety-ninth (99th) percentile pore aspect ratio of the pores on the top or bottom surface, or of the pores on both the top and bottom surfaces, is 1.1. In certain examples, the ninety-ninth (99th) percentile pore aspect ratio of the pores on the top or bottom surface is 1.1. In certain examples, the ninety-ninth (99th) percentile pore aspect ratio of the pores on both the top and bottom surfaces is 1.1. In certain other examples, the ninety-ninth (99th) percentile pore aspect ratio of the pores on the top or bottom surface, or of the pores on both the top and bottom surfaces, is 1.0. In certain examples, the ninety-ninth (99th) percentile pore aspect ratio of the pores on the top or bottom surface is 1.0. In certain examples, the ninety-ninth (99th) percentile pore aspect ratio of the pores on both the top and bottom surfaces is 1.0.

In certain examples, the ninety-ninth (99th) percentile pore aspect ratio of the pores on the top or bottom surface, or of the pores on both the top and bottom surfaces, is 0.9. In certain examples, the ninety-ninth (99th) percentile pore aspect ratio of the pores on the top or bottom surface is 0.9. In certain examples, the ninety-ninth (99th) percentile pore aspect ratio of the pores on both the top and bottom surfaces is 0.9. In certain other examples, the ninety-ninth (99th) percentile pore aspect ratio of the pores on the top or bottom surface, or of the pores on both the top and bottom surfaces, is 0.8. In certain examples, the ninety-ninth (99th) percentile pore aspect ratio of the pores on the top or bottom surface is 0.8. In certain examples, the ninety-ninth (99th) percentile pore aspect ratio of the pores on both the top and bottom surfaces is 0.8. In certain examples, the ninety-ninth (99th) percentile pore aspect ratio of the pores on the top or bottom surface, or of the pores on both the top and bottom surfaces, is 0.7. In certain examples, the ninety-ninth (99th) percentile pore aspect ratio of the pores on the top or bottom surface is 0.7. In certain examples, the ninety-ninth (99th) percentile pore aspect ratio of the pores on both the top and bottom surfaces is 0.7. In certain other examples, the ninety-ninth (99th) percentile pore aspect ratio of the pores on the top or bottom surface, or of the pores on both the top and bottom surfaces, is 0.6. In certain examples, the ninety-ninth (99th) percentile pore aspect ratio of the pores on the top or bottom surface is 0.6. In certain examples, the ninety-ninth (99th) percentile pore aspect ratio of the pores on both the top and bottom surfaces is 0.6. In certain other examples, the ninety-ninth (99th) percentile pore aspect ratio of the pores on the top or bottom surface, or of the pores on both the top and bottom surfaces, is 0.5. In certain examples, the ninety-ninth (99th) percentile pore aspect ratio of the pores on the top or bottom surface is 0.5. In certain examples, the ninety-ninth (99th) percentile pore aspect ratio of the pores on both the top and bottom surfaces is 0.5. In certain examples, the ninety-ninth (99th) percentile pore aspect ratio of the pores on the top or bottom surface, or of the pores on both the top and bottom surfaces, is 0.4. In certain examples, the ninety-ninth (99th) percentile pore aspect ratio of the pores on the top or bottom surface is 0.4. In certain examples, the ninety-ninth (99th) percentile pore aspect ratio of the pores on both the top and bottom surfaces is 0.4. In certain other examples, the ninety-ninth (99th) percentile pore aspect ratio of the pores on the top or bottom surface, or of the pores on both the top and bottom surfaces, is 0.3. In certain examples, the ninety-ninth (99th) percentile pore aspect ratio of the pores on the top or bottom surface is 0.3. In certain examples, the ninety-ninth (99th) percentile pore aspect ratio of the pores on both the top and bottom surfaces is 0.3. In certain other examples, the ninety-ninth (99th) percentile pore aspect ratio of the pores on the top or bottom surface, or of the pores on both the top and bottom surfaces, is 0.2. In certain examples, the ninety-ninth (99th) percentile pore aspect ratio of the pores on the top or bottom surface is 0.2. In certain examples, the ninety-ninth (99th) percentile pore aspect ratio of the pores on both the top and bottom surfaces is 0.2. In certain examples, the ninety-ninth (99th) percentile pore aspect ratio of the pores on the top or bottom surface, or of the pores on both the top and bottom surfaces, is 0.15. In certain examples, the ninety-ninth (99th) percentile pore aspect ratio of the pores on the top or bottom surface is 0.15. In certain examples, the ninety-ninth (99th) percentile pore aspect ratio of the pores on both the top and bottom surfaces is 0.15. In certain other examples, the ninety-ninth (99th) percentile pore aspect ratio of the pores on the top or bottom surface, or of the pores on both the top and bottom surfaces, is 0.11. In certain examples, the ninety-ninth (99th) percentile pore aspect ratio of the pores on the top or bottom surface is 0.11. In certain examples, the ninety-ninth (99th) percentile pore aspect ratio of the pores on both the top and bottom surfaces is 0.11.

In some examples, set forth herein is a separator wherein the ninety-ninth (99th) percentile pore aspect ratio of the pores on the top or bottom surface, or of the pores on both the top and bottom surfaces, is less than 4, less than 4.5, less than 4.0, less than 3.5, less than 3.0, less than 2.5, less than 2.0, less than 1.5, less than 1, or less than 0.5. In some examples, set forth herein is a separator wherein the ninety-ninth (99th) percentile pore aspect ratio of the pores on the top or bottom surface is less than 4, less than 4.5, less than 4.0, less than 3.5, less than 3.0, less than 2.5, less than 2.0, less than 1.5, less than 1, or less than 0.5. In some examples, set forth herein is a separator wherein the ninety-ninth (99th) percentile pore aspect ratio of the pores on both the top and bottom surfaces, is less than 4, less than 4.5, less than 4.0, less than 3.5, less than 3.0, less than 2.5, less than 2.0, less than 1.5, less than 1, or less than 0.5.

In some examples, set forth is a separator wherein the top or bottom surface is more dense than the bulk. In some examples, the top or bottom surface is more dense than the bulk by a factor of 1.01, 1.02, 1.05, 1.07, 1.1, 1.2, 1.3, 1.4, 1.5, 1.6, 1.7, 1.8, 1.9, or 2.0.

In some examples, set forth is a separator wherein both the top and bottom surfaces are more dense than the bulk. In some examples, both the top and bottom surfaces are more dense than the bulk by a factor of 1.01, 1.02, 1.05, 1.07, 1.1, 1.2, 1.3, 1.4, 1.5, 1.6, 1.7, 1.8, 1.9, or 2.0.

In some embodiments, set forth is a separator wherein the top or bottom surface, or both the top and bottom surfaces, are more dense than the bulk by a factor in the range of 1.0 to 2.0. In some embodiments, set forth is a separator wherein the top or bottom surface are more dense than the bulk by a factor in the range of 1.0 to 2.0. In some embodiments, set forth is a separator wherein both the top and bottom surfaces, are more dense than the bulk by a factor in the range of 1.0 to 2.0. In some embodiments, set forth is a separator wherein the top or bottom surface, or both the top and bottom surfaces, are more dense than the bulk by a factor in the range of 1.0 to 1.6. In some embodiments, set forth is a separator wherein the top or bottom surface are more dense than the bulk by a factor in the range of 1.0 to 1.6. In some embodiments, set forth is a separator wherein both the top and bottom surfaces are more dense than the bulk by a factor in the range of 1.0 to 1.6. In some embodiments, set forth is a separator wherein the top or bottom surface, or both the top and bottom surfaces, are more dense than the bulk by a factor in the range of 1.2 to 1.8. In some embodiments, set forth is a separator wherein the top or bottom surface are more dense than the bulk by a factor in the range of 1.2 to 1.8. In some embodiments, set forth is a separator wherein both the top and bottom surfaces are more dense than the bulk by a factor in the range of 1.2 to 1.8. In some embodiments, set forth is a separator wherein the top or bottom surface, or both the top and bottom surfaces, are more dense than the bulk by a factor in the range of 1.4 to 2.0. In some embodiments, set forth is a separator wherein the top or bottom surface are more dense than the bulk by a factor in the range of 1.4 to 2.0. In some embodiments, set forth is a separator wherein both the top and bottom surfaces are more dense than the bulk by a factor in the range of 1.4 to 2.0.

In some examples, set forth is a separator wherein the top or bottom surface, or both, is less crystalline than the bulk. In some examples, set forth is a separator wherein the top or bottom surface is less crystalline than the bulk. In some examples, set forth is a separator wherein both the top and bottom surfaces are less crystalline than the bulk. In some examples, set forth is a separator wherein the top or bottom surface, or both, is amorphous and the bulk is a combination of amorphous and crystalline. In some examples, set forth is a separator wherein the top or bottom surface is amorphous and the bulk is a combination of amorphous and crystalline. In some examples, set forth is a separator wherein both the top and bottom surfaces are amorphous and the bulk is a combination of amorphous and crystalline. In some examples, set forth is a separator wherein the top or bottom surface, or both, is amorphous and crystalline, and the bulk is a combination of amorphous and crystalline, but the mean diameter and/or $90^{th}$ percentile diameter of crystals in direct contact with the top or bottom surface, or both, is smaller than the mean diameter and/or $90^{th}$ percentile diameter of crystals not in direct contact with the top or bottom surface. In some examples, set forth is a separator wherein the top or bottom surface is amorphous and crystalline, and the bulk is a combination of amorphous and crystalline, but the mean diameter and/or $90^{th}$ percentile diameter of crystals in direct contact with the top or bottom surface is smaller than the mean diameter and/or $90^{th}$ percentile diameter of crystals not in direct contact with the top or bottom surface. In some examples, set forth is a separator wherein the top and bottom surfaces are amorphous and crystalline, and the bulk is a combination of amorphous and crystalline, but the mean diameter and/or $90^{th}$ percentile diameter of crystals in direct contact with the top and bottom surface are smaller than the mean diameter and/or $90^{th}$ percentile diameter of crystals not in direct contact with the top or bottom surface. The crystal diameter is determined by quantitative image analysis of SEM top-down or cross-sectional image(s).

In some examples, set forth is a separator wherein the grain size distribution at the top or bottom surface is larger than the grain size distribution in the bulk.

In some examples, set forth is a separator wherein the grain size distribution at the top and bottom surfaces is larger than the grain size distribution in the bulk.

In some examples, set forth is a separator wherein the the $d_{90}$ grain size at the top or bottom surface is larger than the $d_{90}$ grain size in the bulk.

In some examples, set forth is a separator wherein the the $d_{90}$ grain size at both the top and bottom surfaces is larger than the $d_{90}$ grain size in the bulk.

In some examples, set forth is a separator wherein the separator is a thin film.

In some examples, set forth is a separator wherein the separator is a monolith.

In some examples, set forth is a separator wherein the separator is an inorganic body.

In some examples, set forth is a separator wherein the thickness between the top and bottom surfaces is between 1 μm and 100 μm. In some examples, the thickness between the top and bottom surfaces is between 1 μm and 50 μm. In some examples, the thickness between the top and bottom surfaces is between 1 μm and 25 μm. In some examples, the thickness between the top and bottom surfaces is between 1 μm and 10 μm.

In some examples, set forth is a separator wherein the thickness between the top and bottom surfaces is between 5 μm and 100 μm. In some examples, the thickness between the top and bottom surfaces is between 5 μm and 50 μm. In some examples, the thickness between the top and bottom surfaces is between 5 μm and 25 μm. In some examples, the thickness between the top and bottom surfaces is between 5 μm and 10 μm.

In some examples, set forth is a separator wherein the thickness between the top and bottom surfaces is between 10 μm and 100 μm. In some examples, the thickness between the top and bottom surfaces is between 10 μm and 50 μm. In some examples, the thickness between the top and bottom surfaces is between 10 μm and 25 μm. In some examples, the thickness between the top and bottom surfaces is between 10 μm and 10 μm.

In some examples, set forth is a separator wherein the thickness between the top and bottom surfaces is between 15 μm and 100 μm. In some examples, the thickness between the top and bottom surfaces is between 15 μm and 50 μm. In some examples, the thickness between the top and bottom surfaces is between 15 μm and 25 μm.

In some examples, set forth is a separator wherein the thickness between the top and bottom surfaces is between 20 μm and 100 μm. In some examples, the thickness between the top and bottom surfaces is between 20 μm and 50 μm. In some examples, the thickness between the top and bottom surfaces is between 20 μm and 25 μm.

In some examples, set forth is a separator wherein the thickness between the top and bottom surfaces is between 30 μm and 100 μm. In some examples, the thickness between the top and bottom surfaces is between 30 μm and 50 μm.

In some examples, set forth is a separator wherein the grain size distribution at the top or bottom surface is larger than the grain size distribution in the bulk.

In some examples, set forth is a separator wherein the grain size distribution at the top and bottom surface is larger than the grain size distribution in the bulk.

In some examples, set forth is thin film lithium-stuffed garnet electrolyte, wherein the thin film is substantially homogenous within x- and y-dimensions; and wherein the thin film is inhomogeneous with respect to the z-axis. In these films, the z-axis is the axis perpendicular, or substantially perpendicular to the top or bottom surface. In other words, the z-axis is the axis normal to the top or bottom surface. The x-axis and y-axis are parallel, or substantially parallel to the to the top or bottom surface. As used herein, substantially homogenous means a variation of not more than 5%.

In some examples, set forth is thin film lithium-stuffed garnet electrolyte, wherein the inhomogeneity with respect to the z-axis is a surface defect density inhomogeneity.

In some examples, set forth is thin film lithium-stuffed garnet electrolyte, wherein the inhomogeneity with respect to the z-axis is a porosity inhomogeneity.

In some examples, set forth is thin film lithium-stuffed garnet electrolyte, wherein the inhomogeneity with respect to the z-axis is a grain size inhomogeneity.

In some examples, set forth is thin film lithium-stuffed garnet electrolyte, wherein the inhomogeneity with respect to the z-axis is an inhomogeneity regarding the ninety-ninth (99th) percentile aspect ratios of the pores on the top or bottom surface as compared to in the bulk.

In some examples, set forth is thin film lithium-stuffed garnet electrolyte, wherein the inhomogeneity with respect to the z-axis is a an inhomogeneity regarding the average aspect ratios of the pores.

In some examples, set forth is thin film lithium-stuffed garnet electrolyte, wherein the inhomogeneity with respect to the z-axis is a an inhomogeneity regarding the density of the pores.

In some examples, set forth is thin film lithium-stuffed garnet electrolyte, wherein the inhomogeneity with respect to the z-axis is a an inhomogeneity regarding the oxygen vacancy concentration.

In some examples, set forth is an electrochemical stack which includes a separator or a thin film lithium-stuffed garnet electrolyte described above.

IV. Lithium-Stuffed Garnet Oxides

Set forth herein are a variety of materials which are useful as separators for electrochemical cells. In some examples, the material which is useful for the applications described herein is a lithium-stuffed garnet oxide. In some examples, the lithium-stuffed garnet oxide is a $Li^+$ ion-conducting separator. In some of these examples, the lithium-stuffed garnet oxide is a $Li^+$ ion-conducting separator which has a $Li^+$ ion conductivity of at least $1 \times 10^{-5}$ S/cm at room temperature of 22° C. In some of these examples, the lithium-stuffed garnet oxide is a $Li^+$ ion-conducting separator which has a $Li^+$ ion conductivity of at least $1 \times 10^{-4}$ S/cm at room temperature of 22° C. In some of these examples, the lithium-stuffed garnet oxide is a $Li^+$ ion-conducting separator which has a $Li^+$ ion conductivity of at least $1 \times 10^{-3}$ S/cm at room temperature of 22° C. In some of these examples, the separator is an oxide selected from a lithium-stuffed garnet characterized by the formula $Li_xLa_yZr_zO_t \cdot qAlO_3$, wherein $4<x<10$, $1<y<4$, $1<z<3$, $6<t<14$, $0 \leq q \leq 1$. In certain examples, the $Li^+$ ion-conducting separator described herein is a lithium-stuffed garnet that is doped with Nb, Ga, and/or Ta.

In some examples, the lithium-stuffed garnets, which are described throughout the instant specification, may be described by the empirical formula: $Li_aLa_bZr_cAl_dMe''_eO_f$, wherein $5<a<8.5$; $2<b<4$; $0<c\leq2.5$; $0\leq d<2$; $0\leq e<2$, and $10<f<13$ and Me" is a metal selected from Nb, Ga, Ta, or combinations thereof. In certain examples, Me" is Nb. In certain examples, Me" is Ga. In certain examples, Me" is Ta.

In some other examples, the lithium-stuffed garnets, which are described throughout the instant specification, may be described by the empirical formula $Li_xLa_yZr_zO_t \cdot 0.11(Al_2O_3)$ or $Li_xLa_yZr_zO_t \cdot (Al_2O_3)$. In either of these formulae, $5<x<8.5$. In some Examples, x is 5.1, 5.2, 5.3, 5.4, 5.5, 5.6, 5.7, 5.8, 5.9, 6.0, 7.1, 7.2, 7.3, 7.4, 7.5, 7.6, 7.7, 7.8, 7.9, 8.0, 8.1, 8.2, 8.3, 8.4, 5.5, 5.6, 5.7, 5.8, or 5.9. In either of these formulae, in some examples, x is 5.1. In either of these formulae, in some examples, x is 5.2. In either of these formulae, in some examples, x is 5.3. In either of these formulae, in some examples, x is 5.4. In either of these formulae, in some examples, x is 5.5. In either of these formulae, in some examples, x is 5.6. In either of these formulae, in some examples, x is 5.7. In either of these formulae, in some examples, x is 5.8. In either of these formulae, in some examples, x is 5.9. In either of these formulae, in some examples, x is 6.0. In either of these formulae, in some examples, x is 6.1. In either of these formulae, in some examples, x is 6.2. In either of these formulae, in some examples, x is 6.3. In either of these formulae, in some examples, x is 6.4. In either of these formulae, in some examples, x is 6.5. In either of these formulae, in some examples, x is 6.6. In either of these formulae, in some examples, x is 6.7. In either of these formulae, in some examples, x is 6.8. In either of these formulae, in some examples, x is 6.9. In either of these formulae, in some examples, x is 7.0. In either of these formulae, in some examples, x is 7.1. In either of these formulae, in some examples, x is 7.2. In either of these formulae, in some examples, x is 7.3. In either of these formulae, in some examples, x is 7.4. In either of these formulae, in some examples, x is 7.5. In either of these formulae, in some examples, x is 7.6. In either of these formulae, in some examples, x is 7.7. In either of these formulae, in some examples, x is 7.8. In either of these formulae, in some examples, x is 7.9. In either of these formulae, in some examples, x is 8.0. In either of these formulae, in some examples, x is 8.1. In either of these formulae, in some examples, x is 8.2. In either of these formulae, in some examples, x is 8.3. In either of these formulae, in some examples, x is 8.4.

In some other examples, the lithium-stuffed garnets, which are described throughout the instant specification, may be described by the empirical formula $Li_uLa_vZr_xO_y \cdot zAl_2O_3$. In this formula, u is a rational number from 4 to 8. V is a rational number from 2 to 4. X is a rational number from 1 to 3. Y is a rational number from 10 to 14. Z is a rational number from 0.05 to 1. In these examples, u, v, x, y, and z are selected so that the lithium-stuffed garnet oxide is charge neutral.

In some other examples, the lithium-stuffed garnets, which are described throughout the instant specification, may be described by the empirical formula $Li_uLa_3Zr_2O_{12} \cdot zAl_2O_3$, wherein $4 \leq u \leq 10$ and $0 < z \leq 1$.

In some other examples, the lithium-stuffed garnets, which are described throughout the instant specification, may be described by the empirical formula $Li_{6.15-7.1}La_3Zr_2O_{12} \cdot 0.5Al_2O_3$ or $Li_{6.4-7.7}La_3Zr_2O_{12} \cdot 0.11Al_2O_3$.

In some other examples, the lithium-stuffed garnets, which are described throughout the instant specification, may be provided as a thin film separator, wherein the thickness of the thin film separator is less than 1 mm.

In some other examples, the lithium-stuffed garnets, which are described throughout the instant specification, may be provided as a thin film wherein the $d_{90}$ grain size ranges from 0.1 to 20 μm.

In some other examples, the lithium-stuffed garnets, which are described throughout the instant specification, may be provided as a thin film having a defect density from $1/m^2$ to $1/mm^2$.

In some other examples, the lithium-stuffed garnets, which are described throughout the instant specification, may be provided as a thin film having a scattering center density ranges from $1/m^2$ to $1/mm^2$.

In some other examples, the lithium-stuffed garnets, which are described throughout the instant specification, may be provided as a thin film having a geometric porosity ranges from 10 ppb to 6%, where ppb is parts per billion based on volume.

In some other examples, the lithium-stuffed garnets, which are described throughout the instant specification, may be provided as a thin film having an Archimedes porosity ranges from 10 ppb to 6%.

In some other examples, the lithium-stuffed garnets, which are described throughout the instant specification, may be provided as a thin film having a density from 94%-99.9999% as measured by a 2D cross-section. In some examples, the 2D cross-section is a cross-sectional scanning electron microscopy (SEM) image.

In some other examples, the lithium-stuffed garnets, which are described throughout the instant specification, may be provided as a pellet, as a inorganic body, or thin film having a thickness less than 1 mm and greater than 10 nm.

In some other examples, the lithium-stuffed garnets, which are described throughout the instant specification, may be provided as a pellet, as a monolith or thin film having a thickness less than 1 mm and greater than 10 nm.

In some other examples, the lithium-stuffed garnets, which are described throughout the instant specification, may be provided as a pellet having a thickness less than 1 mm and greater than 10 nm.

In some other examples, the lithium-stuffed garnets, which are described throughout the instant specification, may be provided as a monolith having a thickness less than 1 mm and greater than 10 nm.

In some other examples, the lithium-stuffed garnets, which are described throughout the instant specification, may be provided as a inorganic body having a thickness less than 1 mm and greater than 10 nm.

In some other examples, the lithium-stuffed garnets, which are described throughout the instant specification, may be provided as a thin film having a thickness less than 1 mm and greater than 10 nm.

In some other examples, the lithium-stuffed garnets, which are described throughout the instant specification, may be provided as a thin film having a geometric porosity less than 5% by volume.

In some other examples, the lithium-stuffed garnets, which are described throughout the instant specification, may be provided as a thin film having an Archimedes porosity less than 5% by volume.

In some other examples, the lithium-stuffed garnets, which are described throughout the instant specification, may be provided as a thin film having a Archimedes porosity less than 1% by volume.

In some other examples, the lithium-stuffed garnets, which are described throughout the instant specification, may be provided as a thin film wherein the $d_{90}$ grain size in the thin film is from 0.4 μm to 20 μm.

In some other examples, the lithium-stuffed garnets, which are described throughout the instant specification, may be provided as a thin film wherein the thin film consists essentially of more than 95% of a primary phase when measured by a quantitative XRD. In some examples, the thin film consists essentially of more than 98% of a primary phase when measured by a quantitative XRD. In some examples, the thin film consists essentially of more than 99% of a primary phase when measured by a quantitative XRD. In some examples, the thin film consists essentially of more than 99.9% of a primary phase when measured by a quantitative XRD. Quantitative XRD is a weight percent (wt %).

In some other examples, the lithium-stuffed garnets, which are described throughout the instant specification, may be provided as a thin film wherein the thin film comprises more than 95% of a primary phase when measured by a quantitative XRD. In some examples, the thin film comprises more than 98% of a primary phase when measured by a quantitative XRD. In some examples, the thin film comprises more than 99% of a primary phase when measured by a quantitative XRD. In some examples, the thin film comprises more than 99.9% of a primary phase when measured by a quantitative XRD.

In some other examples, the lithium-stuffed garnets, which are described throughout the instant specification, may be provided as a thin film wherein the lithium-stuffed garnet is characterized by the formula $Li_uLa_vZr_xO_y \cdot zTa_2O_5$. In this example, u is a rational number from 4 to 10, v is a rational number from 2 to 4, x is a rational number from 1 to 3, y is a rational number from 10 to 14, and z is a rational number from 0 to 1. In this example, u, v, x, y, and z are selected so that the lithium-stuffed garnet oxide is charge neutral. In another example, u is a rational number from 4 to 10, v is a rational number from 2 to 4, x is a rational number from 1 to 3, y is a rational number from 10 to 14, and z is a rational number greater than 0. In this other example, u, v, x, y, and z are selected so that the lithium-stuffed garnet oxide is charge neutral.

In some other examples, the lithium-stuffed garnets, which are described throughout the instant specification, may be provided as a thin film wherein the lithium-stuffed garnet is characterized by the formula $Li_uLa_vZr_xO_y \cdot zNb_2O_5$. In this example, u is a rational number from 4 to 10, v is a rational number from 2 to 4, x is a rational number from 1 to 3, y is a rational number from 10 to 14, and z is a rational number from 0 to 1. In this example, u, v, x, y, and z are selected so that the lithium-stuffed garnet oxide is charge neutral. In another example, u is a rational number from 4 to 10, v is a rational number from 2 to 4, x is a rational number from 1 to 3, y is a rational number from 10 to 14, and z is a rational number greater than 0. In this other example, u, v, x, y, and z are selected so that the lithium-stuffed garnet oxide is charge neutral.

In some other examples, the lithium-stuffed garnets, which are described throughout the instant specification, may be provided as a thin film wherein the lithium-stuffed garnet is characterized by the formula $Li_uLa_vZr_xO_y \cdot z\,Ga_2O_3$. In this example, u is a rational number from 4 to 10, v is a rational number from 2 to 4, x is a rational number from 1 to 3, y is a rational number from 10 to 14, and z is a rational number from 0 to 1. In this example, u, v, x, y, and z are selected so that the lithium-stuffed garnet oxide is charge neutral. In another example, u is a rational number from 4 to 10, v is a rational number from 2 to 4, x is a rational number from 1 to 3, y is a rational number from 10 to 14, and z is a rational number greater than 0. In this other example, u, v, x, y, and z are selected so that the lithium-stuffed garnet oxide is charge neutral.

In some other examples, the lithium-stuffed garnets, which are described throughout the instant specification, may be provided as a thin film wherein the lithium-stuffed garnet is characterized by the formula $Li_uLa_vZr_xO_y \cdot zTa_2O_5 \cdot bAl_2O_3$. In this example, u is a rational number from 4 to 10, v is a rational number from 2 to 4, x is a rational number from 1 to 3, y is a rational number from 10 to 14, and z is a rational number from 0 to 1. In this example, b is a rational number from 0 to 1. In another example, u is a rational number from 4 to 10, v is a rational number from 2 to 4, x is a rational number from 1 to 3, y is a rational number from 10 to 14, and z is a rational number greater than 0. In this example, u, v, x, y, and z are selected so that the lithium-stuffed garnet oxide is charge neutral. In another example, u is a rational number from 4 to 10, v is a rational number from 2 to 4, x is a rational number from 1 to 3, y is a rational number from 10 to 14, and z is a rational number greater than 0; and b is a rational number from 0 to 1, and the sum of z and b is less than or equal to 1. In this other example, u, v, x, y, and z are selected so that the lithium-stuffed garnet oxide is charge neutral.

In some other examples, the lithium-stuffed garnets, which are described throughout the instant specification, may be provided as a thin film wherein the lithium-stuffed garnet is characterized by the formula $Li_uLa_vZr_xO_y \cdot zNb_2O_5 \cdot bAl_2O_3$. In this example, u is a rational number from 4 to 10, v is a rational number from 2 to 4, x is a rational number from 1 to 3, y is a rational number from 10 to 14, and z is a rational number from 0 to 1. In this example, b is a rational number from 0 to 1. In this example, the sum of z and b is less than or equal to 1. In this example, u, v, x, y, and z are selected so that the lithium-stuffed garnet oxide is charge neutral. In another example, u is a rational number from 4 to 10, v is a rational number from 2 to 4, x is a rational number from 1 to 3, y is a rational number from 10 to 14, and z is a rational number from greater than 0, and b is a rational number from 0 to 1, and the sum of z and b is less than or equal to 1. In this other example, u, v, x, y, and z are selected so that the lithium-stuffed garnet oxide is charge neutral.

In some other examples, the lithium-stuffed garnets, which are described throughout the instant specification, may be provided as a thin film wherein the lithium-stuffed garnet is characterized by the formula $Li_uLa_vZr_xO_y \cdot z\,Ga_2O_3 \cdot bAl_2O_3$. In this example, u is a rational number from 4 to 10, v is a rational number from 2 to 4, x is a rational number from 1 to 3, y is a rational number from 10 to 14, and z is a rational number from 0 to 1. In this example, b is a rational number from 0 to 1. In this example, the sum of z and b is less than or equal to 1. In this example, u, v, x, y, and z are selected so that the lithium-stuffed garnet oxide is charge neutral. In another example, u is a rational number from 4 to 10, v is a rational number from 2 to 4, x is a rational number from 1 to 3, y is a rational number from 10 to 14, and z is a rational number from 0 to 1. In this other example, b is a rational number from 0 to 1. In this other example, the sum of z and b is less than or equal to 1. In this other example, u, v, x, y, and z are selected so that the lithium-stuffed garnet oxide is charge neutral.

In some other examples, the lithium-stuffed garnets, which are described throughout the instant specification, may be provided as a thin film wherein the lithium ion conductivity of the thin film is greater than $10^{-4}$ S/cm at 25° C.

In some other examples, the lithium-stuffed garnets, which are described throughout the instant specification, may be provided as a thin film wherein the lithium interfacial area-specific resistance of the thin film is less than 20 $\Omega cm^2$ at 25° C.

In some other examples, the lithium-stuffed garnets, which are described throughout the instant specification, may be provided as a thin film wherein the lithium-stuffed garnet is characterized by the formula $Li_{6.4}Ga_{0.2}La_3Zr_2O_{12}$.

In some other examples, the lithium-stuffed garnets, which are described throughout the instant specification, may be provided as a thin film wherein the $d_{90}$ grain size in the bulk is less than 19 μm. In some examples, the $d_{90}$ grain size is less than 18 μm. In some examples, the $d_{90}$ grain size is less than 17 μm. In some examples, the $d_{90}$ grain size is less than 16 μm. In some examples, the $d_{90}$ grain size is less than 15 μm. In some examples, the $d_{90}$ grain size is less than 14 μm. In some examples, the $d_{90}$ grain size is less than 13 μm. In some examples, the $d_{90}$ grain size is less than 12 μm. In some examples, the $d_{90}$ grain size is less than 11 μm. In some examples, the $d_{90}$ grain size is less than 10 μm. In some examples, the $d_{90}$ grain size is less than 9 μm. In some examples, the $d_{90}$ grain size is less than 8 μm. In some examples, the $d_{90}$ grain size is less than 7 μm. In some examples, the $d_{90}$ grain size is less than 6 μm. In some examples, the $d_{90}$ grain size is less than 5 μm. In some examples, the $d_{90}$ grain size is less than 4 μm. In some examples, the $d_{90}$ grain size is less than 3 μm. In some examples, the $d_{90}$ grain size is less than 2 μm. In some examples, the $d_{90}$ grain size is less than 1 μm. In some examples, the $d_{90}$ grain size is less than 900 nm. In some examples, the $d_{90}$ grain size is less than 800 nm. In some examples, the $d_{90}$ grain size is less than 700 nm. In some examples, the $d_{90}$ grain size is less than 600 nm. In some examples, the $d_{90}$ grain size is less than 500 nm. In some examples, the $d_{90}$ grain size is less than 400 nm. In some examples, the $d_{90}$ grain size is less than 300 nm. In some examples, the $d_{90}$ grain size is less than 200 nm. In some examples, the $d_{90}$ grain size is less than 100 nm. In some examples, the $d_{90}$ grain size is less than 50 nm.

V. Form Factors

As shown in FIG. 1, in some embodiments, the solid-state electrolytes described herein may have a disc-like shape or a disc-shaped geometry, 100. In some examples, this disc is referred to as a pellet when the thickness, 105, is about 1 mm or greater. Such a pellet is less dense than a thin film and typically prepared by pressing powders in a cylindrical die using a press. The disc-shaped electrolytes set forth herein, in some examples, have a top surface, 101, and a bottom surface, 102. In some examples, the shape and size of the top and bottom surfaces 101 and 102 are substantially the same. In some examples, the shape and size of the top and bottom surfaces 101 and 102 are equal. In some examples, the shape of the top and bottom surfaces 101 and 102 are substantially the same but the sizes are different such that the disc-shaped geometry, 100, further includes a tapering from either the top surface to the bottom surface or from the bottom surface to the top surface. The disc-shaped geometry, 100, which the solid-state electrolytes set forth herein may adopt, may include a circumference edge, 103.

In some examples, edge, 103, includes a seal which hermetically isolates the top surface, 101, from the bottom surface, 102. In some examples, this seal is a thermoplastic. In some examples, this seal is a silicone. In some examples, this seal is a rubber. In some examples, this seal is a polymeric material. In some examples, this seal is an epoxide. In some examples, the electrochemical cell in which the disc-shaped electrolyte, 100, includes a seal which physical isolates the electrode in contact with the bottom surface, 102, and with the top surface, 101. Such a seal might prevent gas and liquid in the positive electrode or in the positive electrode catholyte from diffusing from one side of the disc-shaped electrolyte to the other side. In such a way, the seal and the disc-shaped electrolyte, which used together in an electrochemical cell, isolate the electrodes on either side of the disc-shaped electrolyte.

In some examples, the lithium-stuffed garnet separators set forth herein have top surfaces, 101, and bottom surfaces, 102, and bulk therebetween. In some examples, the bulk is similar in chemical composition and structure to the circumference edge, 103. In some examples, either or both the top surfaces, 101, or bottom surfaces, 102, have a lower surface defect density than does the bulk. In some examples, both the top surface, 101, and the bottom surface, 102, has a lower surface defect density than does the bulk. In some other examples, the top surface, 101, has a lower surface defect density than does the bulk. In certain examples, the bottom surface, 102, has a lower surface defect density than does the bulk. In some examples, either or both the top surfaces, 101, or bottom surfaces, 102, have a lower areal surface defect density than does the bulk. In some examples, both the top surface, 101, and the bottom surface, 102, has a lower areal surface defect density than does the bulk. In some other examples, the top surface, 101, has a lower areal surface defect density than does the bulk. In certain examples, the bottom surface, 102, has a lower areal surface defect density than does the bulk. As used herein, "similar in chemical composition" means that samples taken from the bulk and the edge and measured by ICP show less than 10 atomic % difference in lithium concentration.

In some examples, thickness, 105, is less than 50 m. In some other examples, the thickness, 105, is less than 45 μm. In certain examples, the thickness, 105, is less than 40 μm. In still other examples, the thickness, 105, is less than 35 μm. In some examples, the thickness, 105, is less than 30 μm. In some other examples, the thickness, 105, is less than 25 μm. In certain examples, the thickness, 105, is less than 20 μm. In still other examples, the thickness, 105, is less than 15 μm. In some examples, the thickness, 105, is less than 10 μm. In some other examples, the thickness, 105, is less than 5 μm. In certain examples, the thickness, 105, is less than 0.5 μm. In still other examples, the thickness, 105, is less than 0.1 μm. The thickness, 105, is at least about 1 nm.

In some examples, provided herein is a composition formulated as a thin film having a film thickness of about 100 nm to about 100 μm. In certain examples, the thickness is about 50 μm. In other examples, the thickness is about 40 μm. In some examples, the thickness is about 30 μm. In other examples, the thickness is about 20 μm. In certain examples, the thickness is about 10 μm. In other examples, the thickness is about 5 μm. In some examples, the thickness is about 1 μm. In yet other examples, the thickness is about 0.5 μm.

In certain examples, the thickness is 50 μm. In other examples, the thickness is 40 μm. In some examples, the thickness is 30 μm. In other examples, the thickness is 20 am. In certain examples, the thickness is 10 μm. In other examples, the thickness is 5 μm. In some examples, the thickness is 1 μm. In yet other examples, the thickness is 0.5 μm.

For those solid-state electrolytes having a shape as shown in FIG. 1, or substantially as shown in FIG. 1, the disc-shaped geometry, 100, may be characterized by a diameter, 104. In some examples, 104, is the maximum dimension from one edge to another of either the top surface, 101, or bottom surface, 102. In some examples, 104, is the maximum dimension from one edge to another of both the top surface, 101, or bottom surface, 102. In some examples, 104, is 1, 2, 3, 4, 5, 6, 7, 8, 9, or 10 cm. In some examples, 104, is 1 cm. In some examples, 104, is 2 cm. In some examples, 104, is 3 cm. In some examples, 104, is 4 cm. In some examples, 104, is 5 cm. In some examples, 104, is 6 cm. In some examples, 104, is 7 cm. In some examples, 104, is 8 cm. In some examples, 104, is 9 cm. In some examples, 104 may be in the range of 1 cm to 10 cm. In some examples, 104 may be in the range of 4 cm to 10 cm. In some examples, 104 may be in the range of 1 cm to 6 cm. In some examples, 104 may be in the range of 3 cm to 7 cm.

Figure 2:
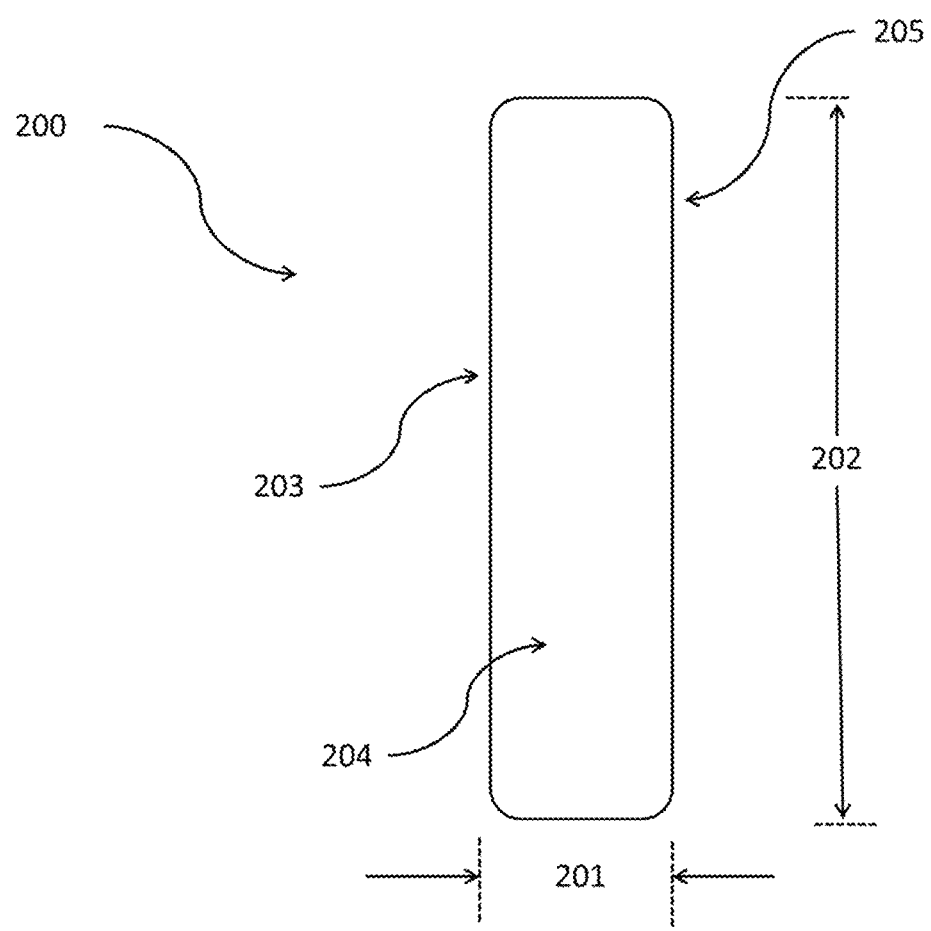
FIG. 2 shows a side view of a disc-shaped form factor for a solid-state electrolyte set forth herein.

The form factor shown in FIG. 1 is also shown, in a side view, as the form factor, 200, in FIG. 2. In FIG. 2, the solid-state electrolyte set forth herein includes top surface, 203, bottom surface, 205, and circumference edge, 204. In some examples, the thickness of the solid-state electrolyte is the physical dimension, 201, between the top surface, 203, and the bottom surface, 205.

In some examples, thickness, 201, is less than 50 m. In some other examples, the thickness, 201, is less than 45 m. In certain examples, the thickness, 201, is less than 40 m. In still other examples, the thickness, 201, is less than 35 m. In some examples, the thickness, 201, is less than 30 m. In some other examples, the thickness, 201, is less than 25 m. In certain examples, the thickness, 201, is less than 20 m. In still other examples, the thickness, 201, is less than 15 m. In some examples, the thickness, 201, is less than 10 μm. In some other examples, the thickness, 201, is less than 5 μm. In certain examples, the thickness, 201, is less than 0.5 μm. In still other examples, the thickness, 201, is less than 0.1 μm. In some examples, including, but not limited to, any of the above, the minimum thickness may be 10 nm.

For those solid-state electrolytes having a shape as shown in FIG. 2, or substantially as shown in FIG. 2, the disc-shaped geometry, 200, may be characterized by a diameter, 202. In some examples, 202, is the maximum dimension from one edge to another of either the top surface, 203, or bottom surface, 205. In some examples, 202, is 1, 2, 3, 4, 5, 6, 7, 8, 9, or 10 cm. In some examples, 202, is 1 cm. In some examples, 202, is 2 cm. In some examples, 202, is 3 cm. In some examples, 202, is 4 cm. In some examples, 202, is 5 cm. In some examples, 202, is 6 cm. In some examples, 202, is 7 cm. In some examples, 202, is 8 cm. In some examples, 202, is 9 cm. In some examples, 202 may be in the range of 1 cm to 10 cm. In some examples, 202 may be in the range of 4 cm to 10 cm. In some examples, 202 may be in the range of 1 cm to 6 cm. In some examples, 202 may be in the range of 3 cm to 7 cm.

In some examples, edge, 204, includes a seal which hermetically isolates the top surface, 203, from the bottom surface, 205. In some examples, this seal is a thermoplastic. In some examples, this seal is a silicone. In some examples, this seal is a rubber. In some examples, this seal is a polymeric material. In some examples, this seal is an epoxide. In some examples, this seal is a combination of materials, including, but not limited to, those described in this paragraph.

Figure 3:
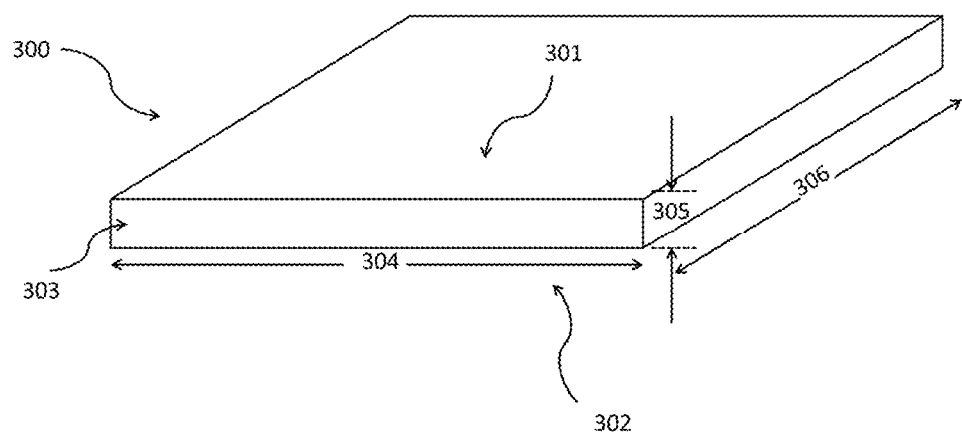
FIG. 3 shows a top-down view of a rectangular-shaped form factor for a solid-state electrolyte set forth herein.

As shown in FIG. 3, in some embodiments, the solid-state electrolytes described herein may have a square-like shape or a rectangular-shaped geometry, 300. In some examples, this shape is referred to as a plate when the thickness, 305, is about 1 mm or greater. The square-shaped electrolytes set forth herein, in some examples, have a top surface, 301, and a bottom surface, 302. In some examples, the shape and size of the top and bottom surfaces 301 and 302 are substantially the same. In some examples, the shape and size of the top and bottom surfaces 301 and 302 are equal. In some examples, the shape of the top and bottom surfaces 301 and 302 are substantially the same but the sizes are different such that the a square-shaped geometry, 300, further includes a tapering from either the top surface to the bottom surface or from the bottom surface to the top surface. The square-shaped geometry, 300, which the solid-state electrolytes set forth herein may adopt may include an edge, 303.

In some examples, the lithium-stuffed garnet separators set forth herein have top surfaces, 301, and bottom surfaces, 302, and bulk therebetween. In some examples, the bulk is similar in chemical composition and structure to the edge, 303. In some examples, either or both the top surfaces, 301, or bottom surfaces, 302, have a lower surface defect density than does the bulk. In some examples, both the top surface, 301, and the bottom surface, 302, has a lower surface defect density than does the bulk. In some other examples, the top surface, 301, has a lower surface defect density than does the bulk. In certain examples, the bottom surface, 302, has a lower surface defect density than does the bulk. In some examples, either or both the top surfaces, 301, or bottom surfaces, 302, have a lower areal surface defect density than does the bulk. In some examples, both the top surface, 301, and the bottom surface, 302, has a lower areal surface defect density than does the bulk. In some other examples, the top surface, 301, has a lower areal surface defect density than does the bulk. In certain examples, the bottom surface, 302, has a lower areal surface defect density than does the bulk.

In some examples, thickness, 305, is less than 50 µm. In some other examples, the thickness, 305, is less than 45 µm. In certain examples, the thickness, 305, is less than 40 µm. In still other examples, the thickness, 305, is less than 35 µm. In some examples, the thickness, 305, is less than 30 µm. In some other examples, the thickness, 305, is less than 25 µm. In certain examples, the thickness, 305, is less than 20 µm. In still other examples, the thickness, 305, is less than 15 µm. In some examples, the thickness, 305, is less than 10 µm. In some other examples, the thickness, 305, is less than 5 µm. In certain examples, the thickness, 305, is less than 0.5 µm. In still other examples, the thickness, 305, is less than 0.1 µm. In some examples, including, but not limited to, any of the above, the minimum thickness may be 10 nm.

In some examples, provided herein is a composition formulated as a thin film having a film thickness of about 100 nm to about 100 µm. In certain examples, the thickness is about 50 µm. In other examples, the thickness is about 40 µm. In some examples, the thickness is about 30 µm. In other examples, the thickness is about 20 µm. In certain examples, the thickness is about 10 µm. In other examples, the thickness is about 5 µm. In some examples, the thickness is about 1 µm. In yet other examples, the thickness is about 0.5 µm. In some examples, including, but not limited to, any of the above, the minimum thickness may be 10 nm.

In some examples, provided herein is a composition formulated as a thin film having a film thickness of about 100 nm to about 100 µm. In certain examples, the thickness is 50 µm. In other examples, the thickness is 40 µm. In some examples, the thickness is 30 µm. In other examples, the thickness is 20 µm. In certain examples, the thickness is 10 µm. In other examples, the thickness is 5 µm. In some examples, the thickness is 1 µm. In yet other examples, the thickness is 0.5 µm. In some examples, including, but not limited to, any of the above, the minimum thickness may be 10 nm.

For those solid-state electrolytes having a shape as shown in FIG. 3, or substantially as shown in FIG. 3, the rectangular-shaped geometry, 300, may be characterized by a physical dimension, 304. In some examples, 304, is the maximum dimension from one edge to another of either the top surface, 301, or bottom surface, 302. In some examples, 304, is 1, 2, 3, 4, 5, 6, 7, 8, 9, or 10 cm. In some examples, 304, is 1 cm. In some examples, 304, is 2 cm. In some examples, 304, is 3 cm. In some examples, 304, is 4 cm. In some examples, 304, is 5 cm. In some examples, 304, is 6 cm. In some examples, 304, is 7 cm. In some examples, 304, is 8 cm. In some examples, 304, is 9 cm. In some examples, 304 may be in the range of 1 cm to 10 cm. In some examples, 304 may be in the range of 4 cm to 10 cm. In some examples, 304 may be in the range of 1 cm to 6 cm. In some examples, 304 may be in the range of 3 cm to 7 cm.

In some examples, as shown in FIG. 3, or substantially as shown in FIG. 3, the rectangular shaped geometry, 300, includes physical dimension, 306. In some examples, 306, is the maximum dimension from one edge to another of either the top surface, 301, or bottom surface, 302. In some examples, 306, is 1, 2, 3, 4, 5, 6, 7, 8, 9, or 10 cm. In some examples, 306, is 1 cm. In some examples, 306, is 2 cm. In some examples, 306, is 3 cm. In some examples, 306, is 4 cm. In some examples, 306, is 5 cm. In some examples, 306, is 6 cm. In some examples, 306, is 7 cm. In some examples, 306, is 8 cm. In some examples, 306, is 9 cm. In some examples, 306 may be in the range of 4 cm to 10 cm. In some examples, 306 may be in the range of 1 cm to 6 cm. In some examples, 306 may be in the range of 3 cm to 7 cm.

In some examples, the length of 304 is equal to the length of 306. In some examples, the length of 304 is greater than the length of 306. In some examples, the length of 304 is greater than the length of 306 by 10, 20, 30, 40, 50, 60, 70, 80, 90, or 95%. In some examples, the length of 304 equal to 1.5 times the length of 306. In some examples, the length of 304 equal to 2 times the length of 306. In some examples, the length of 304 equal to 2.5 times the length of 306. In some examples, the length of 304 equal to 3 times the length of 306. In some examples, the length of 304 equal to 3.5 times the length of 306. In some examples, the length of 304 equal to 4 times the length of 306. In some examples, the length of 304 equal to 4.5 times the length of 306. In some examples, the length of 304 equal to 5 times the length of 306. In some examples, the length of 304 equal to 5.5 times the length of 306. In some examples, the length of 304 equal to 6 times the length of 306. In some examples, the length of 304 equal to 6.5 times the length of 306. In some examples, the length of 304 equal to 7 times the length of 306. In some examples, the length of 304 equal to 7.5 times the length of 306. In some examples, the length of 304 equal to 8 times the length of 306. In some examples, the length of 304 equal to 8.5 times the length of 306. In some examples, the length of 304 equal to 9 times the length of 306. In some examples, the length of 304 equal to 9.5 times the length of 306. In some examples, the length of 304 equal to 10 times the length of 306. In some examples, the length of 304 is in the range of 1 to 10 times the length of 306. In some examples, the length of 304 is in the range of 1 to 6 times the length of 306. In some examples, the length of 304 is in the range of 4 to 10 times the length of 306. In some examples, the length of 304 is in the range of 3 to 7 times the length of 306.

Figure 4:
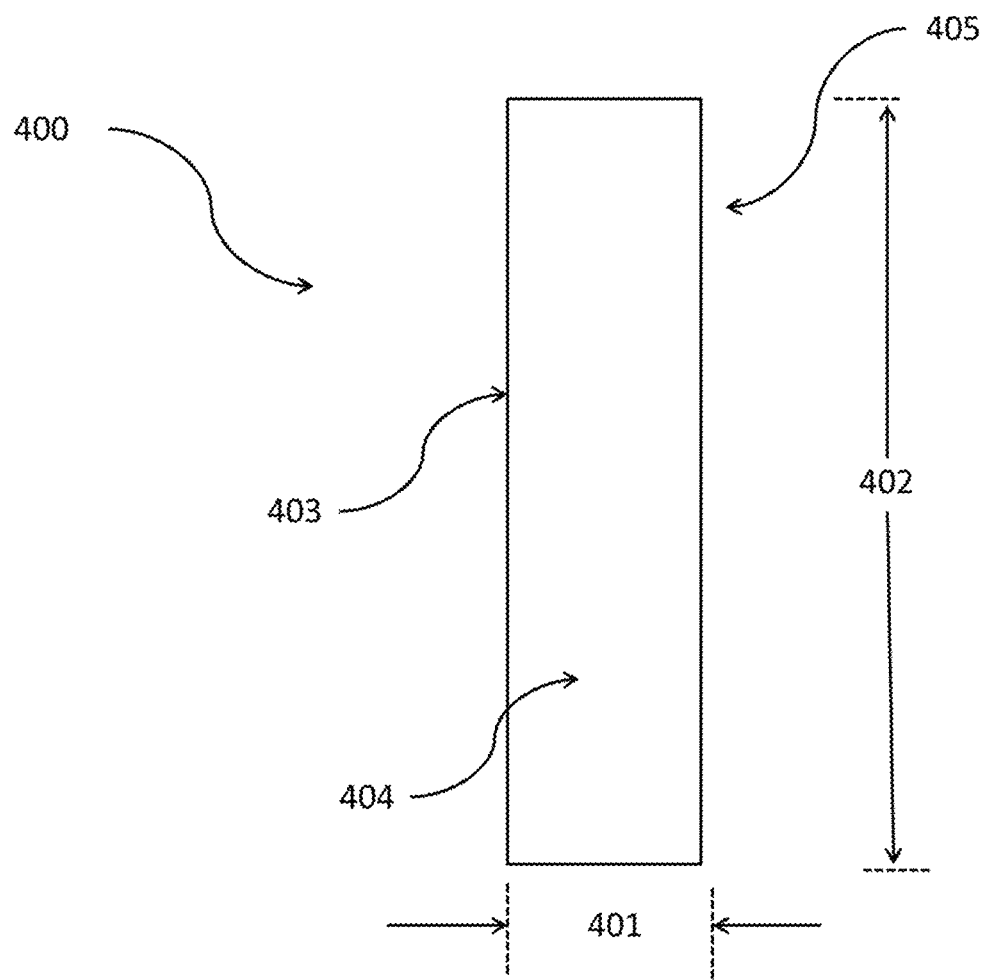
FIG. 4 shows a side view of a rectangular-shaped form factor for a solid-state electrolyte set forth herein.

The form factor shown in FIG. 3 is also shown, in a side view, as the form factor, 400, in FIG. 4. In FIG. 4, the solid-state electrolyte set forth herein includes top surface, 403, bottom surface, 405, and circumference edge, 404. In some examples, the thickness of the solid-state electrolyte is the physical dimension, 401, between the top surface, 403, and the bottom surface, 405.

In some examples, thickness, 401, is less than 50 µm. In some other examples, the thickness, 401, is less than 45 µm. In certain examples, the thickness, 401, is less than 40 µm. In still other examples, the thickness, 401, is less than 35 µm. In some examples, the thickness, 401, is less than 30 µm. In some other examples, the thickness, 401, is less than 25 µm. In certain examples, the thickness, 401, is less than 20 µm. In still other examples, the thickness, 401, is less than 15 µm. In some examples, the thickness, 401, is less than 10 km. In some other examples, the thickness, 401, is less than 5 µm. In certain examples, the thickness, 401, is less than 0.5 µm. In still other examples, the thickness, 401, is less than 0.1 µm. In some examples, including, but not limited to, any of the above, the minimum thickness may be 10 nm.

For those solid-state electrolytes having a shape as shown in FIG. 4, or substantially as shown in FIG. 4, the square-shaped geometry, 400, may be characterized by a physical dimension, 402. In some examples, 402, is the maximum dimension from one edge to another of either the top surface, 403, or bottom surface, 405. In some examples, 402, is 1, 2, 3, 4, 5, 6, 7, 8, 9, or 10 cm. In some examples, 402, is 1 cm. In some examples, 402, is 2 cm. In some examples, 402, is 3 cm. In some examples, 402, is 4 cm. In some examples, 402, is 5 cm. In some examples, 402, is 6 cm. In some examples, 402, is 7 cm. In some examples, 402, is 8 cm. In some examples, 402, is 9 cm. In some examples, 402 may be in the range of 1 cm to 10 cm. In some examples, 402 may be in the range of 4 cm to 10 cm. In some examples, 402 may be in the range of 1 cm to 6 cm. In some examples, 402 may be in the range of 3 cm to 7 cm.

In some examples, edge, 404, includes a seal which hermetically isolates the top surface, 403, from the bottom surface, 405. In some examples, this seal is a thermoplastic. In some examples, this seal is a silicone. In some examples, this seal is a rubber. In some examples, this seal is a polymeric material. In some examples, this seal is an epoxide. In some examples, this seal is a combination of the above materials.

In some examples, the lithium-stuffed garnets set forth here are prepared in a thin film format. In some of these examples, the thin film has a thickness. In some examples, this thickness is an absolute thickness. In other examples, the thickness is an average thickness.

In certain examples, the lithium-stuffed garnet thin film disclosed herein is a thin film having a thickness that is between about 10 nm to about 100 m. In certain examples, the lithium-stuffed garnet thin film disclosed herein is a thin film having a thickness that is in the range of 10 nm to 100 µm.

In some examples, the lithium-stuffed garnet thin film has a thickness from about 10 µm to about 100 µm. In some other of the methods disclosed herein, these film have a thickness from about 20 µm to about 100 µm. In certain of the methods disclosed herein, the film has a thickness from about 30 µm to about 100 µm. In certain other of the methods disclosed herein, the film has a thickness from about 40 µm to about 100 µm. In yet other methods disclosed herein, the film has a thickness from about 50 µm to about 100 µm. In still other methods disclosed herein, the film has a thickness from about 60 µm to about 100 µm. In yet some other methods disclosed herein, the film has a thickness from about 70 µm to about 100 µm. In some of the methods disclosed herein, the film has a thickness from about 80 µm to about 100 µm. In some other of the methods disclosed herein, the film has a thickness from about 90 µm to about 100 µm. In some of the methods disclosed herein, the film has a thickness from about 10 µm to about 90 µm. In some other of the methods disclosed herein, the film has a thickness from about 20 µm to about 80 µm. In certain of the methods disclosed herein, the film has a thickness from about 30 µm to about 70 µm. In certain other of the methods disclosed herein, the film has a thickness from about 40 µm to about 60 µm. In yet other methods disclosed herein, the film has a thickness from about 50 µm to about 90 µm. In still other methods disclosed herein, the film has a thickness from about 60 µm to about 90 µm. In yet some other methods disclosed herein, the film has a thickness from about 70 µm to about 90 µm. In some of the methods disclosed herein, the film has a thickness from about 80 µm to about 90 µm. In some other of the methods disclosed herein, the film has a thickness from about 30 µm to about 60 µm. In some examples, the films have a thickness of about 1-150 µm. In some of these examples the films has a thickness of about 1 µm. In some other examples the films has a thickness of about 2 µm. In certain examples, the films has a thickness of about 3 µm. In certain other examples the films has a thickness of about 4 µm. In some other examples the films has a thickness of about 5 µm. In some examples the films has a thickness of about 6 µm. In some of these examples the films has a thickness of about 7 µm. In some examples the films has a thickness of about 8 µm. In some other examples the films has a thickness of about 9 µm. In certain examples the films has a thickness of about 10 µm. In some of these examples the films has a thickness of about 11 µm. In some other examples the films has a thickness of about 12 µm. In certain examples, the films has a thickness of about 13 µm. In certain other examples the films has a thickness of about 14 µm. In some other examples the films has a thickness of about 15 µm. In some examples the films has a thickness of about 16 µm. In some of these examples the films has a thickness of about 17 µm. In some examples the films has a thickness of about 18 µm. In some other examples the films has a thickness of about 19 µm. In certain examples the films has a thickness of about 20 µm.

In some examples, the lithium-stuffed garnet thin film is circularly-shaped and has a diameter of about 10 µmm. In some examples, the diameter, is 1, 2, 3, 4, 5, 6, 7, 8, 9, 10, 11, 12, 13, 14, 15, 16, 17, 18, 19 or 20 µmm. In some examples, the diameter is in the range of 1 µmm to 20 µmm. In some examples, the diameter is in the range of 5 µmm to 20 µmm. In some examples, the diameter is in the range of 1 to 15 mm. In some examples, the diameter is in the range of 5 mm to 16 mm.

In some examples, the lithium-stuffed garnet thin film is rectangular-shaped and has a long edge length of about 10 cm. In some examples, the longer edge length, is 1, 2, 3, 4, 5, 6, 7, 8, 9, 10, 11, 12, 13, 14, 15, 16, 17, 18, 19 or 20 cm. In some examples, the longer edge length is in the range of 1 mm to 20 mm. In some examples, the longer edge length is in the range of 5 mm to 20 mm. In some examples, the longer edge length is in the range of 1 to 15 mm. In some examples, the diameter is in the range of 5 mm to 16 mm.

VI. Methods for Making a Lithium-Stuffed Garnet Separator

In some examples, set forth herein is method for preparing Li$^+$ ion-conducting deparator, wherein the method includes (step 1) providing an inorganic material, (step 2) milling the inorganic material to form a milled inorganic material, (step 3) annealing the milled inorganic material to form an annealed inorganic material, (step 4) pressing the annealed inorganic material, and (step 5) heating the inorganic material. As used herein, "heating the inorganic material" means placing the inorganic material in an environment at the disclosed temperature.

In some examples, set forth herein is method for preparing a Li$^+$ ion-conducting separator, wherein the method includes (step 1) providing an inorganic material, (step 2) milling the inorganic material to form a milled inorganic material, (step 3) selecting milled inorganic material of a particular size, (step 4) pressing the milled inorganic material of a particular size in a press, (optional step 5) heating the milled inorganic material of a particular size during the pressing, (optional step 6) passing a current through the milled inorganic material of a particular size during the pressing, and (step 7) annealing the separator which results from this process. In some examples, the methods further include polishing and/or etching the separator.

In some examples, multiple layers of separator may be laminated together, often before sintering. The thickness of each layer may be approximately 100, 80, 60, 40, 30, 20, 10, 9, 8, 7, 6, 5, 4, 3, 2, 1, 0.5 µm thick prior to lamination. The lateral size of each layer may be approximately 0.5, 1, 5, 10, 20, 50, 100, or 200 cm$^2$ in area prior to lamination. The thickness of each layer may be, independently, in the range of 0.5 to 100 µm thick prior to lamination. The thickness of each layer may be, independently, in the range of 0.5 to 20 m thick prior to lamination. The thickness of each layer may be, independently, in the range of 10 to 100 µm thick prior to lamination. The lateral size of each layer may be in the range of 0.5 to 200 cm$^2$ in area prior to lamination. The lateral size of each layer may be in the range of 0.5 to 100 cm$^2$ in area prior to lamination. The lateral size of each layer may be in the range of 50 to 200 cm$^2$ in area prior to lamination.

In some examples of the methods set forth herein, the inorganic material is Li$_x$La$_y$Zr$_z$O$_t$·Al$_2$O$_3$, wherein $4<x<10$, $1<y<4$, $1<z<3$, $6<t<14$, $0\leq q\leq 1$. In other examples, the inorganic material is any lithium-stuffed garnet described herein.

In some examples of the methods set forth herein, the inorganic material is Li$_x$La$_y$Zr$_z$O$_t$·Al$_2$O$_3$, wherein $4\leq x\leq 10$, $1\leq y\leq 4$, $1\leq z\leq 3$, $6\leq t\leq 14$, $0\leq q\leq 1$.

In some examples of the methods set forth herein, the milling the inorganic material to form a milled inorganic material includes milling until the inorganic material has a d$_{50}$ particle size of 100 nm to 1000 nm or 1 µm to 7 µm. In some examples of the methods set forth herein, the milling the inorganic material to form a milled inorganic material includes milling until the inorganic material has a d$_{50}$ particle size of 30 nm to 8500 nm or 2 µm to 5 µm.

In some examples, the annealing the milled inorganic material to form an annealed inorganic material includes heating the inorganic material. In some examples, the heating the inorganic material is in a controlled atmosphere. In some examples, the heating includes heating the inorganic material to at least 400, 500, 600, 700, 800, 900, 1000, or 1100, or 1200° C. In some examples, the heating includes heating the inorganic material to at least 400, 500, 600, 700, 800, 900, 1000, 1100, or 1200° C. in an atmosphere having Argon, hydrogen, water, or a combination thereof. In some examples, the heating includes heating the inorganic material to at least 400, 500, 600, 700, 800, 900, 1000, 1100, or 1200° C. in an atmosphere having Argon. In some examples, the heating includes heating the inorganic material to at least 400, 500, 600, 700, 800, 900, 1000, 1100, or 1200° C. in an atmosphere having hydrogen. In some examples, the heating includes heating the inorganic material to at least 400, 500, 600, 700, 800, 900, 1000, 1100, or 1200° C. in an atmosphere having water. In some examples, the heating is to a maximum temperature of 1300° C. As used herein, "heating the inorganic material" means placing the inorganic material in an environment at the disclosed temperature. As a non-limiting example, "heating the inorganic material to at least 400° C." refers to placing the inorganic material in an environment at a temperature of at least 400° C., or in other words, exposing the inorganic material to an environment at a specific temperature. The inorganic material may or may not reach the temperature of the environment. Similarly, the time duration of "heating to temperature X" is the time duration of the exposure of the inorganic material to an environment at temperature X.

In some examples, the pressing the annealed inorganic material and heating the inorganic material is accomplished simultaneously. If not accomplished simultaneously, heating is accomplished at normal atmospheric pressure (760 mmHg) or within a 5% variation from normal atmospheric pressure. In some examples, the pressing the annealed inorganic material precedes the heating the inorganic material. In some examples, the pressing the annealed inorganic material includes pressing to at least 100 pounds per square inch (PSI). In some examples, the pressing the annealed inorganic material includes pressing to at least 1000 pounds per square inch (PSI). In some examples, the pressing the annealed inorganic material includes pressing to at least 10,000 pounds per square inch (PSI). In some examples, the heating the annealed inorganic material includes heating to at least 500° C. In some examples, the pressing the annealed inorganic material includes heating to at least 750° C. In some examples, the heating the annealed inorganic material includes heating to at least 900° C. In some examples, the pressing the annealed inorganic material includes heating to at least 1000° C. In some examples, the heating the annealed inorganic material includes heating to at least 1200° C. In some examples, the pressing the annealed inorganic material includes heating to at least 1500° C. In some examples, the heating the annealed inorganic material includes heating to at least 1700° C. In some examples, the pressing the annealed inorganic material includes heating to at least 2000° C. In certain examples, the heating, and/or pressing is performed for 15 seconds, 30 seconds, 45 seconds, or 60 seconds. In certain examples, the heating, and/or pressing is performed for about 1 minute, about 2 minutes, about 5 minutes, or about 10 minutes. In some examples, the pressing the annealed inorganic material includes heating to a temperature of not more than 3000° C. In some examples, the pressing the annealed inorganic material includes heating to a temperature of not more than 2500° C.

VII. Methods for Reducing the Density of Defects in a Lithium-Stuffed Garnet Separator In some other examples, set forth herein is a method of selectively reducing the number and/or size of surface-pores and defects on a lithium-stuffed garnet separator. In certain examples, set forth herein is a method of selectively reducing the number and size of surface-pores and defects on a lithium-stuffed garnet separator. In certain examples, set forth herein is a method of selectively reducing the number or size of surface-pores and defects on a lithium-stuffed garnet separator.

In these examples, the methods include heating the surface of a lithium-stuffed garnet separator until the surface undergoes a phase transition from solid to liquid and then cooling the surface and the bulk of a lithium-stuffed garnet separator so that the entire bulk does not undergo a phase transition from solid to liquid. In these methods, the top and/or bottom surfaces of a lithium-stuffed garnet separator are heated to reduce the defect density at the surface and then rapidly cooled. In some examples, the methods also include cutting or polishing the top and/or bottom surfaces of a lithium-stuffed garnet separator to reduce the defect density at the surface as compared to the bulk.

In some examples, the methods for reducing the surface defect density include melting the surface of the material so it can flow and then cooling the material before the bulk of the material melts. In these examples, the surface is selectively melted and reformed while the bulk is not melted and reformed to the same extent that the surface is.

In some examples, set forth herein is a method of selectively reducing the number and/or size of surface-pores and defects on a lithium-stuffed garnet separator. The methods includes providing a sintered separator which includes a lithium-stuffed garnet. Next, the method includes heating the top and/or bottom surfaces of the separator above the melting temperature. Next, the method includes rapidly cooling the separator below the melting temperature.

In some examples, the methods further include adding lithium-stuffed garnet precursors on the top and/or bottom surface of the lithium-stuffed garnet separator prior to the heating step. In some of these examples, the lithium-stuffed garnet precursors are powders.

In some of the methods of selectively reducing the number and/or size of surface-pores and defects on a lithium-stuffed garnet separator, the methods include heating the separator for the minimal time period required to melt the top and/or bottom surface.

In some of the methods of selectively reducing the number and/or size of surface-pores and defects on a lithium-stuffed garnet separator, the methods include cooling the separator for the longest time which still provides for smaller grains on the top or bottom surface than in the bulk.

In some of the methods of selectively reducing the number and/or size of surface-pores and defects on a lithium-stuffed garnet separator, the methods include cooling the separator resulting in larger grains on the top or bottom surface than in the bulk.

In some of the methods of selectively reducing the number and/or size of surface-pores and defects on a lithium-stuffed garnet separator, the methods include cooling the separator for the longest time which still provides for a top and/or bottom surface which is denser than the bulk.

In some of the methods of selectively reducing the number and/or size of surface-pores and defects on a lithium-stuffed garnet separator, the methods include cooling the separator for the longest time which still provides for a top and/or bottom surface which is less crystalline than the bulk.

In some of the methods of selectively reducing the number and/or size of surface-pores and defects on a lithium-stuffed garnet separator, the methods include heating the separator to 1325° C. In some of the methods of selectively reducing the number and/or size of surface-pores and defects on a lithium-stuffed garnet separator, the methods include heating the separator to greater than 1325° C. In certain methods, the heating is in an inert or reducing atmosphere, wherein the atmosphere $H_2$ and a member selected form the group consisting of He, $N_2$, Ar or a combination thereof. In some of these methods, the heating is in argon. In some of these methods, the heating is in an inert or reducing atmosphere, wherein the atmosphere $H_2$ and a member selected form the group consisting of He, $N_2$, Ar or a combination thereof. In some of these methods, the heating is in an inert or reducing atmosphere, wherein the atmosphere is a combination of $H_2$ and He. In some of these methods, the heating is in an inert or reducing atmosphere, wherein the atmosphere is a combination of $H_2$ and $N_2$. In some of these methods, the heating is in an inert or reducing atmosphere, wherein the is a combination of $H_2$ and Ar. In some of these methods, the heating is in an inert or reducing atmosphere, wherein the atmosphere is a combination of $H_2$ He, and $N_2$. In some of these methods, the heating is in an inert or reducing atmosphere, wherein the atmosphere is a combination of $H_2$, $N_2$, and Ar. In some of these methods, the heating is in an inert or reducing atmosphere, wherein the atmosphere is a combination of $H_2$ $N_2$, and Ar. In some other of these methods, the heating is in Ar, Ar/$H_2$, 02, $N_2$, or a combination thereof. In some other of these methods, the heating is in air. In some other of these methods, the heating is in argon. In some other of these methods, the heating is in 02. In some other of these methods, the heating is in $N_2$. In some other methods, the heating is conducted in an oven, with a laser, a Rapid Thermal Processing instrument, (RTP),infrared radiation, UV radiation, or a flash lamp.

In any of the methods described herein, the lithium-stuffed garnet which is provided may be provided as a calcined lithium-stuffed garnet.

In any of the methods described herein, the lithium-stuffed garnet which is provided may be provided as a sintered lithium-stuffed garnet.

In any of the methods described herein, the lithium-stuffed garnet which is provided may be provided as an annealed lithium-stuffed garnet. In some examples, the methods include an annealing step or series of annealing steps, such as those which are set forth in U.S. patent application Ser. No. 15/007,908, filed Jan. 27, 2016, titled ANNEALED GARNET ELECTROLYTE SEPARATORS, the entire contents of which are herein incorporated by reference in their entirety. In some of these examples, by annealing the separator, either the top or bottom surface is characterized as having substantially no layer thereupon comprising a lithium carbonate, lithium hydroxide, lithium oxide, lithium peroxide, a hydrate thereof, an oxide thereof, or a combination thereof. In some of these examples, by annealing the separator, either the top or bottom surface is characterized as having substantially no layer thereupon comprising a lithium carbonate. In some of these examples, by annealing the separator, either the top or bottom surface is characterized as having substantially no layer thereupon comprising a lithium hydroxide. In some of these examples, by annealing the separator, either the top or bottom surface is characterized as having substantially no layer thereupon comprising a lithium oxide. In some of these examples, by annealing the separator, either the top or bottom surface is characterized as having substantially no layer thereupon comprising a lithium peroxide. In some of these examples, by annealing the separator, both the top and bottom surfaces are characterized as having substantially no layer thereupon comprising a lithium carbonate, lithium hydroxide, lithium oxide, lithium peroxide, a hydrate thereof, an oxide thereof, or a combination thereof. In some of these examples, by annealing the separator, both the top and bottom surfaces are characterized as having substantially no layer thereupon comprising a lithium carbonate. In some of these examples, by annealing the separator, both the top and bottom surfaces are characterized as having substantially no layer thereupon comprising a lithium hydroxide. In some of these examples, by annealing the separator, both the top and bottom surfaces are characterized as having substantially no layer thereupon comprising a lithium oxide. In some of these examples, by annealing the separator, both the top and bottom surfaces are characterized as having substantially no layer thereupon comprising a lithium peroxide. In some of these examples, the separator's top or bottom surface is not observed to have a lithium carbonate, lithium hydroxide, lithium oxide, lithium peroxide, a hydrate thereof, an oxide thereof, or a combination thereof when analyzed by Raman, FT-IR, or XPS spectroscopy, as described and as set forth in U.S. patent application Ser. No. 15/007,908, filed Jan. 27, 2016, titled ANNEALED GARNET ELECTROLYTE SEPARATORS, the entire contents of which are incorporated by reference herein in their entirety. In some of these examples, the separator's top and bottom surfaces are not observed to have a lithium carbonate, lithium hydroxide, lithium oxide, lithium peroxide, a hydrate thereof, an oxide thereof, or a combination thereof when analyzed by Raman, FT-IR, or XPS spectroscopy, as described and as set forth in U.S. patent application Ser. No. 15/007,908, filed Jan. 27, 2016, titled ANNEALED GARNET ELECTROLYTE SEPARATORS, the entire contents of which are incorporated by reference herein in their entirety.

VIII. Methods of Making

In some examples, set forth herein is a process for making a solid electrolyte, including providing lithium-stuffed garnet chemical precursors or calcined lithium-stuffed garnet, wherein the lithium-stuffed garnet chemical precursors or calcined lithium-stuffed garnet are provided having a narrow particle size distribution, shaping the lithium-stuffed garnet chemical precursors or calcined lithium-stuffed garnet into a thin film or monolith form factor, and sintering the lithium-stuffed garnet chemical precursors or calcined lithium-stuffed garnet using spark plasma sintering (SPS) or hot-press sintering (HPS) to provide a sintered lithium-stuffed garnet thin film or monolith. In some examples, both spark plasma sintering (SPS) and hot-press sintering (HPS) are used.

In some examples, set forth herein is a process for making a solid electrolyte, including providing lithium-stuffed garnet chemical precursors or calcined lithium-stuffed garnet, wherein the lithium-stuffed garnet chemical precursors or calcined lithium-stuffed garnet are provided having a narrow particle size distribution, shaping the lithium-stuffed garnet chemical precursors or calcined lithium-stuffed garnet into a thin film or inorganic body form factor, and sintering the lithium-stuffed garnet chemical precursors or calcined lithium-stuffed garnet using spark plasma sintering (SPS) or hot-press sintering (HPS) to provide a sintered lithium-stuffed garnet thin film or inorganic body. In some examples, both spark plasma sintering (SPS) and hot-press sintering (HPS) are used.

In some examples, the particle size distribution has a $d_{90}$ less than 25-45 µm. In some examples, the particle size distribution has a $d_{90}$ less than 2-20 µm. In some examples, the particle size distribution has a $d_{90}$ of about 2-20 µm.

In some examples, the sintering is SPS. In some examples, the sintering is HP sintering. In some examples, both SPS sintering and HP sintering are used.

In some examples, the methods further include polishing the sintered lithium-stuffed garnet thin film or monolith.

In some examples, the methods further include polishing the sintered lithium-stuffed garnet thin film or inorganic body.

In some examples, the methods further include cutting the sintered lithium-stuffed garnet thin film or monolith so that it has a thickness less than 100 µm.

In some examples, the methods further include cutting the sintered lithium-stuffed garnet thin film or inorganic body so that it has a thickness less than 100 µm.

In some examples, the sintered lithium-stuffed garnet thin film or monolith has a surface roughness of about 20 nm (Ra).

In some examples, the sintered lithium-stuffed garnet thin film or inorganic body has a surface roughness of about 20 nm (Ra).

In some examples, the SPS sintering uses pressure and/or an electrical field to increase the density of the lithium-stuffed garnet separator.

In some examples, the methods further include a thermal process to melt garnet at its surface and reduce the presence of surface features which results in lithium dendrite initiation/propagation when the surface is included in an electrochemical cell.

In some examples, a heat treatment step is used to reduce the presence of surface features.

IX. Defects

As defined herein, a defect includes a portion of a material that interacts with, absorbs, scatters, reflects, or refracts light, differently than does the rest of the material. Defects also include, but not limited to, a pore, a grain boundary, a dislocation, a crack, a separation, a chemical inhomogeneity, a pitting, an inclusion, an included pore, a divot, an atomic vacancy, a phase segregation of two or more materials in a solid material, a cavity, a twinned grain, a non-planarity in an otherwise planar surface, the presence of a second phase in a lithium-stuffed garnet, wherein second phase is a phase other than cubic lithium-stuffed garnet.

In some examples, set forth herein is a separator that includes a lithium-stuffed garnet and has top and bottom surfaces and a bulk therebetween, wherein either or both of the top or bottom surfaces has a lower surface defect density than does the bulk. In some of these examples, the defect is a pore. In some other of these examples, the defect is a grain. In some other of these examples, the defect is a boundary. In some other of these examples, the defect is a dislocation. In some other of these examples, the defect is a crack. In some other of these examples, the defect is a separation. In some other of these examples, the defect is a chemical inhomogeneity. In some other of these examples, the defect is a pitting. In some other of these examples, the defect is an inclusion. In some other of these examples, the defect is an included pore. In some other of these examples, the defect is a divot. In some other of these examples, the defect is an atomic vacancy. In some other of these examples, the defect is a phase segregation of two or more materials in a solid material. In some other of these examples, the defect is a cavity. In some other of these examples, the defect is a non-planarity in an otherwise planar surface. In some other of these examples, the defect is a the presence of a second phase in a lithium-stuffed garnet, wherein second phase is a phase other than cubic lithium-stuffed garnet. In some examples, set forth herein is a separator that includes a lithium-stuffed garnet and has top and bottom surfaces and a bulk therebetween, wherein either one of or both of the top and bottom surfaces has a lower surface defect density than does the bulk, and the defects include more than one type of defect.

In a second embodiment, set forth herein is a thin film lithium-stuffed garnet electrolyte, wherein the thin film is substantially homogenous within x- and y-dimensions, but wherein the thin film is inhomogeneous with respect to the z-axis. In some of these examples, the inhomogeneity in the z-axis is the density of pores. In some other of these examples, the inhomogeneity in the z-axis is the density of grains. In some other of these examples, the inhomogeneity in the z-axis is the density of grain boundaries. In some other of these examples, the inhomogeneity in the z-axis is the density of dislocations. In some other of these examples, the inhomogeneity in the z-axis is the density of cracks. In some other of these examples, the inhomogeneity in the z-axis is the density of separations. In some other of these examples, the inhomogeneity in the z-axis is the density of chemical inhomogeneities. In some other of these examples, the inhomogeneity in the z-axis is the density of pitting. In some other of these examples, the inhomogeneity in the z-axis is the density of inclusions. In some other of these examples, the inhomogeneity in the z-axis is the density of included pores. In some other of these examples, the inhomogeneity in the z-axis is the density of divots. In some other of these examples, the inhomogeneity in the z-axis is the density of atomic vacancies. In some other of these examples, the inhomogeneity in the z-axis is phase segregation of two or more materials in a solid material. In some other of these examples, the inhomogeneity in the z-axis is the density of cavities. In some other of these examples, the inhomogeneity in the z-axis is the density of twinned grains. In some other of these examples, the inhomogeneity in the z-axis is a non-planarity in an otherwise planar surface. In some other of these examples, the inhomogeneity in the z-axis is a the presence of a second phase in a lithium-stuffed garnet, wherein second phase is a phase other than cubic lithium-stuffed garnet. In some of these examples, the inhomogeneity in the z-axis is a combination of two or more defects.

X. Surface-Pore Pore Aspect Ratios

Applicant has found that lithium dendriting in a battery during operation is correlated with separator defects which include surface defects such as cracks, point defects, and porosities, wherein the separator surface defects are at least on the surface which interfaces or directly contacts the negative electrode. In general, but without being bound to any specific theory, it may be that the higher the surface density of defects is, then the more likely lithium dendrites are to form when the separator is used in an electrochemical cell. In some examples, the type of pore at the surface also affects whether lithium dendrites will form. In some examples, it has been found by the Applicant that high aspect ratio surface-pores result in lithium dendrites while low aspect ratio pores do not. Using the methods herein, the surface defects are selectively reduced in number and also with respect to this aspect ratio.

When there is a high density of surface-pores on the surface of the separator which interfaces with a lithium metal anode, lithium dendrites tend to form when the separator is used in an electrochemical cell. During a charge cycle, for example, the lithium metal tends to plate out on the surface of these surface-pores, filling these surface-pores until they are full of lithium metal. This results in a local pressure increase in the surface-pore. Eventually, the pressure in the pore can increase to the point where the separator cracks. If the separator cracks, the lithium metal can plate out, i.e., dendrite, between the positive and negative electrode and lead to an electrical short.

It has been found that the pressure building within surface-pores or other surface-exposed defects depends of temperature, current density, separator microstructure, and separator interfacial/fracture strength.

It has been found that surface-pores that have a pore aspect ratio greater than 10 tend to result in lithium dendrite formation when a separator with such surface-pores is used in an electrochemical cell and cycled at 2 mA/cm$^2$ or higher, at a pressure of 300 PSI or lower, or at a temperature of 50° C. or lower.

It has been found that surface-pores that have a pore aspect ratio less than 10, tend not to result in lithium dendrite formation when a separator with such surface-pores is used in an electrochemical cell and cycled at 2 mA/cm$^2$ or higher, at a pressure of 300 PSI or lower, or at a temperature of 50° C. or lower.

The pressure which builds up in a defect in a separator is a function of the lithium flow rate (equation 1), the lithium exit velocity (equation 2), and the strain rate (equation 3):

$$\text{Lithium exit flow rate} = Q = 2\pi R * L * \frac{jM}{F\rho} \quad \text{(equation 1)}$$

$$\text{Lithium exit velocity} = v_{avg} = \frac{Q}{\pi R^2} \quad \text{(equation 2)}$$

$$\text{Strain rate} = \dot{\gamma} \equiv \frac{dv}{dr} \approx \frac{v_{avg}}{R} = \frac{2L}{R^2} \frac{jM}{F\rho}. \quad \text{(equation 3)}$$

Based on these considerations, for a separator having a surface-pores with a pore radius of about 2-10 μm, a pore aspect ratio of about 1-5, at a current density 2-10 mA/cm2, the Strain rate is equal to 0.01-1.0 Hz. Applicant has found that by keeping the modular-normalized shear stress between 1E-3 and 1E-2 and the strain rate 1/s 0 to 1000, lithium dendrite formation and propagation can be minimized. In addition, the separator strength plays a role. For example, the activation energy as a function of Temperature is related to, and proportional to, $j_0\exp(-Ea1/kT)*\exp(-Ea2/kT)$ where Ea1~0.57 eV is the activation energy for lithium viscosity, and Ea2~–0.17 eV is the activation energy for garnet strength, k is the Boltzmann constant, T is temperature, and $j_0$ is a constant.

XI. Devices

In some examples, set forth herein is an electrochemical cell having a positive electrode, a negative electrode, and an electrolyte between the positive and negative electrode, wherein the electrolyte comprises an electrolyte separator described herein or prepared by a method described herein. In some examples, set forth herein is an electrochemical cell having a positive electrode, a negative electrode, and an electrolyte between the positive and negative electrode, wherein the electrolyte comprises an electrolyte separator described herein which is prepared by a method described herein.

In some examples, set forth herein is an electrochemical cell having an electrolyte separator set forth herein, wherein the electrochemical cell further includes a gel electrolyte. In some examples, this gel electrolyte helps to adhere the separator to the positive electrode. In some of these examples, the gel electrolyte is a bonding layer such as those bonding layers and electrolyte compositions set forth in U.S. Provisional Patent Application No. 62/336,474, filed May 13, 2016, titled SOLID SEPARATOR BONDING AGENT, the entire contents of which are incorporated by reference herein in their entirety.

In some examples, set forth herein is an electrochemical cell having an electrolyte separator set forth herein, wherein the electrochemical cell further includes a gel electrolyte between the positive electrode active material and the electrolyte separator. In some examples, gel comprises a solvent, a lithium salt, and a polymer. In some of these examples, the solvent is, for example, ethylene carbonate, propylene carbonate, diethylene carbonate, methylene carbonate, or a combination thereof. In some of these examples, the solvent is ethylene carbonate. In some of these examples, the solvent is propylene carbonate. In some of these examples, the solvent is diethylene carbonate. In some of these examples, the solvent is methylene carbonate. In some examples, the solvent in the bonding layer is selected from ethylene carbonate (EC), diethylene carbonate, diethyl carbonate, dimethyl carbonate (DMC), ethyl-methyl carbonate (EMC), tetrahydrofuran (THF), 7-Butyrolactone (GBL), fluoroethylene carbonate (FEC), fluoromethyl ethylene carbonate (FMEC), trifluoroethyl methyl carbonate (F-EMC), fluorinated 3-(1,1,2,2-tetrafluoroethoxy)-1,1,2,2-tetrafluoropropane (i.e., 1,1,2,2-Tetrafluoro-3-(1,1,2,2-tetrafluoroethoxy) propane, F-EPE), fluorinated cyclic carbonate (F-AEC), propylene carbonate (PC), dioxolane, acetonitrile (ACN), succinonitrile, adiponitrile, hexanedinitrile, pentanedinitrile, acetophenone, isophorone, benzonitrile, dimethyl sulfate, dimethyl sulfoxide (DMSO), ethyl acetate, methyl butyrate, dimethyl ether (DME), diethyl ether, propylene carbonate, dioxolane, glutaronitrile, and combinations thereof. In some of these examples, the lithium salt is, for example, LiPF$_6$, LiBOB, or LFTSi. In some examples, the lithium salt is selected from LiPF$_6$, LiBOB, LiBETI, LiTFSi, LiBF$_4$, LiClO$_4$, LiAsF6, LiFSI, LiClO$_4$, LiI, and a combination thereof. In some examples, the lithium salt is LiPF$_6$. In some examples, the lithium salt is LiBOB. In some examples, the lithium salt is LiBETI. In some examples, the lithium salt is LiTFSi. In some examples, the lithium salt is LiBF$_4$. In some examples, the lithium salt is LiClO$_4$. In some examples, the lithium salt is LiAsF6. In some examples, the lithium salt is selected from LiFSI. In some examples, the lithium salt is LiI. In some of these examples, the polymer is PVDF-HFP. In some of these examples, the gel includes PVDF with the solvent dioxolane and the salt, lithium bis(trifluoromethane) sulfonimide (LiTFSI), at 1M concentration. In some examples the polymer is polypropylene (PP), atactic polypropylene (aPP), isotactive polypropylene (iPP), ethylene propylene rubber (EPR), ethylene pentene copolymer (EPC), polyisobutylene (PIB), styrene butadiene rubber (SBR), polyolefins, polyethylene-co-poly-1-octene (PE-co-PO), PE-co-poly(methylene cyclopentane) (PE-co-PMCP), poly methyl-methacrylate (and other acrylics), acrylic, polyvinylacetacetal resin, polyvinylbutylal resin, PVB, polyvinyl acetal resin, stereoblock polypropylenes, polypropylene polymethylpentene copolymer, polyethylene oxide (PEO), PEO block copolymers, silicone, or the like. In other examples, the polymer selected from the group consisting of polyacrylonitrile (PAN), polyethylene (e.g., low density linear polyethylene), polypropylene, polyethylene oxide (PEO), polymethyl methacrylate (PMMA), polyvinyl chloride (PVC), polyvinyl pyrrolidone (PVP), polyethylene oxide poly(allyl glycidyl ether) PEO-AGE, polyethylene oxide 2-(methoxyethoxy)ethyl glycidyl ether (PEO-MEEGE), polyethylene oxide 2-(methoxyethoxy)ethyl glycidyl poly(allyl glycidyl ether) (PEO-MEEGE-AGE), polysiloxane, polyvinylidene fluoride (PVdF), polyvinylidene fluoride hexafluoropropylene (PVdF-HFP), and rubbers (e.g., ethylene propylene (EPR)), nitrile rubber (NPR), styrene-butadiene-rubber (SBR), polybutadiene polymer, polybutadiene rubber (PB), polyisobutadiene rubber (PIB), polyisoprene rubber (PI), polychloroprene rubber (CR), acrylonitrile-butadiene rubber (NBR), polyethyl acrylate (PEA), and combinations thereof.

In some examples, set forth herein is an electrochemical cell having an electrolyte separator set forth herein, wherein the electrochemical cell further includes a gel electrolyte. In some of these examples, the gel electrolyte includes acetonitrile as a solvent and a 1M concentration of a lithium salt, such as LiPF$_6$. In some of these examples, the gel includes a dioxolane solvent and a 1M concentration of a Lithium salt, such as LiTFSI or LiPF$_6$. In certain examples, the gel includes PVDF polymer, dioxolane solvent and 1M concentration of LiFTSI or LiPF$_6$. In some other examples, the gel includes PVDF polymer, acetonitrile (ACN) solvent and 1M concentration of LiFTSI or LiPF$_6$. In some of these examples, the gel has a EC:PC solvent and a 1M concentration of a Lithium salt, such as LiTFSI or LiPF$_6$. In some of these examples, the composite and the gel show a low impedance of about 10 $\Omega$cm$^2$ or less at a temperature of 45° C.

In some examples, set forth herein is an electrochemical cell having an electrolyte separator set forth herein, wherein the electrochemical cell further includes a gel electrolyte.

In some examples, the aforementioned gel is a composite electrolyte which includes a polymer and a ceramic composite with the polymer phase having a finite lithium conductivity. In some examples, the polymer is a single ion conductor (e.g., Li$^+$). In other examples, the polymer is a multi-ion conductor (e.g., Li$^+$ and electrons). The following non-limiting combinations of polymers and ceramics may be included in the composite electrolyte. The composite electrolyte may be selected from polyethyleneoxide (PEO) coformulated with LiCF$_3$SO$_3$ and Li$_3$N, PEO with LiAlO$_2$ and Li$_3$N, PEO with LiClO$_4$, PEO:LiBF4-TiO$_2$, PEO with LiBF$_4$—ZrO$_2$. In some of these composites, in addition to the polymers, the composite includes an additive selected from Li$_3$N; Al$_2$O$_3$, LiAlO$_3$; SiO$_2$, SiC, (PO$_4$)$^{3-}$, TiO$_2$; ZrO$_2$, or zeolites in small amounts. In some examples, the additives can be present at from 0 to 95% w/w. In some examples, the additives include Al$_2$O$_3$, SiO$_2$, Li$_2$O, Al$_2$O$_3$, TiO$_2$, P$_2$O$_5$, Li$_{1.3}$Ti$_{1.7}$Al$_{0.3}$(PO$_4$)$_3$, or (LTAP). The additives may be used individually or in combination. In some of these composite electrolytes, the polymer present is polyvinylidenefluoride at about 10% w/w. In some of these as composite electrolytes, the composite includes an amount of a solvent and a lithium salt (e.g., LiPF$_6$). In some of these composites, the solvent is ethyl carbonate/dimethyl carbonate (EC/DMC) or any other solvent set forth herein. In some examples, the composite includes a solvent useful for dissolving lithium salts. In some of the composite electrolytes set forth herein, the polymer serves several functions. In one instance, the polymer has the benefit of ameliorating interface impedance growth in the solid electrolyte even if the polymer phase conductivity is much lower than the ceramic. In other instances, the polymer reinforces the solid electrolyte mechanically. In some examples, this mechanical reinforcement includes coformulating the solid electrolyte with a compliant polymer such as poly paraphenylene terephthalamide. These polymers can be one of a variety of forms, including a scaffold.

In some examples, set forth herein is a device which includes a gel electrolyte (e.g., 80:20 to 50:50 vol. % PVDF:HFP to EC:EMC) and is referred to herein as the electrolyte layer (also referred to herein as the catholyte layer). Herein, PVDF is polyvinylidene fluoride; HFP is hexafluorophosphate; EC is ethylene carbonate; and EMC is ethyl methyl carbonate.

In some examples, gel catholytes and gel electrolytes include any suitable ionically conducting gels or liquid-based electrolyte set forth in U.S. Pat. No. 5,296,318, entitled RECHARGEABLE LITHIUM INTERCALATION BATTERY WITH HYBRID POLYMERIC ELECTROLYTE.

In some examples, the electrochemical cell includes a positive electrode which includes an active material, wherein this active material refers to a material that is suitable for use as a Li rechargeable battery and which undergoes a chemical reaction during the charging and discharging cycles. For examples, an active cathode material includes a metal fluoride that converts to a metal and lithium fluoride during the discharge cycle of a Li rechargeable battery. For examples, an active cathode material includes a metal oxide that intercalates and de-intercalates Li$^+$ ions during the discharge-charge cycle of a Li rechargeable battery.

In some examples, the electrochemical cell includes a positive electrode of 5-200 μm thickness. This positive electrode includes active materials surrounded by a cathode-electrolyte. Active materials may be present in 20-80 vol %, and the catholyte may be present in 5-60 vol %. In some examples, the electrode is layered to a solid separator (e.g., a lithium-stuffed garnet electrolyte separator, monolith or thin film). The solid separator is layered to a lithium-metal negative electrode. In some examples, the solid separator may be 100 nm-100 μm thick, and the lithium metal negative electrode may be 1-50 μm thick.

In some examples, the electrochemical cell includes a positive electrode of 5-200 μm thickness. This positive electrode includes active materials surrounded by a cathode-electrolyte. Active materials may be present in 20-80 vol %, and the catholyte may be present in 5-60 vol %. In some examples, the electrode is layered to a solid separator (e.g., a lithium-stuffed garnet electrolyte separator, inorganic body or thin film). The solid separator is layered to a lithium-metal negative electrode. In some examples, the solid separator may be 100 nm-100 μm thick, and the lithium metal negative electrode may be 1-50 μm thick.

In certain examples, the positive electrode is from 30 μm to 300 μm thick. In some examples, the positive electrode is from 40 μm to 200 μm thick. In some of these examples, the positive electrode is 30 μm thick. In some of these examples, the positive electrode is 40 μm thick. In some of these examples, the positive electrode is 50 μm thick. In some of these examples, the positive electrode is 60 μm thick. In some of these examples, the positive electrode is 70 μm thick. In some of these examples, the positive electrode is 80 μm thick. In some of these examples, the positive electrode is 90 μm thick. In some of these examples, the positive electrode is 100 μm thick. In some of these examples, the positive electrode is 110 μm thick. In some of these examples, the positive electrode is 120 μm thick. In some of these examples, the positive electrode is 130 μm thick. In some of these examples, the positive electrode is 140 μm thick. In some of these examples, the positive electrode is 150 μm thick. In some of these examples, the positive electrode is 160 μm thick. In some of these examples, the positive electrode is 170 μm thick. In some of these examples, the positive electrode is 180 μm thick. In some of these examples, the positive electrode is 190 μm thick. In some of these examples, the positive electrode is 200 μm thick. In some of these examples, the positive electrode is 210 μm thick. In some of these examples, the positive electrode is 220 μm thick. In some of these examples, the positive electrode is 230 μm thick. In some of these examples, the positive electrode is 240 μm thick. In some of these examples, the positive electrode is 250 μm thick. In some of these examples, the positive electrode is 260 μm thick. In some of these examples, the positive electrode is 270 μm thick. In some of these examples, the positive electrode is 280 μm thick. In some of these examples, the positive electrode is 290 μm thick. In some of these examples, the positive electrode is 300 μm thick.

The active material (e.g., a nickel manganese cobalt oxide, i.e., NMC, a nickel cobalt aluminum oxide, i.e., NCA, a lithium cobalt oxide, i.e., LCO, a lithium-rich nickel manganese oxide, i.e., LNMO, $FeF_3$, $CoF_2$, $CuF_2$, $CoF_3$, and related or functionally equivalent active materials) may be present in the positive electrode in a volume fraction of 20-90%. In some examples, the volume fraction is 40-70 v %. The cathode electrolyte, or catholyte, may be present in a volume fraction of 10-50%. In some examples, the catholyte is present in a volume fraction of 20-40 volume %. The solid separator may be 0.5-60 μm thick. In some examples, the solid separator is 1-30 μm thick. The negative electrode may be 3-80 μm thick. In some examples, the negative electrode is 20-50 μm thick in the charged state.

In any of the above examples, the carbon content in the positive electrode is less than 5% w/w. In any of the above examples, the binder content in the positive electrode is less than 5% w/w.

Non-limiting embodiments of the invention include, but are not limited to including, the following:

In some examples, set forth herein is a separator comprising a lithium-stuffed garnet and having top and bottom surfaces and a bulk therebetween, wherein either or both of the top or bottom surfaces has a lower surface defect density than does the bulk.

In some examples, including any of the foregoing, the top surface, but not the bottom surface, has a lower surface defect density than does the bulk.

In some examples, including any of the foregoing, the bottom surface, but not the top surface, has a lower surface defect density than does the bulk.

In some examples, including any of the foregoing, both the top and bottom surfaces have a lower surface defect density than does the bulk.

In some examples, including any of the foregoing, the top or bottom surface has a lower areal surface defect density than does the bulk.

In some examples, including any of the foregoing, the ninety-ninth ($99^{th}$) percentile pore aspect ratio of the pores on the top or bottom surface is less than the ninety-ninth ($99^{th}$) percentile pore aspect ratio of the pores in the bulk.

In some examples, including any of the foregoing, the ninety-ninth ($99^{th}$) percentile pore aspect ratio of the pores on both the top and bottom surfaces is less than the ninety-ninth ($99^{th}$) percentile pore aspect ratio of the pores in the bulk.

In some examples, including any of the foregoing, the ninety-ninth (99$^{th}$) percentile pore aspect ratio of the pores on the top or bottom surface is less than 10 and greater than 0.1.

In some examples, including any of the foregoing, the ninety-ninth (99%) percentile pore aspect ratio of the pores on the top and bottom surfaces is less than 10 and greater than 0.1.

In some examples, including any of the foregoing, the ninety-ninth (99$^{th}$) percentile pore aspect ratio of the pores on the top or bottom surface is less than 4, less than 4.5, less than 4.0, less than 3.5, less than 3.0, less than 2.5, less than 2.0, less than 1.5, less than 1, or less than 0.5.

In some examples, including any of the foregoing, the ninety-ninth (99$^{th}$) percentile pore aspect ratio of the pores on the top and bottom surfaces is less than 4, less than 4.5, less than 4.0, less than 3.5, less than 3.0, less than 2.5, less than 2.0, less than 1.5, less than 1, or less than 0.5.

In some examples, including any of the foregoing, the top or bottom surface is more dense than the bulk.

In some examples, including any of the foregoing, the top and bottom surfaces are more dense than the bulk.

In some examples, including any of the foregoing, the top or bottom surface is less crystalline than the bulk.

In some examples, including any of the foregoing, the top and bottom surfaces are less crystalline than the bulk.

In some examples, including any of the foregoing, the grain size at the top or bottom surface is larger than the grain size in the bulk.

In some examples, including any of the foregoing, the grain size at the top and bottom surfaces is larger than the grain size in the bulk.

In some examples, including any of the foregoing, the separator is a thin film.

In some examples, including any of the foregoing, the separator is a monolith.

In some examples, including any of the foregoing, the separator is a inorganic body.

In some examples, including any of the foregoing, the thickness between the top and bottom surfaces is between 1 μm and 100 μm.

In some examples, set forth herein a thin film lithium-stuffed garnet electrolyte, wherein the thin film is substantially homogenous within x- and y-dimensions; and wherein the thin film is inhomogeneous with respect to the z-dimension.

In some examples, including any of the foregoing, the inhomogeneity with respect to the z-dimension is a surface defect density inhomogeneity.

In some examples, including any of the foregoing, the inhomogeneity with respect to the z-dimension is a porosity inhomogeneity.

In some examples, including any of the foregoing, the inhomogeneity with respect to the z-dimension is a grain size inhomogeneity.

In some examples, including any of the foregoing, the inhomogeneity with respect to the z-dimension is an inhomogeneity regarding the ninety-ninth (99$^{th}$) percentile aspect ratios of the pores on the top or bottom surface as compared to in the bulk.

In some examples, including any of the foregoing, the inhomogeneity with respect to the z-dimension is an inhomogeneity regarding the ninety-ninth (99$^{th}$) percentile aspect ratios of the pores on the top and bottom surfaces as compared to in the bulk.

In some examples, including any of the foregoing, the inhomogeneity with respect to the z-dimension is a an inhomogeneity regarding the average aspect ratios of the pores.

In some examples, including any of the foregoing, the inhomogeneity with respect to the z-dimension is a an inhomogeneity regarding the density of the pores.

In some examples, including any of the foregoing, the inhomogeneity with respect to the z-dimension is a an inhomogeneity regarding the oxygen vacancy concentration.

In some examples, set forth herein is an electrochemical stack comprising the separator of any one of above examples, or the thin film of any one of the above examples.

In some examples, set forth herein is a process for selectively reducing the number and/or size of surface-pores and defects on a lithium-stuffed garnet separator, the method comprising: providing a sintered separator comprising a lithium-stuffed garnet; heating the top and/or bottom surfaces of the separator above the melting temperature; and rapidly cooling the separator below the melting temperature.

In some examples, including any of the foregoing, the process further comprises adding lithium-stuffed garnet precursors on the top and/or bottom surface prior to the heating step.

In some examples, including any of the foregoing, the lithium-stuffed garnet precursors are powders.

In some examples, including any of the foregoing, the heating is for the minimal time period required to melt the top and/or bottom surface.

In some examples, including any of the foregoing, the cooling is for the longest time which still provides for smaller grains on the top or bottom surface than in the bulk.

In some examples, including any of the foregoing, the cooling is for the longest time which still provides for smaller grains on the top and bottom surfaces than in the bulk.

In some examples, including any of the foregoing, the cooling is for the longest time which still provides for a top and/or bottom surface which is denser than the bulk.

In some examples, including any of the foregoing, the cooling is for the longest time which still provides for a top and/or bottom surface which is less crystalline than the bulk.

In some examples, including any of the foregoing, the heating is to 1325° C.

In some examples, including any of the foregoing, the heating is to greater than 1325° C.

In some examples, including any of the foregoing, the heating is in an inert or reducing atmosphere, wherein the atmosphere is a combination of $H_2$ and a member selected form the group consisting of He, $N_2$, $O_2$, and Ar, or a combination thereof, or an atmosphere of Ar, $O_2$, and/or $N_2$.

In some examples, including any of the foregoing, the heating is in argon.

In some examples, including any of the foregoing, the heating is in Ar, Ar/$H_2$, $O_2$, $N_2$.

In some examples, including any of the foregoing, the heating is conducted in an oven, with a laser, a Rapid Thermal Processing instrument, (RTP), infrared radiation, UV radiation, or a flash lamp.

In some examples, including any of the foregoing, the lithium-stuffed garnet is calcined lithium-stuffed garnet.

In some examples, including any of the foregoing, the lithium-stuffed garnet is a sintered lithium-stuffed garnet.

In some examples, including any of the foregoing, the lithium-stuffed garnet is an annealed lithium-stuffed garnet.

In some examples, including any of the foregoing, the lithium-stuffed garnet is an annealed lithium-stuffed garnet consisting essentially of lithium-stuffed garnet.

In some examples, set forth herein is a process for making a solid electrolyte, comprising: providing lithium-stuffed garnet chemical precursors or calcined lithium-stuffed garnet, wherein the lithium-stuffed garnet chemical precursors or calcined lithium-stuffed garnet are provided having a narrow particle size distribution; shaping the lithium-stuffed garnet chemical precursors or calcined lithium-stuffed garnet into a thin film or monolith form factor; and sintering the lithium-stuffed garnet chemical precursors or calcined lithium-stuffed garnet using spark plasma sintering (SPS) or hot-press sintering (HPS) to provide a sintered lithium-stuffed garnet thin film or monolith.

In some examples, set forth herein is a process for making a solid electrolyte, comprising: providing lithium-stuffed garnet chemical precursors or calcined lithium-stuffed garnet, wherein the lithium-stuffed garnet chemical precursors or calcined lithium-stuffed garnet are provided having a narrow particle size distribution; shaping the lithium-stuffed garnet chemical precursors or calcined lithium-stuffed garnet into a thin film or inorganic body form factor; and sintering the lithium-stuffed garnet chemical precursors or calcined lithium-stuffed garnet using spark plasma sintering (SPS) or hot-press sintering (HPS) to provide a sintered lithium-stuffed garnet thin film or inorganic body.

In some examples, including any of the foregoing, the particle size distribution has a $d_{90}$ less than 25-45 μm.

In some examples, including any of the foregoing, the particle size distribution has a $d_{90}$ less than 2-20 μm.

In some examples, including any of the foregoing, the particle size distribution has a $d_{90}$ of about 2-20 μm.

In some examples, including any of the foregoing, the sintering is SPS.

In some examples, including any of the foregoing, the sintering is hot-press sintering.

In some examples, including any of the foregoing, the process further comprises polishing the sintered lithium-stuffed garnet thin film or monolith.

In some examples, including any of the foregoing, the process further comprises polishing the sintered lithium-stuffed garnet thin film or inorganic body.

In some examples, including any of the foregoing, the process further comprises cutting the sintered lithium-stuffed garnet thin film or monolith so that it has a thickness less than 100 μm.

In some examples, including any of the foregoing, the process further comprises cutting the sintered lithium-stuffed garnet thin film or inorganic body so that it has a thickness less than 100 μm.

In some examples, including any of the foregoing, the sintered lithium-stuffed garnet thin film or monolith has a surface roughness of about 20 nm (Ra).

In some examples, including any of the foregoing, the sintered lithium-stuffed garnet thin film or inorganic body has a surface roughness of about 20 nm (Ra).

In some examples, set forth herein is a method of discharging or charging an electrochemical cell comprising the separator of any one of foregoing examples, or the thin film of any one of the foregoing examples, or the electrochemical stack of the foregoing, comprising discharging or charging the electrochemical cell: below a critical current, wherein the critical current is a function of the pore aspect ratio of the defects on the top or bottom surface of the separator or thin film; above a critical temperature, wherein the critical temperature is a function of the pore aspect ratio of the defects on the top or bottom surface of the separator or thin film; and/or above a critical pressure, wherein the critical pressure is a function of the pore aspect ratio of the defects on the top or bottom surface of the separator or thin film.

In some examples, set forth herein is a method of discharging or charging an electrochemical cell comprising the separator of any one of foregoing examples, or the thin film of any one of the foregoing examples, or the electrochemical stack of the foregoing examples, comprising discharging or charging the electrochemical cell: below a critical current, wherein the critical current is a function of the pore aspect ratio of the defects on the top and/or bottom surfaces of the separator or thin film; above a critical temperature, wherein the critical temperature is a function of the pore aspect ratio of the defects on the top and/or bottom surfaces of the separator or thin film; and/or above a critical pressure, wherein the critical pressure is a function of the pore aspect ratio of the defects on the top and/or bottom surface of the separator or thin film.

In some examples, including any of the foregoing, comprising cycling the electrochemical cell at 2 mA/cm$^2$ at 22° C.

In some examples, including any of the foregoing, comprising discharging the electrochemical cell at 1 mA/cm$^2$, 300 psi, and 50° C. A process for making a lithium-stuffed garnet powder, comprising: providing $ZrO_2$, LiOH, $La_2O_3$ and $Al(NO_3)_3$ at a desired stoichiometry and/or with excess lithium to form a mixture; mixing and rapidly heating to at least 1300° C.; melting; and atomizing into a cooling environment to form spherical particles of phase pure garnet.

EXAMPLES

Electron microscopy was performed in a FEI Quanta SEM, a Helios 600i, or a Helios 660 FIB-SEM, though equivalent tools may be substituted. XRD was performed in a Bruker D8 Advance ECO or a Rigaku Miniflex 2. EIS was performed with a Biologic VMP3, VSP, VSP-300, SP-150, or SP-200. Optical imaging was performed with an optical camera. DC cycling was performed with Arbin BT-2043, or BT-G, though it is understood that equivalent tools may be substituted. Chemical reagents and solvents were purchased commercially and used without purification, unless otherwise noted.

Example 1

Making a Lithium-Stuffed Garnet Electrolyte by SPS Sintering

In this example a lithium-stuffed garnet electrolyte separator was prepared using spark plasma sintering (SPS).

Calcined lithium-stuffed garnet powder was prepared by mixing LiOH, LaOH, $ZrO_2$, and bohemite as a source of aluminum. Specifically, the mixture was 6.0-7 LiOH: 1.5$La_2O_3$: 2$ZrO_2$: 0.1-1 boehmite molar ratios. The powder was mixed in a rolling ball mill and calcined in alumina crucibles at between 750-1100° C. for 2-20 hours and then crushed. Milling using media between 0.2-2 mm in diameter until the particle size reached a $D_{50}$<2 μm. The crushed calcined powder was loaded into a milling apparatus and milled to provide calcined lithium-stuffed garnet powder. A Hockmeyer milling apparatus was used. The powder had an empirical formula of $Li_{6.7}La_3Zr_2O_{12}0.11Al_2O_3$.

Figure 5:
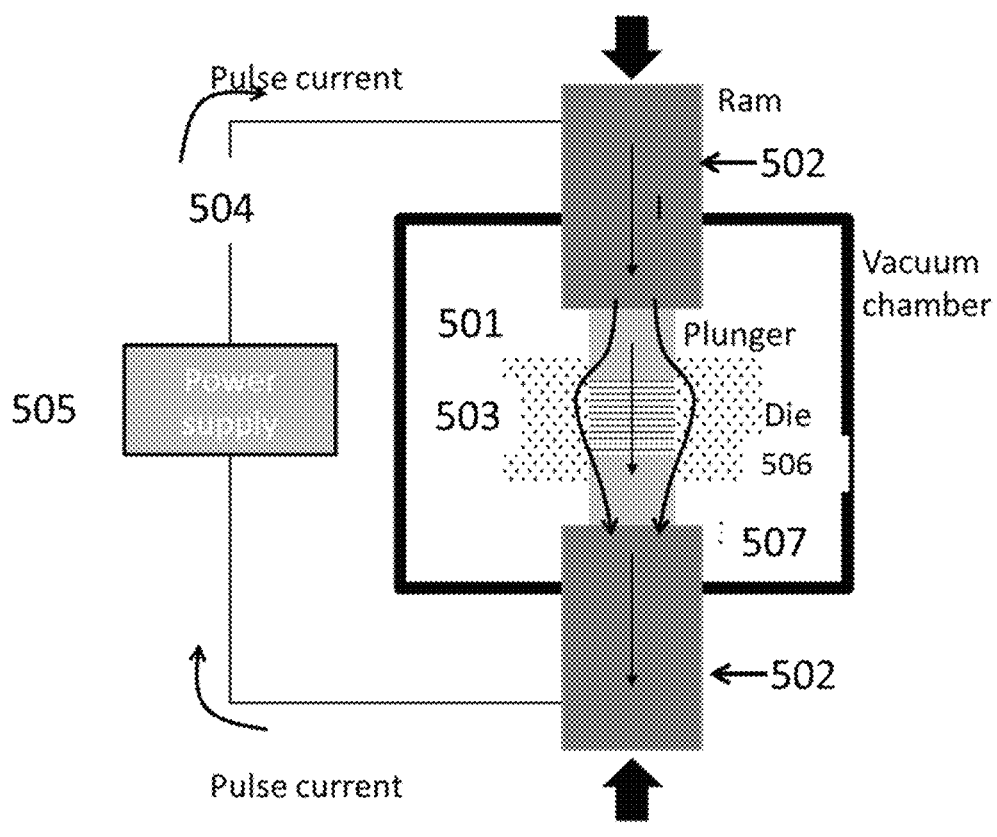
FIG. 5 shows a schematic of a spark plasma sintering (SPS) apparatus.

As shown in FIG. 5 the SPS apparatus (500) included a list of components. Included were a vacuum chamber (501) which allowed for atmosphere control around the sintering pellet. Also included were rams (502) which applied pressure to the sintering powder. Also included was a graphite die case (506) which applied pressure to powder (503). The SPS also included a means for running a current (504) and a power supply (505). The SPS also included a thermocouple (507) for monitoring and controlling temperature of the sintering pellet.

Figure 6:
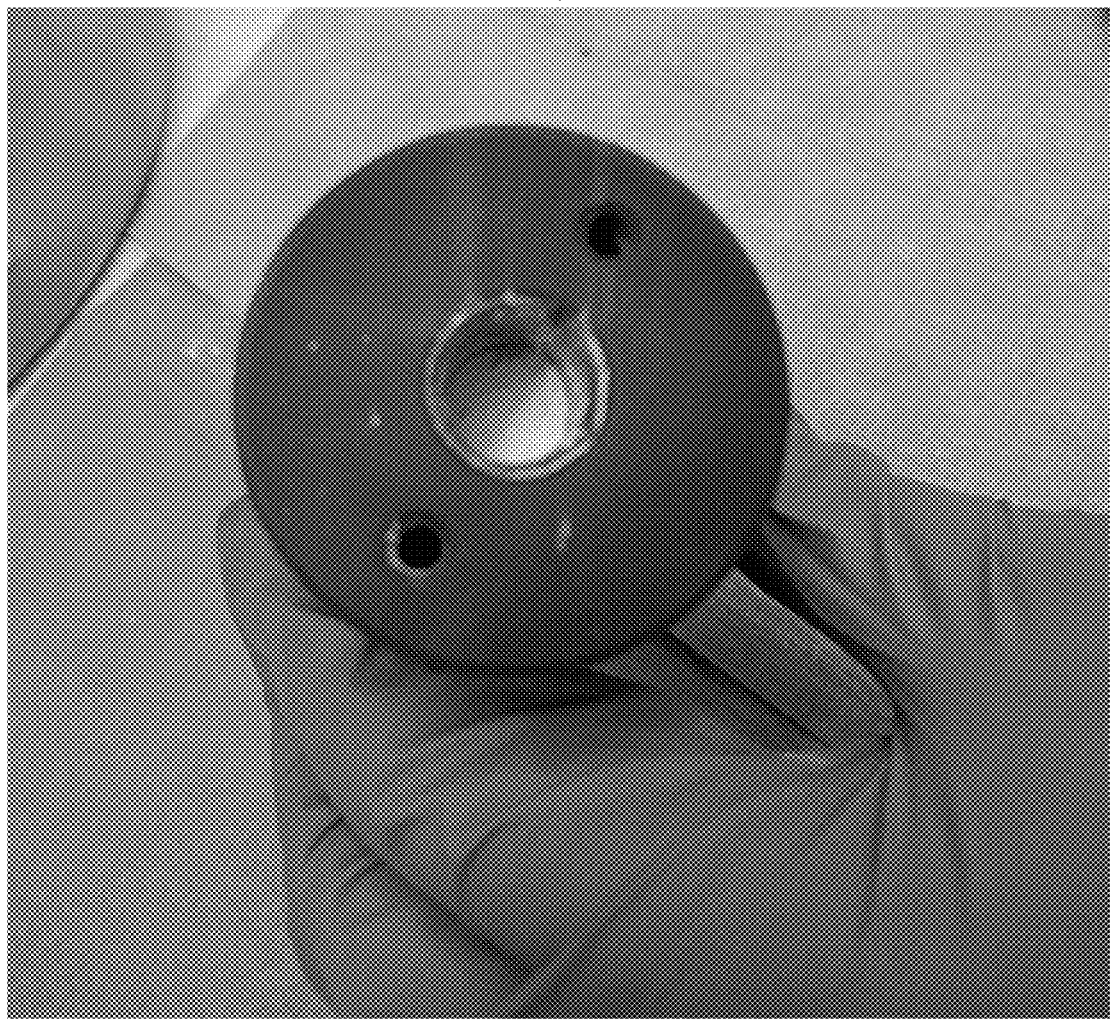
FIG. 6 shows an optical image of lithium-stuffed garnet pressed powder inside a die before SPS sintering, according to Example 1.
Figure 7:
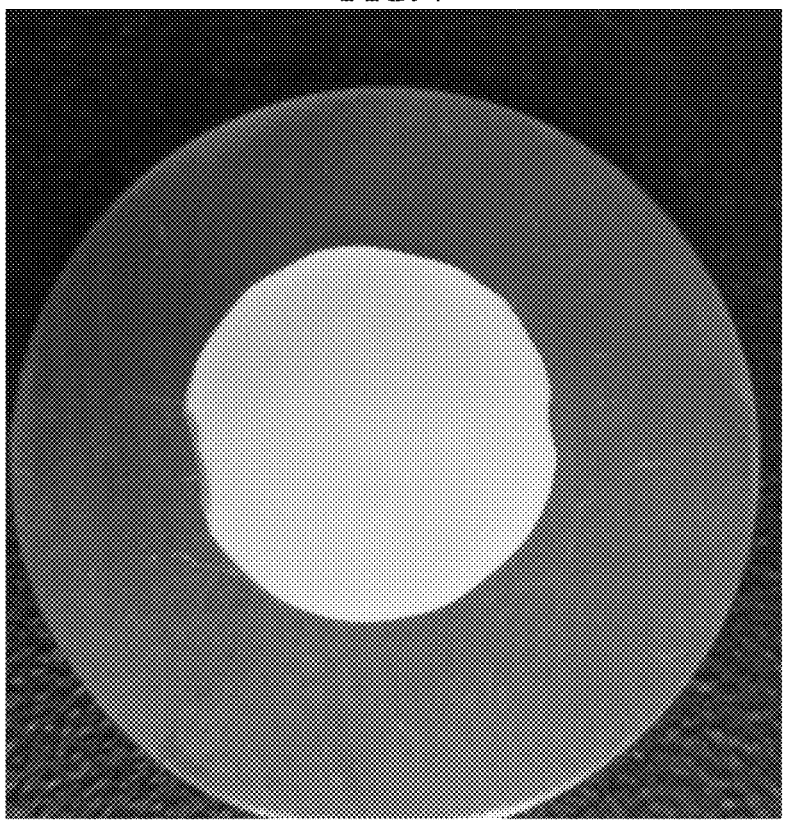
FIG. 7 shows an optical image of sintered lithium-stuffed garnet after SPS sintering, according to Example 1.

The calcined lithium-stuffed garnet powder was placed in the SPS apparatus as shown in FIG. 6. The thus placed powder was sintered using the SPS apparatus to produce a sintered monolith. This sintered monolith was removed and is shown in FIG. 7. This sintered monolith was mechanically polished to reduce its thickness.

The separators were observed to have improved adhesion with lithium.

The separators were observed to have improved lithium wettability.

The separators were observed to be resistant to lithium dendrite formation at up to 30 mA/cm$^2$ at a temperature of 80° C.

The separator was observed to have a grain size of about 15-20 μm.

After sintering, the dense pellet was polished using a colloidal-sonication-polishing process. The polishing process uses a 9 μm media in glycol, polished on a composite iron disc, then a 1 μm media in glycol polished on a composite tin disc. The separator was observed to have a surface roughness of 30 μm (Ra).

Figure 16:
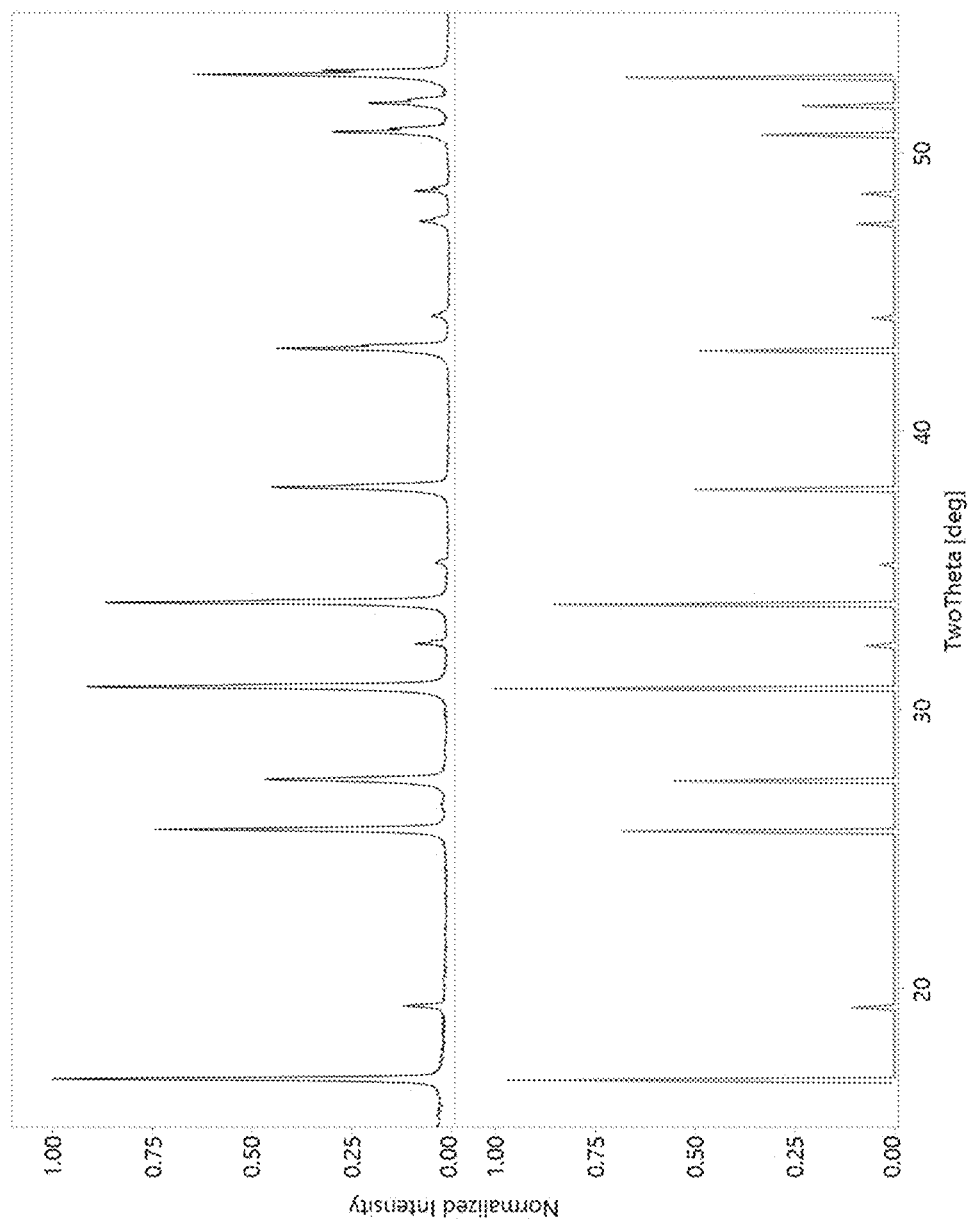
FIG. 16 shows x-ray powder diffraction pattern of (bottom pane) cubic LLZO reference and (top pane) a SPS sintered lithium-stuffed garnet prepared by Example 1.

An XRD pattern of the pellet made by this Example is shown in FIG. 16. As shown with comparison to a reference spectra, the pellet made by this Example was polycrystalline lithium-stuffed garnet.

Example 2

Making a Lithium-Stuffed Garnet Electrolyte by Conventional Sintering

In this example a lithium-stuffed garnet electrolyte separator was prepared using conventional sintering. Calcined lithium-stuffed garnet powder was prepared by mixing LiOH, LaOH, ZrO, and bohemite as a source of aluminum. The powder was mixed in a rolling ball mill and calcined in alumina crucibles at between 750-1100° C. for 2-20 hours and then crushed. The crushed calcined powder was loaded into a milling apparatus and milled to provide calcined lithium-stuffed garnet powder. The powder had an empirical formula of $Li_{6.7}La_3Zr_2O_{12}0.11Al_2O_3$. This powder was placed in a press and pressed at 10,000 PSI to form a pressed pellet. The pressing occurred at room temperature, about 20 to about 25° C. The pressure was released and the pellet was heated to 1000-1200° C. without any applied pressure for between 10 and 1000 minutes to sinter it. The sintered pellet was polished before use as a separator in an electrochemical cell. The polishing used the same process as described in Example 1 above.

Example 3

Comparing a Lithium-Stuffed Garnet Electrolyte Made by Example 1 with a Lithium-Stuffed Garnet Electrolyte Made by Example 2

Figure 8:
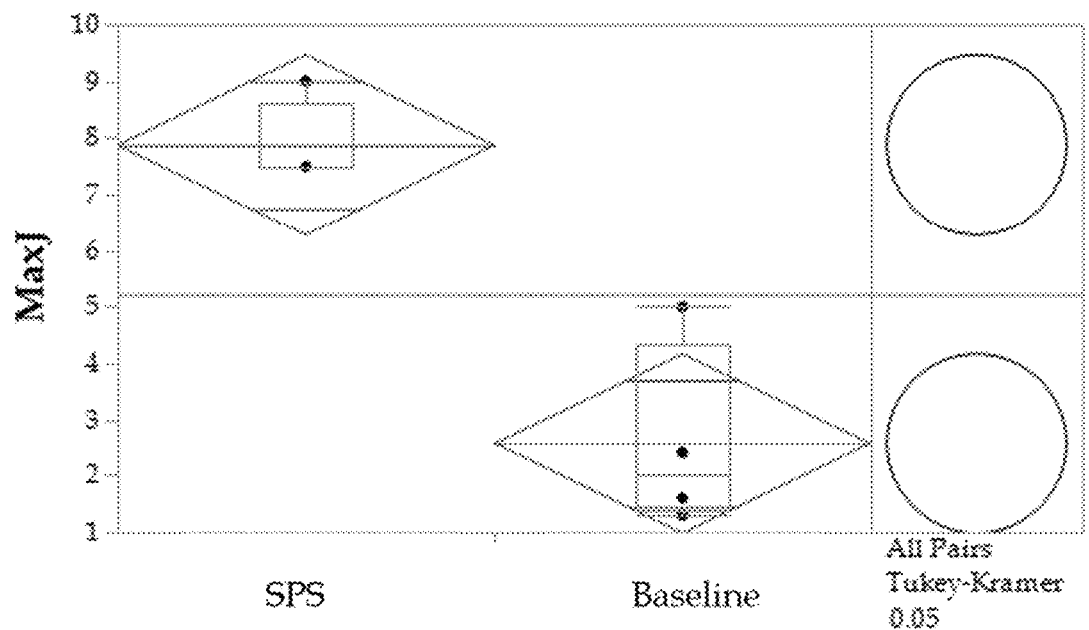
FIG. 8 shows a plot of maximum current density before failure, in $mA/cm^2$, for a Li—Li symmetric electrochemical cell configuration at 45° C., according to Example 3, for SPS sintered films prepared according to Example 1 versus a control batch prepared with conventional sintering according to Example 2.

The separators from each of Examples 1 and 2, herein, were placed individually in a symmetric electrochemical cell with Li-metal electrodes on both sides of the samples. A current was applied to pass lithium in one direction, then the polarity of current was reversed to pass lithium in the opposite direction. The maximum current applied before the electrochemical cell failed is plotted in FIG. 8. As shown in FIG. 8, the separators prepared by Example 1 were able to tolerate a higher current density before failure than were separators prepared by Example 2.

Figure 17:
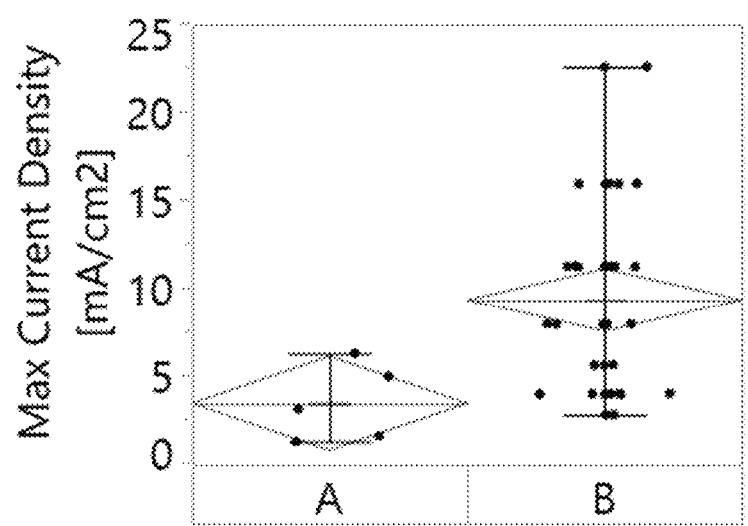
FIG. 17 shows maximum current density passed before failure for thin films in two different conditions.
Figure 18:
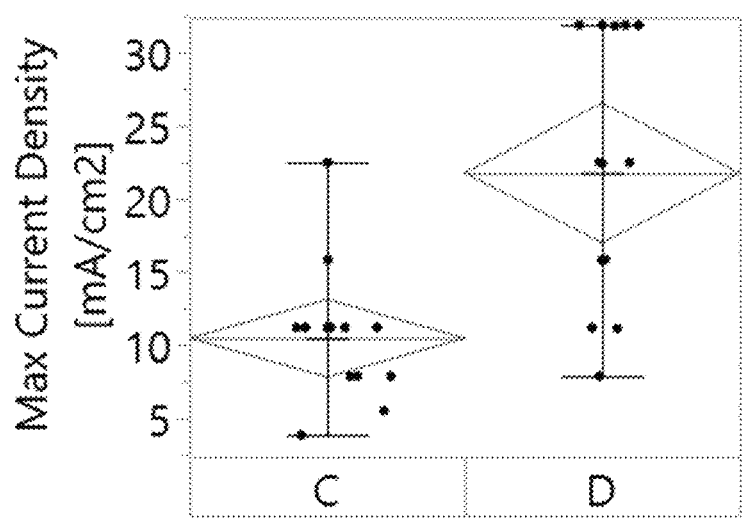
FIG. 18 shows maximum current density passed before failure for pellets with surface preparation in two different conditions.

FIG. 17 and FIG. 18 provide additional examples of the maximum current applied before failure for thin films in FIG. 17 and pellets in FIG. 18. In FIG. 17, films A and B are prepared with different density according to some of the embodiments of the present invention. In FIG. 18, pellets C and D are prepared with different surface finishing treatments.

Example 4

Making a Lithium-Stuffed Garnet Electrolyte—Surface Reflowing by Heat Treatment

In this example a lithium-stuffed garnet electrolyte separator was prepared according to Example 1 and further processed in a heat treatment step to melt and reflow is surface.

Figure 9:
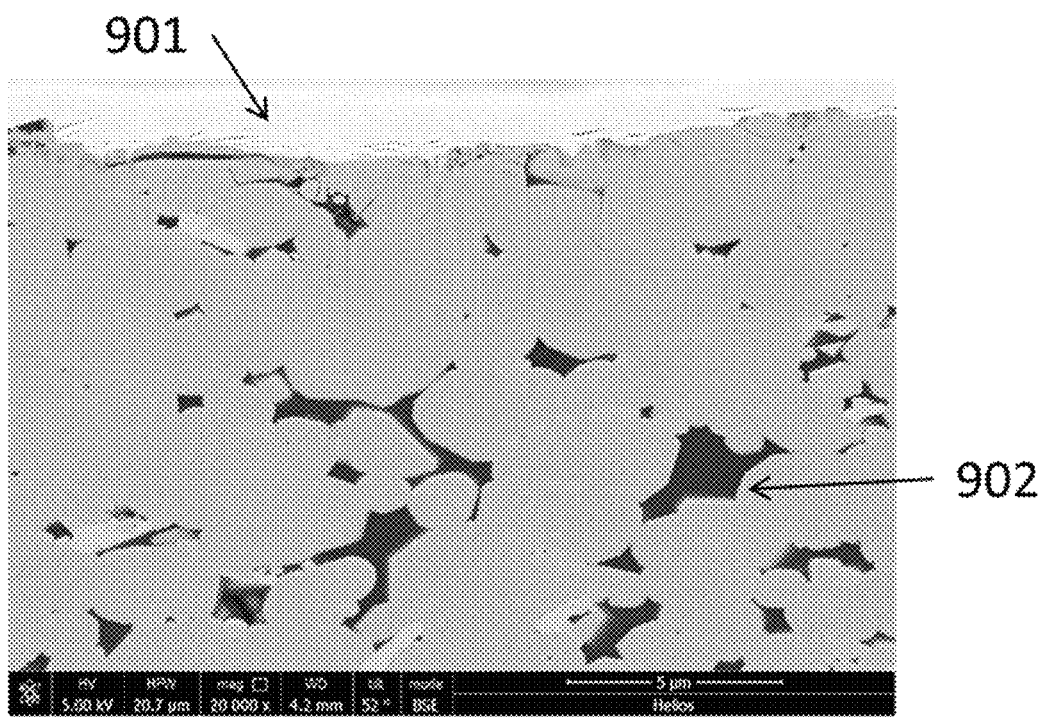
FIG. 9 shows an SEM image of a SPS sintered lithium-stuffed garnet before the surface reflow heat treatment, according to Example 4.

A pellet from Example 1, which was used in this Example, before the heat treatment step is shown in FIG. 9. As shown in FIG. 9, the pellet includes surface cracks (901) and defects as well internal pore space (902). As shown in FIG. 9, the density of defects (901) at the surface is about equal to the density of defects (902) in the bulk.

The heat treatment step included rapidly heating the pellet to 1300° C. at 100° C./min. Then the pellet was held at that temperature for 5 minutes. Then then pellet was rapidly cooled. As used in this example, rapid cooling is a rate which is greater than 10° C./min. The atmosphere around the pellet during the heating step included nitrogen, helium, and/or argon and $H_2$. The concentration of hydrogen, $H_2$, was 1-5%.

Figure 10:
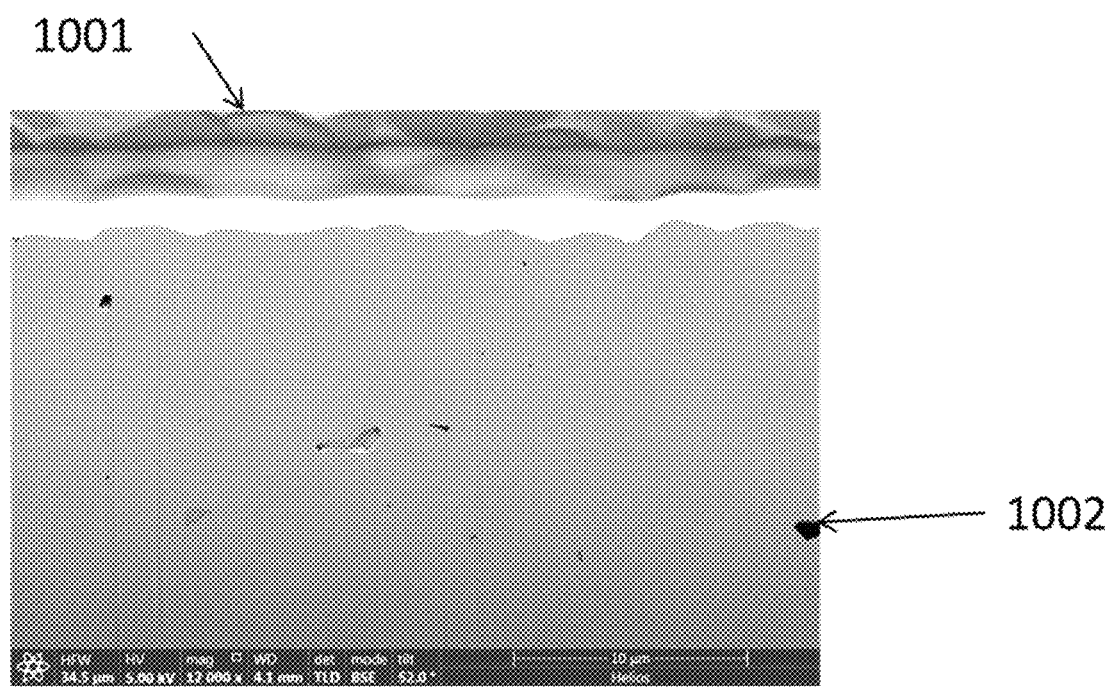
FIG. 10 shows an SEM image of a SPS sintered lithium-stuffed garnet after the surface reflow heat treatment, according to Example 4.

The pellet after the heat treatment step is shown in FIG. 10. As shown in FIG. 10, the pellet does not appear to have defects at the surface (1001). The density of surface defects (1001) is significantly reduced compared to the pellet before the heat treatment. See (901) above and in FIG. 9. As shown in FIG. 10, the pellet does include internal pore space (1002) although less internal pores than was present before the heat treatment. The density of surface defects (1001) is less than the density of internal pores (1002) after the heat treatment step. Thus, after the heat treatment, the density of defects at the surface is less than the density of defects in the bulk. After heat treatment, the porosity was estimated to be less than 2% from image analysis of the cross-section.

As shown in FIGS. 9 and 10, the heat treatment step melts the surface of the lithium-stuffed garnet without melting the entire bulk of the lithium-stuffed garnet. This heat treatment step reduces the density of defects more so at the surface than in the bulk.

The pellet which resulted from this process had a density of greater than 5.50 g/cm$^3$.

The pellet which resulted from this process had a density of greater than 98%.

In other words, the pellet was less than 2% voids.

Example 5

Measuring Surface Roughness of a Lithium-Stuffed Garnet Electrolyte

Figure 11:
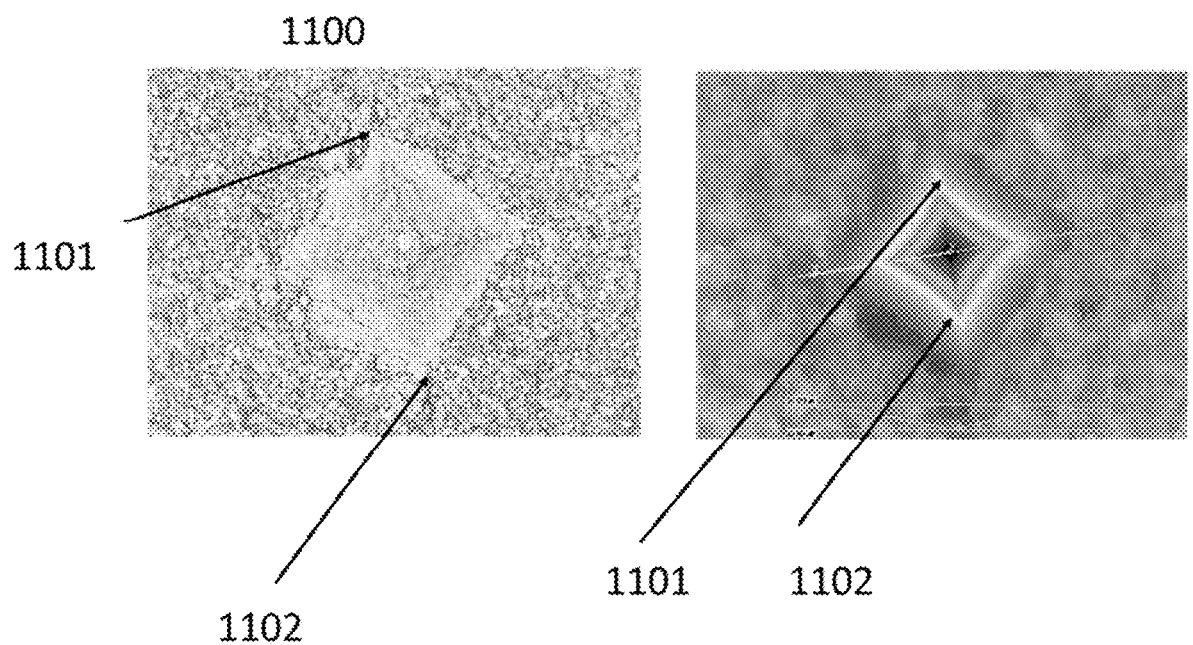
FIG. 11 shows an optical image of a surface defect in the surface of a sintered lithium-stuffed garnet before surface reflow heat treatment, according to Example 5.
Figure 12:
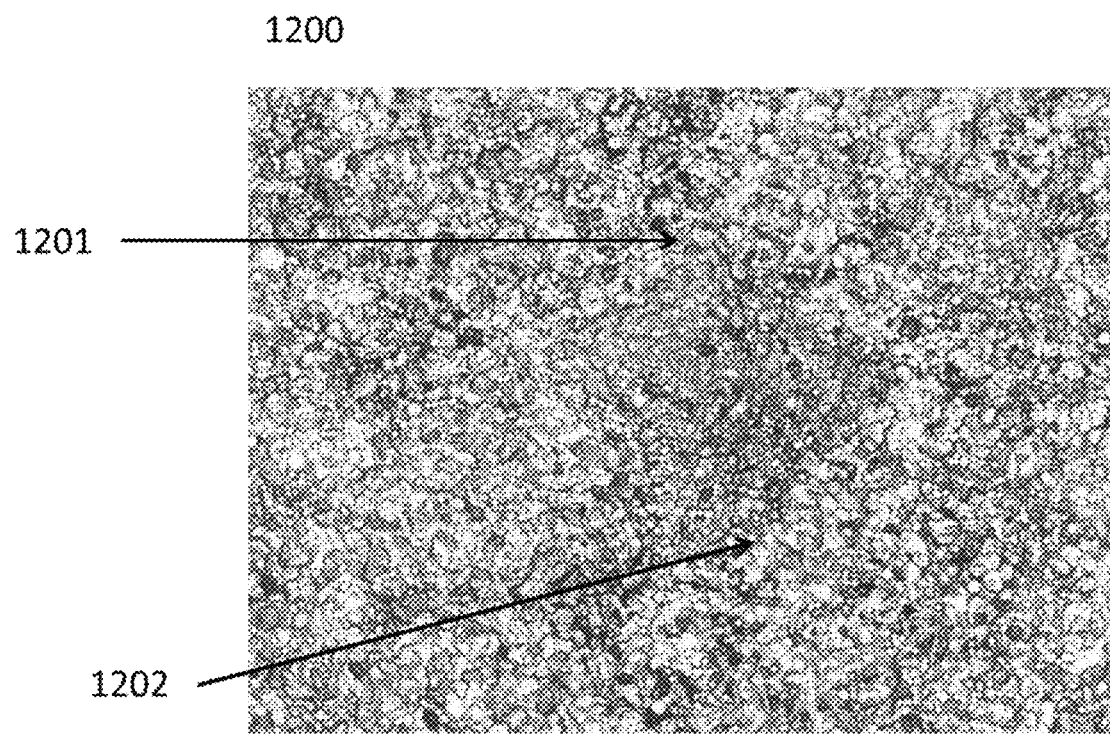
FIG. 12 shows an optical image of a surface defect in the surface of a sintered lithium-stuffed garnet after surface reflow heat treatment, according to Example 5.

In this example a lithium-stuffed garnet electrolyte pellet was prepared according to Example 1 and heat treated according to Example 4. Prior to the heat treatment, a surface defect, shown in FIG. 11, was made by drilling into the surface of the lithium-stuffed garnet electrolyte pellet. The surface defect was about 80 μm in width (point 1101 to point 1102 a distance of 80 μm) and 10 μm in depth before the heat treatment step. After the heat treatment step in Example 3, the surface defect, shown in FIG. 12 was reduced in size. The surface defect was about 60 μm (in FIG. 12, point 1201 to point 1202 a distance) in width and 6 μm in depth after the heat treatment step. This shows that the heat treatment step in Example 3 is useful for reducing the size of surface defect.

Example 6

Using a Lithium-Stuffed Garnet Electrolyte

The separators from each of Examples 1 and 4, herein, were placed individually in a symmetric electrochemical cell with Li-metal electrodes on both sides of the samples. To prepare the sample for electrochemical measurement, after sintering, the sample surfaces were planarized and cleaned. Lithium was applied to each side in a manner as to obtain a low interfacial impedance. All processing was done in an inert atmosphere.

Figure 13:
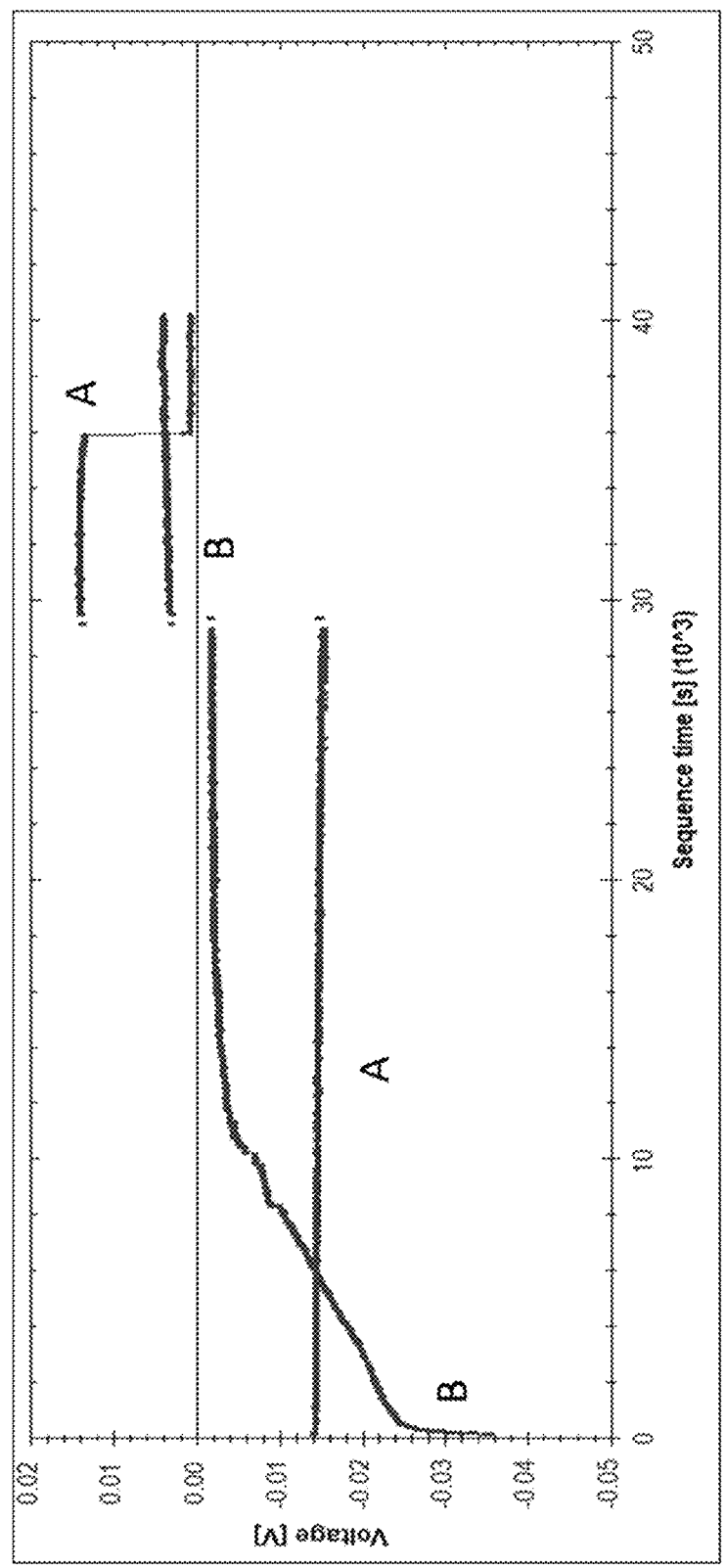
FIG. 13 shows electrochemical cycling, according to Example 6, of non-melted films from Example 1.
Figure 14:
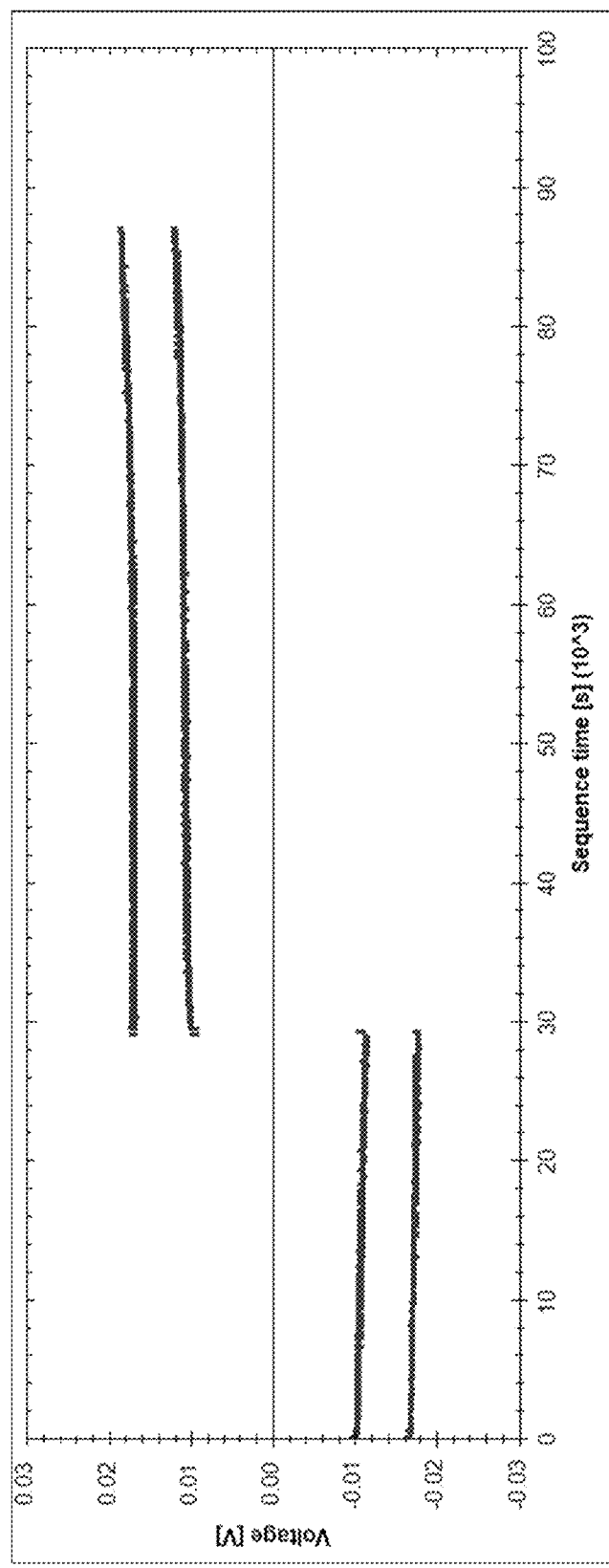
FIG. 14 shows electrochemical cycling, according to Example 6, of non-melted films from Example 4.

Two samples from Example 1 were each placed in an electrochemical cell with two lithium electrodes applied to the sample with a moderate amount of pressure applied to maintain contact between lithium and the separator. The moderate amount of pressure used here was between 100 and 5000 psi. A current of 0.5 mA/cm$^2$ was applied to pass 20 um of lithium in one direction at 100° C. Then, the current was reversed and −0.5 mA/cm$^2$ was applied to pass lithium in the opposite direction. Voltage was monitored during the test, and plots of voltage versus time for the first 50 cycles is shown in FIGS. 13-14. Two samples from Example 1 and two samples from Example 4 were tested.

As shown in FIG. 13, one sample from Example 1 shorted during the first half-cycle. One sample from Example 1 shorted in the second half-cycle.

As shown in FIG. 14, both samples from Example 4 did not electrically short during the test. This Example shows that the heat treatment in Example 4 resulted in separators with improved electrochemical performance when compared to the separators from Example 1.

Example 7

Making a Lithium-Stuffed Garnet Precursor

Figure 15A:
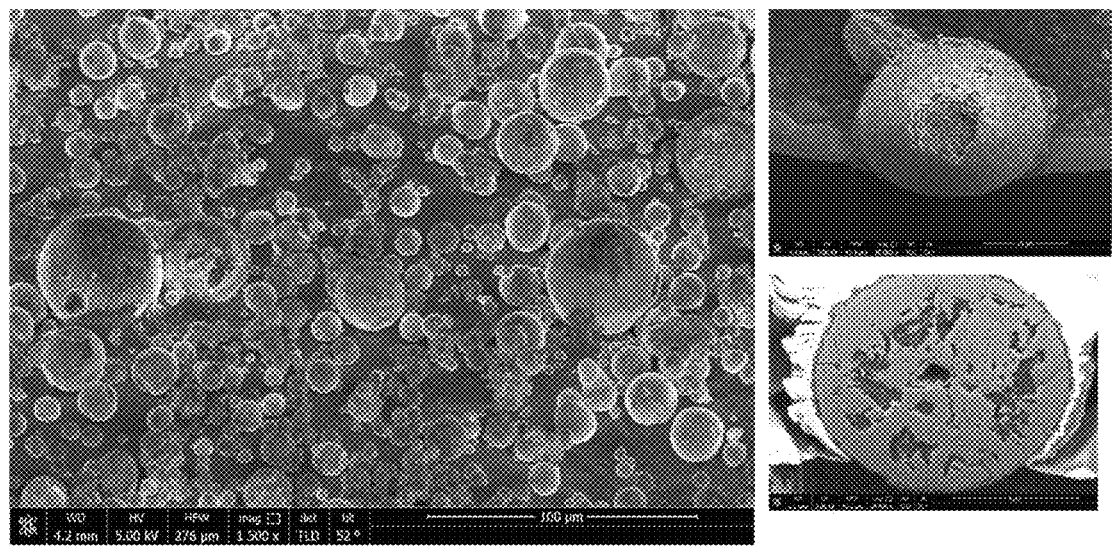
FIG. 15A shows a SEM image of the lithium-stuffed garnet sphere percursors of Example 7.
Figure 15B:
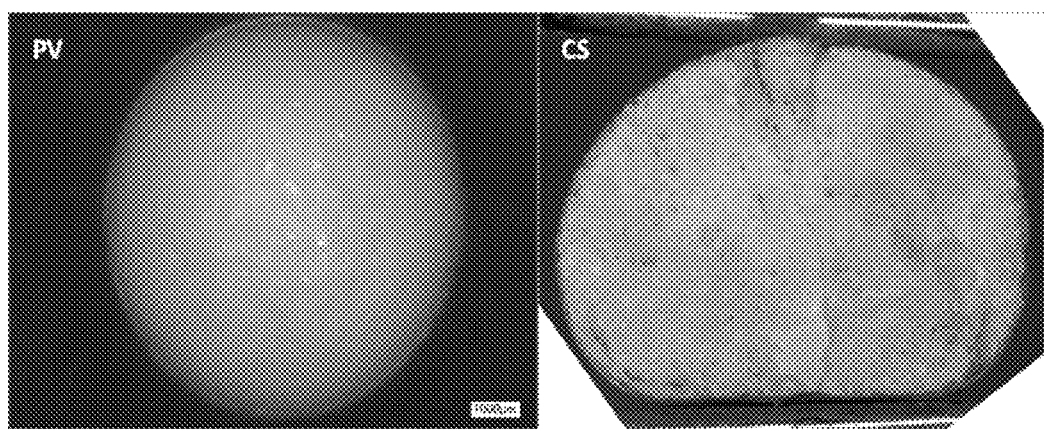
FIG. 15B shows an optical image of the lithium-stuffed garnet sphere percursors of Example 7.

In this example, $ZrO_2$, $LiOH$, $La_2O_3$ and $Al(NO_3)_3$ were mixed at a desired stoichiometry and/or with excess lithium to form a mixture having an atomic ratio of $Li_xLa_7Zr_2O_{12}$. The mixture was rapidly heated to a 1300° C. at 100° C. per minute. The mixture was allowed to melt and rapidly cool. The rapid cooling was cooling at a rate greater than 10° C./min. The mixture was then atomized into a cooling environment to form spherical particles of phase pure garnet. The cooling environment was an inert environment of argon or helium. An example of this process is described in U.S. Patent Application publication no. 2014/0317912, which is hereby incorporated by reference herein in its entirety. These spherical particles are shown in FIGS. 15A and 15B.

Example 8—Prophetic Example

Making a Lithium-Stuffed Garnet Thin Film

In this example, $ZrO_2$, $LiOH$, $La_2O_3$ and calcined boehmite are mixed in molar ratios of 2:6-7:3:0.1-2 and milled. The mixed powder is calcined at 800-1000° C. for 1-10 hours and milled in a Hockmeyer mill to a $d_{50}$ particle size of 0.1-2 μm in an aprotic solvent with a surfactant and a dispersant. Binder solution is prepared in the same solvent and added to the slurry, which is filtered and cast with a doctor blade to a 30-200 μm gap height onto a mylar substrate. The film is released from the substrate and laminated to zero, one, two, or three additional layers in a uniaxial or isostatic press that may optionally be heated. The additional films may have a different slurry formulation which leads to a lower density of pores on one or both the surface layers. The laminated film is singulated into a workable size and sintered between inert setters at 700-1200° C. for 1-10 hours. The laminated film is extracted and tested via cross-sectional optical or electron microscopy or electrochemical evaluation techniques as in Example 6.

The embodiments and examples described above are intended to be merely illustrative and non-limiting. Those skilled in the art will recognize or will be able to ascertain using no more than routine experimentation, numerous equivalents of specific compounds, materials and procedures. All such equivalents are considered to be within the scope and are encompassed by the appended claims.

The invention claimed is:

1. A method for reducing the number of defects on a single layer sintered lithium-stuffed garnet thin film, the method comprising the following steps in the following order:
   providing a single layer sintered lithium-stuffed garnet thin film in contact with a current collector layer in a first step, wherein the single layer sintered lithium-stuffed garnet thin film comprises a top surface;
   heating the single layer sintered lithium-stuffed garnet thin film to 700° C. to 1200° C. for 1 hour to 10 hours in an inert or reducing atmosphere in a second step;
   wherein the inert or reducing atmosphere comprises a member selected from the group consisting of Ar, Ar/$H_2$, $N_2$, or combinations thereof; and
   cooling the single layer sintered lithium-stuffed garnet thin film in a third step in the inert or reducing atmosphere;
   wherein the current collector layer comprises a metal selected from Al, Cu, Ni, steel, or alloys thereof, or combinations thereof.

2. The method of claim 1, comprising heating the single layer sintered lithium-stuffed garnet thin film to at least 750° C.

3. The method of claim 1, comprising heating of the single layer sintered lithium-stuffed garnet thin film to at least 900° C.

4. The method of claim 1, comprising heating of the single layer sintered lithium-stuffed garnet thin film to at least 1000° C.

5. The method of claim 1, wherein the current collector comprises Ni.

6. The method of claim 1, wherein the single layer sintered lithium-stuffed garnet thin film has a bulk, wherein the cooling in the third step is for a longest time which still provides for smaller grains on the top surface than in the bulk.

7. The method of claim 1, wherein the single layer sintered lithium-stuffed garnet thin film has a bulk, wherein the cooling in the third step is for a longest time which still provides for the top surface which is denser than the bulk.

8. The method of claim 1, wherein the single layer sintered lithium-stuffed garnet thin film has a bulk, wherein the cooling in the third step is for a longest time which still provides for the top surface which is less crystalline than the bulk.

9. The method of claim 1, wherein the inert or reducing atmosphere is Ar, Ar/H$_2$, or N$_2$.

10. The method of claim 1, wherein the heating in the second step is via an oven, a laser, a Rapid Thermal Processing instrument (RTP), infrared radiation, UV radiation, or a flash lamp.

11. The method of claim 1, wherein the single layer sintered lithium-stuffed garnet thin film has the empirical formula Li$_a$La$_b$Zr$_c$Al$_d$Me"$_e$O$_f$, wherein $5<a<8.5$; $2<b<4$; $0<c\leq2.5$; $0\leq d<2$; $0\leq e<2$, and $10<f<13$, and Me" is a metal selected from Nb, Ga, or Ta.

12. The method of claim 1, wherein the single layer sintered lithium-stuffed garnet thin film has the empirical formula Li$_x$La$_y$Zr$_z$O$_t$·qAl$_2$O$_3$, wherein $4<x<10$, $1<y<4$, $1<z<3$, $6<t<14$, and $0\leq q\leq1$.

13. The method of claim 1, wherein the single layer sintered lithium-stuffed garnet thin film has a bulk, wherein after heating the single layer sintered lithium-stuffed garnet thin film, the top surface of the single layer sintered lithium-stuffed garnet thin film has a lower surface defect density than does the bulk.

14. The method of claim 1, wherein the single layer sintered lithium-stuffed garnet thin film has a bulk, wherein after heating the single layer sintered lithium-stuffed garnet thin film, the top surface is more dense than the bulk.

15. The method of claim 1, wherein the thickness of the single layer sintered lithium-stuffed garnet thin film is between 1 μm and 100 μm.

16. The method of claim 1, wherein prior to heating the single layer sintered lithium-stuffed garnet thin film to at least 400° C. in the second step, the single layer sintered lithium-stuffed garnet thin film is comprised of a plurality of particles, wherein a particle size distribution of the particles has a d00 of about 25 μm-45 μm.

17. The method of claim 1, comprising heating the single layer sintered lithium-stuffed garnet thin film to 700° C., 800° C., 900° C., 1000° C., 1100° C., or 1200° C., for 1 hour to 10 hours.

* * * * *